US011595173B2

(12) United States Patent
Pelletier et al.

(10) Patent No.: US 11,595,173 B2
(45) Date of Patent: Feb. 28, 2023

(54) LONG TERM EVOLUTION-ASSISTED NR FLEXIBLE RADIO ACCESS

(71) Applicant: IDAC Holdings, Inc., Wilmington, DE (US)

(72) Inventors: Benoit Pelletier, Roxboro (CA); Ghyslain Pelletier, Montreal (CA); Diana Pani, Montreal (CA); Paul Marinier, Brossard (CA); Martino M. Freda, Laval (CA); Jiaxin Yang, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/087,974

(22) PCT Filed: Mar. 30, 2017

(86) PCT No.: PCT/US2017/025122
§ 371 (c)(1),
(2) Date: Sep. 24, 2018

(87) PCT Pub. No.: WO2017/173133
PCT Pub. Date: Oct. 5, 2017

(65) Prior Publication Data
US 2019/0089498 A1 Mar. 21, 2019

Related U.S. Application Data

(60) Provisional application No. 62/472,967, filed on Mar. 17, 2017, provisional application No. 62/315,190, filed on Mar. 30, 2016.

(51) Int. Cl.
H04L 5/00 (2006.01)
H04W 72/14 (2009.01)
(Continued)

(52) U.S. Cl.
CPC ............ *H04L 5/005* (2013.01); *H04L 5/003* (2013.01); *H04L 5/0053* (2013.01);
(Continued)

(58) Field of Classification Search
CPC ....... H04L 5/005; H04L 5/003; H04L 5/0053; H04W 72/005; H04W 72/042; H04W 72/14

See application file for complete search history.

(56) References Cited

U.S. PATENT DOCUMENTS 8,917,796 B1  12/2014  Mayrench et al.
8,965,294 B2*  2/2015  Seo ..................... H04W 4/06
                                                455/63.1
(Continued)

FOREIGN PATENT DOCUMENTS

CN  103733587 A  4/2014
CN  105075170 A  11/2015
(Continued)

OTHER PUBLICATIONS

3rd Generation Partnership Project (3GPP), R1-154659, "Narrowband LTE-Concept Description", Ericsson LM, 3GPP TSG RAN WG1 Meeting #82, Beijing, China, Aug. 24-28, 2015, 9 pages.
(Continued)

Primary Examiner — Huy D Vu
Assistant Examiner — Bailor C Hsu
(74) Attorney, Agent, or Firm — Condo Roccia Koptiw LLP

(57) ABSTRACT

A WTRU may determine that a LTE cell at least partially overlaps in frequency with an NR cell. The WTRU may determine that an NR transmission is to be received within a set of resources that are included in at least a portion of the NR cell that at least partially overlaps with the LTE cell. The WTRU may determine a subset of resources within the set
(Continued)

of resources that correspond to an LTE common transmission. The WTRU may receive the NR transmission within the set of resources. The NR transmission may not be included in the subset of resources that correspond to the LTE common transmission. The LTE common transmission may include one or more of a common control signal, a cell-specific broadcast signal, cell-specific reference signals, a physical downlink control channel, a primary synchronization signal, a secondary synchronization signal, and/or a channel state information reference signal.

20 Claims, 23 Drawing Sheets

(51) Int. Cl.
    H04W 72/00 (2009.01)
    H04W 72/04 (2009.01)
(52) U.S. Cl.
    CPC ....... *H04W 72/005* (2013.01); *H04W 72/042* (2013.01); *H04W 72/14* (2013.01)

(56) References Cited

U.S. PATENT DOCUMENTS

| | | | |
|---|---|---|---|
| 9,203,576 B2 | 12/2015 | Frenne et al. | |
| 9,271,265 B2 | 2/2016 | Lee et al. | |
| 9,591,636 B2 | 3/2017 | Papasakellariou et al. | |
| 10,064,216 B2 | 8/2018 | Nagata et al. | |
| 10,462,675 B2* | 10/2019 | Gosh | H04L 5/0062 |
| 10,560,297 B1* | 2/2020 | Baldemair | H04W 8/24 |
| 2008/0134276 A1* | 6/2008 | Orrell | H04H 20/93 725/132 |
| 2009/0238131 A1* | 9/2009 | Montojo | H04L 5/0053 370/329 |
| 2010/0279724 A1* | 11/2010 | Li | H04L 1/20 455/501 |
| 2011/0072347 A1* | 3/2011 | Krampf | H04R 1/028 715/716 |
| 2011/0111781 A1 | 5/2011 | Chen et al. | |
| 2011/0274059 A1 | 11/2011 | Brown et al. | |
| 2011/0317657 A1 | 12/2011 | Chmiel et al. | |
| 2012/0052899 A1* | 3/2012 | Wang | H04W 52/226 455/513 |
| 2012/0106374 A1 | 5/2012 | Gaalm et al. | |
| 2012/0113961 A1* | 5/2012 | Krishnamurthy | H04B 17/24 370/332 |
| 2012/0140743 A1 | 6/2012 | Pelletier et al. | |
| 2012/0163335 A1 | 6/2012 | Chung et al. | |
| 2012/0307749 A1 | 12/2012 | Banister et al. | |
| 2012/0329400 A1 | 12/2012 | Seo et al. | |
| 2013/0010766 A1 | 1/2013 | Sadek et al. | |
| 2013/0194931 A1* | 8/2013 | Lee | H04L 5/0053 370/241 |
| 2013/0208587 A1 | 8/2013 | Bala et al. | |
| 2013/0308572 A1* | 11/2013 | Sayana | H04B 7/0619 370/329 |
| 2014/0036805 A1 | 2/2014 | Sadek et al. | |
| 2014/0094125 A1 | 4/2014 | Behravan et al. | |
| 2014/0204849 A1 | 7/2014 | Chen et al. | |
| 2014/0233457 A1* | 8/2014 | Koutsimanis | H04L 5/0073 370/328 |
| 2015/0119056 A1* | 4/2015 | Lee | H04W 72/042 455/450 |
| 2015/0188650 A1 | 7/2015 | Au et al. | |
| 2015/0223075 A1 | 8/2015 | Bashar et al. | |
| 2015/0257139 A1 | 9/2015 | Chen et al. | |
| 2016/0043849 A1 | 2/2016 | Lee et al. | |
| 2016/0044699 A1 | 2/2016 | Deng et al. | |
| 2016/0050635 A1 | 2/2016 | Choi et al. | |
| 2016/0128084 A1* | 5/2016 | Novlan | H04W 72/1268 370/329 |
| 2016/0150391 A1* | 5/2016 | Lee | H04L 5/0051 370/329 |
| 2016/0174238 A1 | 6/2016 | Chen et al. | |
| 2016/0234736 A1 | 8/2016 | Kubota et al. | |
| 2016/0262170 A1 | 9/2016 | Lee et al. | |
| 2016/0353452 A1* | 12/2016 | Chen | H04J 11/0056 |
| 2017/0094622 A1 | 3/2017 | Hahn et al. | |
| 2017/0285130 A1* | 10/2017 | Kim | H04L 1/1812 |
| 2017/0311172 A1* | 10/2017 | Van Phan | H04W 16/14 |
| 2018/0049055 A1 | 2/2018 | Wilberg et al. | |
| 2018/0070369 A1 | 3/2018 | Papasakellariou et al. | |
| 2018/0212732 A1* | 7/2018 | You | H04L 5/0091 |
| 2019/0229840 A1 | 7/2019 | Takeda et al. | |
| 2019/0342888 A1* | 11/2019 | Hosseini | H04W 72/04 |
| 2020/0053758 A1* | 2/2020 | Hosseini | H04L 5/1469 |
| 2020/0382354 A1* | 12/2020 | Sengupta | H04L 5/001 |

FOREIGN PATENT DOCUMENTS

| | | |
|---|---|---|
| JP | 2012-235341 A | 11/2012 |
| JP | 2014-517641 A | 7/2014 |
| WO | WO 2012/109439 A1 | 8/2012 |
| WO | 2014-070311 A1 | 5/2014 |
| WO | 2014/153365 A1 | 9/2014 |
| WO | 2015-000157 A1 | 1/2015 |
| WO | 2015-149880 A1 | 10/2015 |
| WO | WO 2016/105570 A1 | 6/2016 |
| WO | WO 2016/130175 A1 | 8/2016 |
| WO | 2017/005295 A1 | 1/2017 |

OTHER PUBLICATIONS

3rd Generation Partnership Project (3GPP), R1-156010, "NB-LTE-General L1 Concept Description", Ericsson, 3GPP TSG-RAN WG1 #82bis, Malmo, Sweden, Oct. 5-9, 2015, 16 pages.

3rd Generation Partnership Project (3GPP), RP-160583, "Proposed Objective and Requirements on Dynamic Co-Existence of LTE and Next Generation RAT", AT&T, 3GPP TSG RAN Meeting #71, Goteborg, Sweden, Mar. 7-10, 2016, 3 pages.

3rd Generation Partnership Project (3GPP), TR 38.913 V0.2.0, "Technical Specification Group Radio Access Network, Study on Scenarios and Requirements for Next Generation Access Technologies, (Release 14)", Feb. 2016, 19 pages.

3rd Generation Partnership Project (3GPP), TS 36.300 V13.2.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 13)", Dec. 2015, 290 pages.

3rd Generation Partnership Project (3GPP), TS 36.321 V8.12.0, "Technical Specification Group Radio Access Network, Evolved Universal Terrestrial Radio Access (E-UTRA), Medium Access Control (MAC) Protocol Specification (Release 8)", Mar. 2012, 47 pages.

3rd Generation Partnership Project (3GPP), S1-160129, "5G/E-UTRAN Multi-RATs Capable Devices", Gemalto, 3GPP TSG-SA WG1 Meeting #73, Okinawa, Japan, Feb. 1-5, 2016, 1 page.

3rd Generation Partnership Project (3GPP), R1-1700630, "LTE-NR Co-Existence for Downlink", NTT DoCoMo, 3GPP TSG RAN WG1 AH_NR Meeting, Spokane, USA, Jan. 16-20, 2017, 6 pages.

3rd Generation Partnership Project (3GPP), R2-162228, "Inter-RAT Mobility with LTE", Samsung, 3GPP TSG-RAN WG2 Meeting #93bis, Dubrovnik, Croatia, Apr. 11-15, 2016, 3 pages.

3rd Generation Partnership Project (3GPP), R2-162783, "Multi-RAT RAN and CN", Qualcomm Incorporated, 3GPP TSG-RAN WG2 Meeting #93bis, Dubrovnik, Croatia, Apr. 11-15, 2016, 3 pages.

3rd Generation Partnership Project, 3GPP TSG RAN WG1#87, R1-1613263, "WF on LTE-NR Coexistence", Huawei, HiSilicon, AT&T, Orange, Nov. 14-18, 2016, 11 pages.

3rd Generation Partnership Project, 3GPP TSG RAN WG1, Meeting #84bis, R1-162157, "Overview of 5G frame structure", Huawei, HiSilicon, Apr. 11-15, 2016, 6 pages.

(56) References Cited

OTHER PUBLICATIONS

3$^{rd}$ Generation Partnership Project, 3GPP TSG RAN WG1 NR Ad-Hoc Meeting, R1-1700390, "Further Considerations on NR/LTE Coexistence", Intel Corporation, Jan. 16-20, 2017, 4 pages.

* cited by examiner

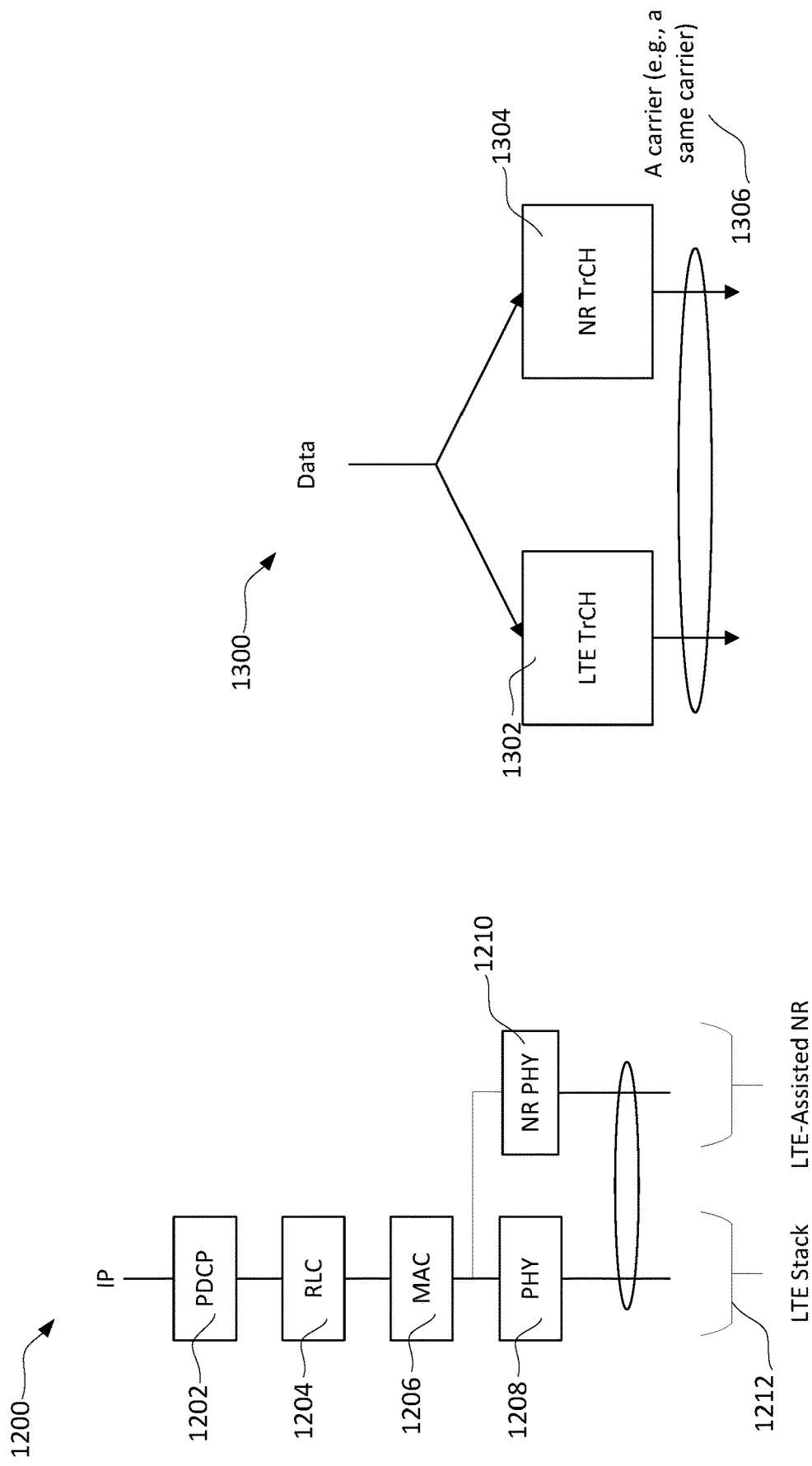

LONG TERM EVOLUTION-ASSISTED NR FLEXIBLE RADIO ACCESS

CROSS-REFERENCE TO RELATED APPLICATION

This application is the National Stage entry under 35 U.S.C. § 371 of Patent Cooperation Treaty Application PCT/US2017/025122, filed Mar. 30, 2017, which claims the benefit of U.S. Provisional Patent Application No. 62/315,190, filed Mar. 30, 2016 and U.S. Provisional Patent Application No. 62/472,967, filed Mar. 17, 2017, the contents of which are incorporated by reference.

BACKGROUND

Mobile communications continue to evolve. A fifth generation may be referred to as new radio (NR). A legacy generation of mobile communication may be, for example, fourth generation (4G) long term evolution (LTE).

SUMMARY

Systems, methods, and instrumentalities (e.g., aspects of entities, interfaces and procedures, such as protocol stack procedures and functions in a wireless transmit/receive unit (WTRU) and/or network layers L1, L2) are disclosed for Long Term Evolution (LTE)-assisted processing and control architecture in NR flexible radio access technology (RAT) systems. Examples are provided for architectures and associated control/user plane aspects.

A WTRU may determine that a set of resources associated with a first radio access technology (RAT) at least partially overlaps with a set of resources associated with a second RAT. For example, the set of resources associated with a first RAT may include a NR cell, a set of NR resources, a set of NR PRBs, etc. The set of resources associated with the second RAT may include a LTE cell, a set of LTE resources, a set of LTE physical resource blocks (PRBs), etc. The WTRU may determine that a NR transmission is to be received within the set of NR resources that at least partially overlaps with the set of LTE resources. The WTRU may determine a NR transmission is to be received within an overlapping portion of the NR set of resources. The WTRU may determine that a subset of resources within the overlapping portion of the NR set of resources correspond to an LTE common transmission. The WTRU may receive the NR transmission within the set of NR resources. The NR transmission may not be included in the subset of resources that correspond to the LTE common transmission. The LTE common transmission may include one or more of a common control signal, a cell-specific broadcast signal, cell-specific reference signals (CRS), a physical downlink control channel (PDCCH), a primary synchronization signal (PSS), a secondary synchronization signal (SSS), and/or a channel state information reference signal (CSI-RS).

The WTRU may receive a physical control format indicator channel (PCFICH) indicating the subset of resources within the overlapping portion of the NR set of resources that correspond to an LTE common transmission. The WTRU may receive a LTE physical downlink control channel (PDCCH). The LTE PDCCH may comprise an indication of one or more PRBs that are comprised in the set of NR resources for receiving the NR transmission. The WTRU may determine the one or more PRBs based on the LTE PDCCH. The one or more PRBs may comprise the subset of resources within the overlapping portion of the NR set of resources that correspond to the LTE common transmission. The NR transmission may be received in a LTE multicast broadcast single frequency network (MBSFN) subframe.

The overlapping portion of the NR set of resources may comprise a second subset of resources allocated to a cell-specific reference signal (CRS), and the WTRU may receive the CRS via the second subset of the resources. The WTRU may perform a channel estimation for the NR transmission based on the CRS.

BRIEF DESCRIPTION OF THE DRAWINGS

FIG. 12 is an example of an NR physical layer (PHY) interacting with an LTE MAC protocol.

FIG. 13 is an example of combining NR and LTE physical channels.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
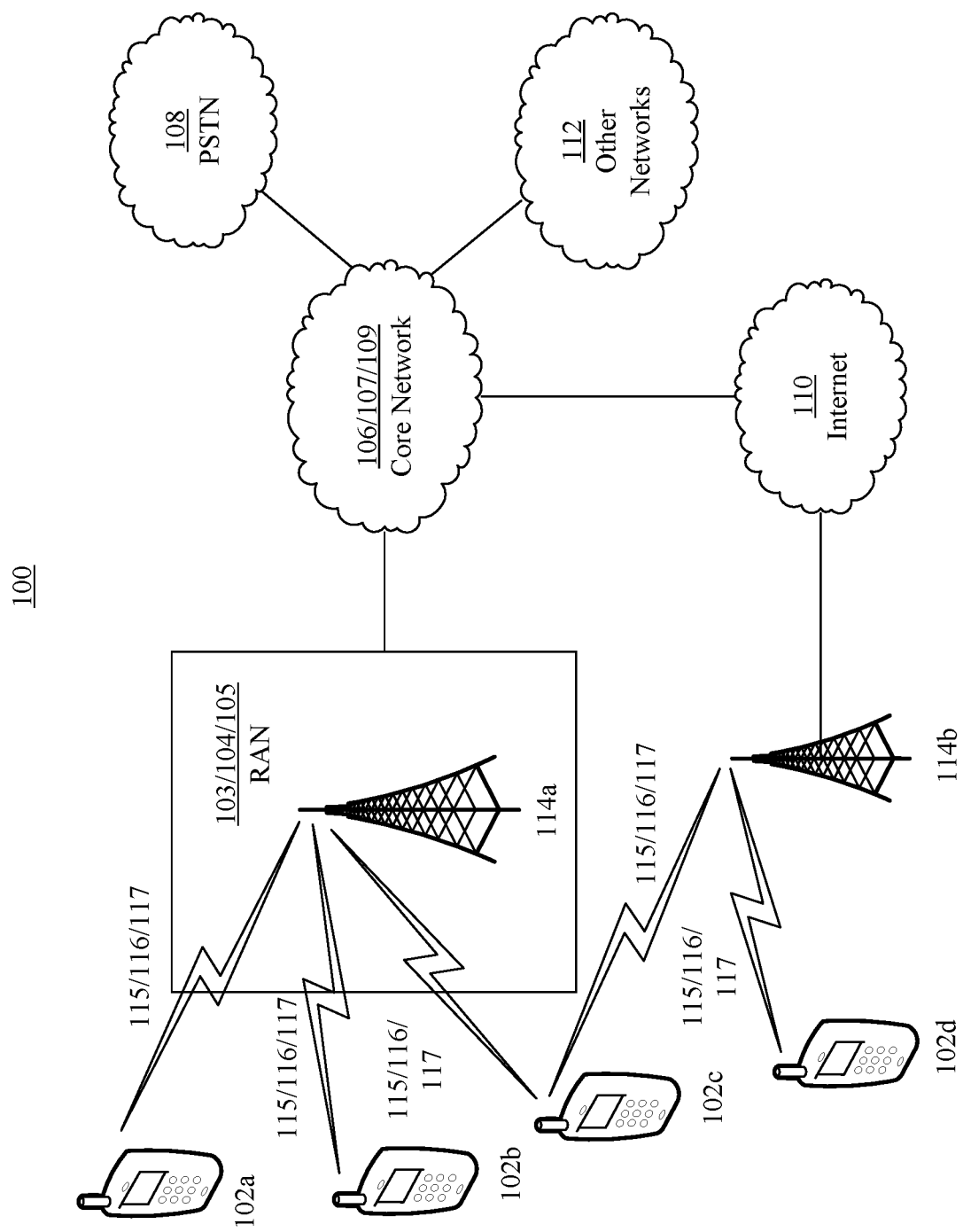
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs), e.g., WTRUs, 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in some embodiments, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In some embodiments, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
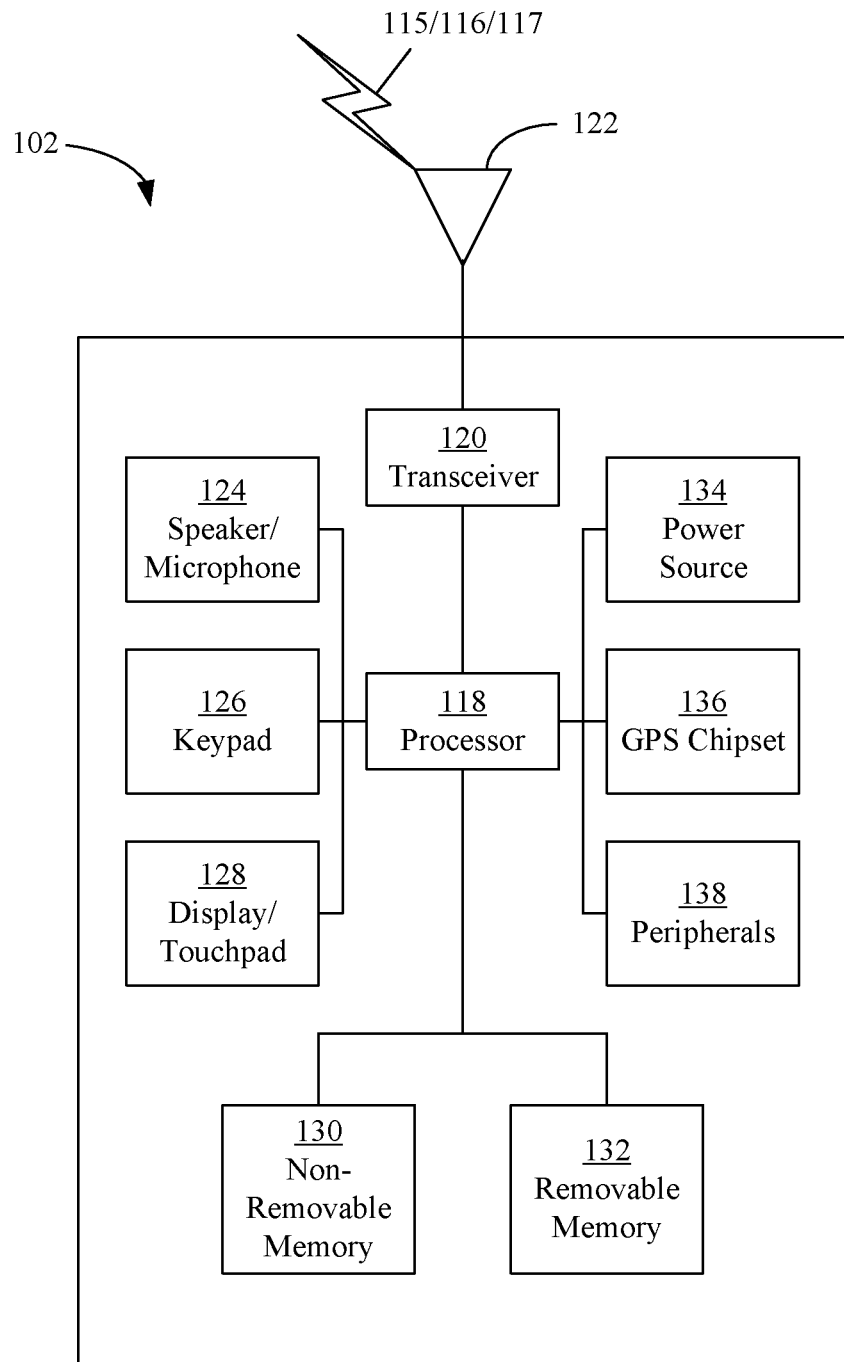
FIG. 1B is a system diagram of an example WTRU that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in some embodiments, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in some embodiments, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
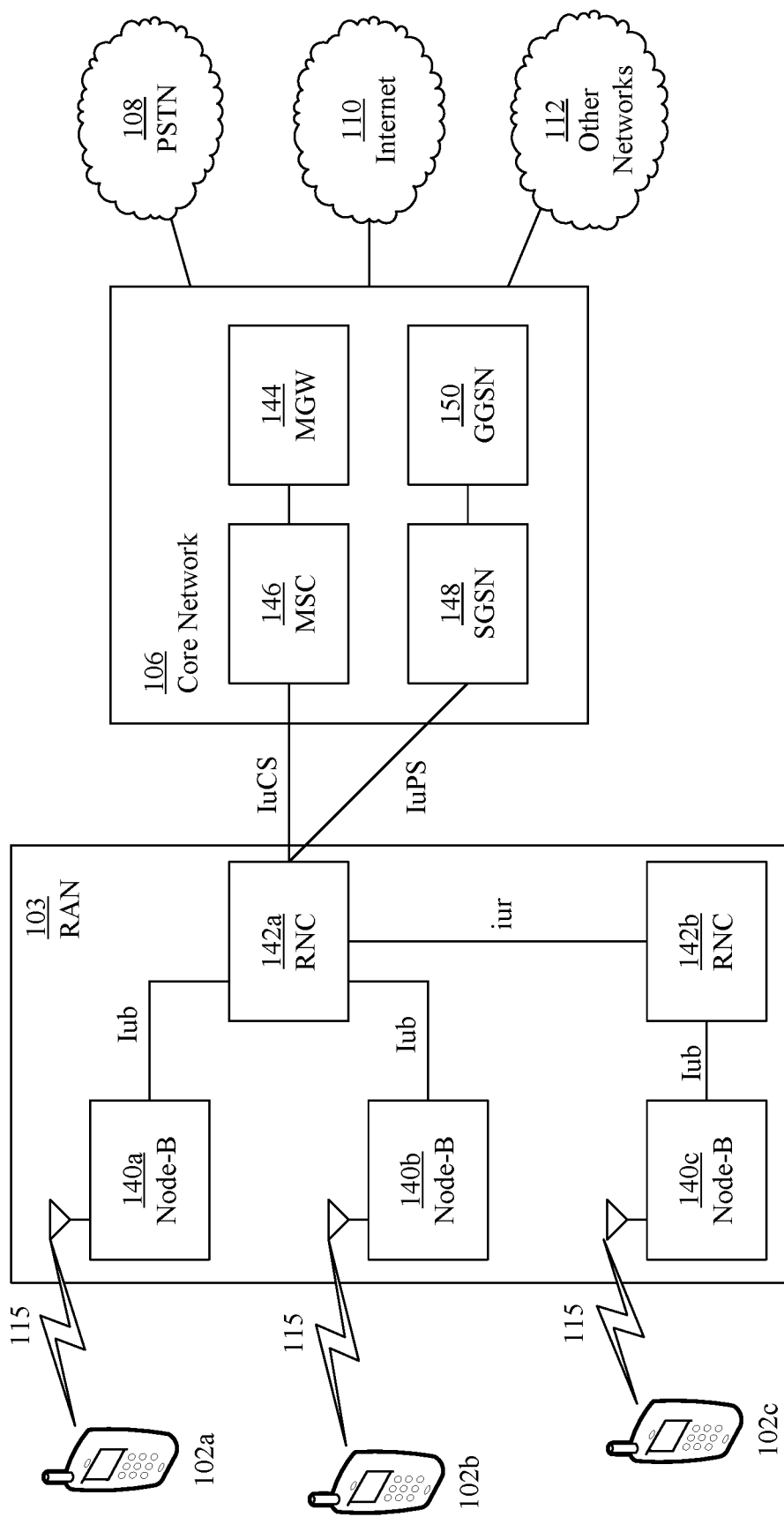
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
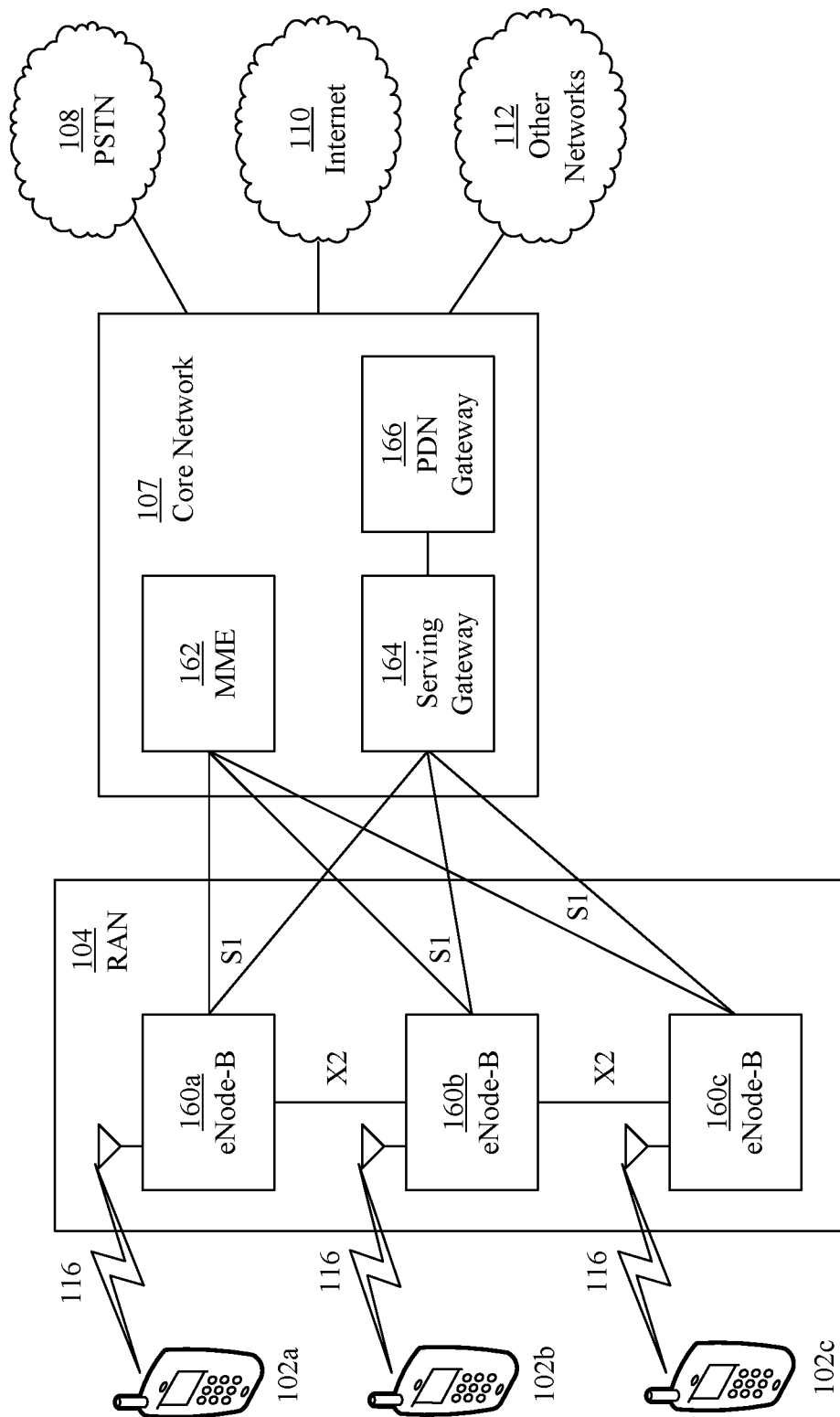
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In some embodiments, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink (UL) and/or downlink (DL), and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
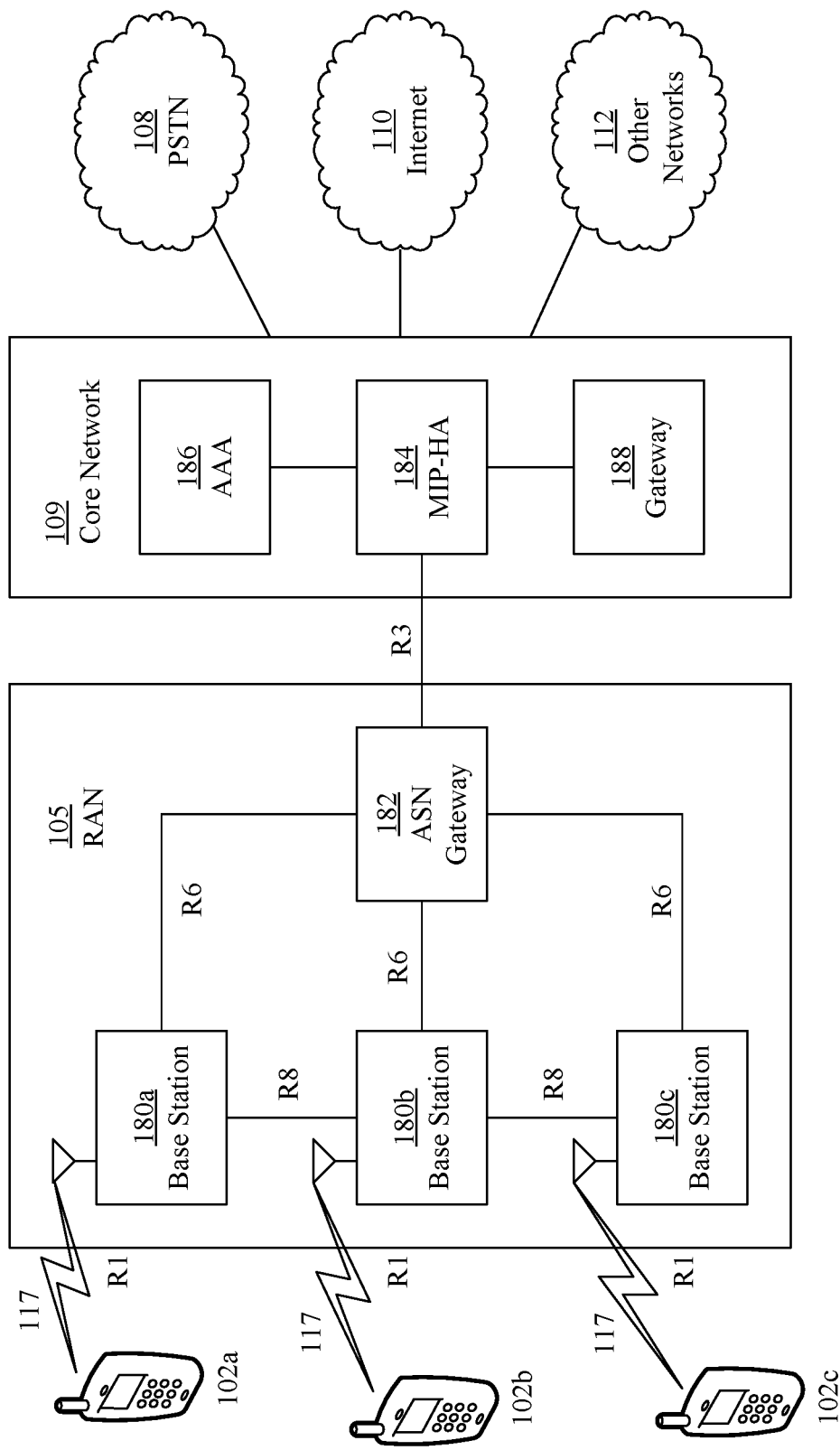
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In some embodiments, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Below is a list of abbreviations and acronyms that may be used herein.
Δf Sub-carrier spacing
NR NR Flexible Radio Access Technology
NRNB NR nodeB
ACK Acknowledgement
BLER Block Error Rate
BTI Basic TI (in integer multiple of one or more symbol duration)
CB Contention-Based (e.g., access, channel, resource)
CoMP Coordinated Multi-Point transmission/reception
CP Cyclic Prefix
CP-OFDM Conventional OFDM (relying on cyclic prefix)
CQI Channel Quality Indicator
CN Core Network (e.g., LTE packet core)
CRC Cyclic Redundancy Check
CSI Channel State Information
CSG Closed Subscriber Group
DC Dual Connectivity
D2D Device to Device transmissions (e.g., LTE Sidelink)
DCI Downlink Control Information
DL Downlink
DM-RS Demodulation Reference Signal
DRB Data Radio Bearer EPC Evolved Packet Core
FBMC Filtered Band Multi-Carrier
FBMC/OQAM A FBMC technique using Offset Quadrature Amplitude Modulation
FDD Frequency Division Duplexing
FDM Frequency Division Multiplexing
ICC Industrial Control and Communications
ICIC Inter-Cell Interference Cancellation
IP Internet Protocol
LAA License Assisted Access
LBT Listen-Before-Talk
LCH Logical Channel
LCP Logical Channel Prioritization
LLC Low Latency Communications
LTE Long Term Evolution e.g., from 3GPP LTE R8 and up
MAC Medium Access Control
NACK Negative ACK
MBB Massive Broadband Communications
MC MultiCarrier
MCS Modulation and Coding Scheme
MIMO Multiple Input Multiple Output
MTC Machine-Type Communications
NAS Non-Access Stratum
OFDM Orthogonal Frequency-Division Multiplexing
OOB Out-Of-Band (emissions)
$P_{cmax}$ Total available UE power in a given TI
PHY Physical Layer
PRACH Physical Random Access Channel
PDU Protocol Data Unit
PER Packet Error Rate
PL Path Loss (Estimation)
PLMN Public Land Mobile Network
PLR Packet Loss Rate
PSS Primary Synchronization Signal
QoS Quality of Service (from the physical layer perspective)
RAB Radio Access Bearer
RACH Random Access Channel (or procedure)
RF Radio Front end
RNTI Radio Network Identifier
RRC Radio Resource Control
RRM Radio Resource Management
RS Reference Signal
RTT Round-Trip Time
SCMA Single Carrier Multiple Access
SDU Service Data Unit
SOM Spectrum Operation Mode
SS Synchronization Signal
SSS Secondary Synchronization Signal
SRB Signalling Radio Bearer
SWG Switching Gap (in a self-contained subframe)
TB Transport Block
TBS Transport Block Size
TDD Time-Division Duplexing
TDM Time-Division Multiplexing
TI Time Interval (in integer multiple of one or more BTI)
TTI Transmission Time Interval (in integer multiple of one or more TI)
TrCH Transport Channel
TRP Transmission/Reception Point
TRx Transceiver
UCI Uplink Control Information (e.g., HARQ feedback, CSI)
UFMC Universal Filtered MultiCarrier
UF-OFDM Universal Filtered OFDM
UL Uplink
URC Ultra-Reliable Communications
URLLC Ultra-Reliable and Low Latency Communications
V2V Vehicle to vehicle communications
V2X Vehicular communications
WLAN Wireless Local Area Networks and related technologies (IEEE 802.xx domain)

A WTRU may be configured to determine that a first set of physical resources utilized by the WTRU for a first transmission mode (TM) at least partially overlaps in frequency with a second set of resources utilized by the WTRU for a second TM. The set of resources associated with the first RAT may include a LTE cell, a set of LTE resources, a set of LTE physical resource blocks (PRBs), etc. The set of resources associated with a second RAT may include a NR cell, a set of NR resources, a set of NR PRBs, etc. When used herein, the term transmission mode (TM) may be used to generally refer to different types of transmissions, for example transmissions using different RATs, transmissions using different waveforms, transmissions using different numerologies (e.g., different subcarrier spacing, TTI length, and/or symbol length, etc.), transmissions received from different transmission/reception point (TRPs), transmissions utilized for different services, and/or the like. As an example, a first transmission mode may be used for massive broadband communications (mBB)-type applications and a second transmission mode may be used for URLLC-type applications. The first transmission mode may be associated with a first RAT (e.g., LTE) and the second transmission mode may be associated with a second RAT (e.g., NR).

For example, a first cell may be associated with a first RAT (e.g., LTE). The second cell may be associated with a second RAT (e.g., NR). The WTRU may determine that a transmission of the second TM associated with the second cell is to be received using resources that at least partially overlap between the first and second cells. Further, although examples may be described with respect to overlapping cells, it may be that resources for transmission that are useable using a first TM may partially overlap with resources for transmission that are useable using a second TM even though the transmission to/from the first and second TMs may be associated with the same cell. For example, first type of NR transmission may be sent using resources that may also be used for a second type of NR transmission. Thus, the techniques described herein are not meant to be limited to transmissions associated with overlapping cells, but are also applicable to resources that may be used by for transmission using multiple types of transmission modes.

In an example, a transmission of a second type of TM may be received over at least the resources that overlap between the first and second cells. A multicast broadcast single frequency network (MBSFN) subframe of a first cell typically associated with a first TM. One or more cell-specific broadcast signals of the first TM of the first cell may be ignored by a receiver when receiving the transmission of the second TM. The WTRU may determine that the transmission uses the resources that overlap between the first and second cells based on DCI received via a control channel of the first TM. The DCI may point to another DCI included in a control channel of the second TM. The WTRU may use the cell-specific broadcast signals of the first cell when performing channel estimation for the transmission of the second TM.

Figure 2:
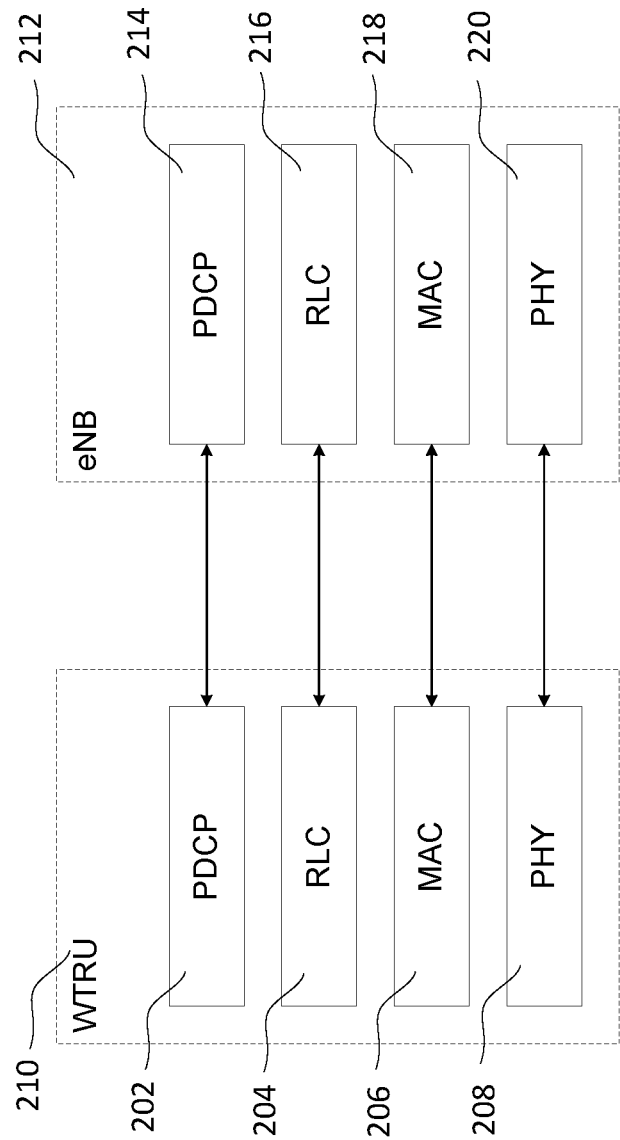
FIG. 2 is an example of a radio protocol architecture for an LTE user plane stack.

FIG. 2 is an example of a radio protocol architecture for an LTE user plane stack. An LTE user plane may comprise, for example, packet data convergence protocol (PDCP) 202 and 214, radio link control (RLC) 204 and 216, MAC 206 and 218, and PHY 208 and 220. A layer or a sublayer may be responsible for a subset of functions that may be used to transfer data from a WTRU 210 to an evolved NodeB 212 (eNB) and from the eNB 212 to the WTRU 210 over a radio medium.

A MAC layer (e.g., the MAC sublayer 206) may offer a number of services and functions including one or more of multiplexing/demultiplexing MAC service data units (SDUs), scheduling information reporting, error correction through HARQ, priority handling between logical channels of a WTRU, priority handling between WTRUs by means of dynamic scheduling, multimedia broadcast multicast service (MBMS) identification, transport format selection, and/or padding. The MAC SDUs that are being multiplexed/demultiplexed may belong to one or more logical channels into/from transport blocks (TBs). The TBs may be delivered to/from the physical layer on transport channels.

Figure 3:
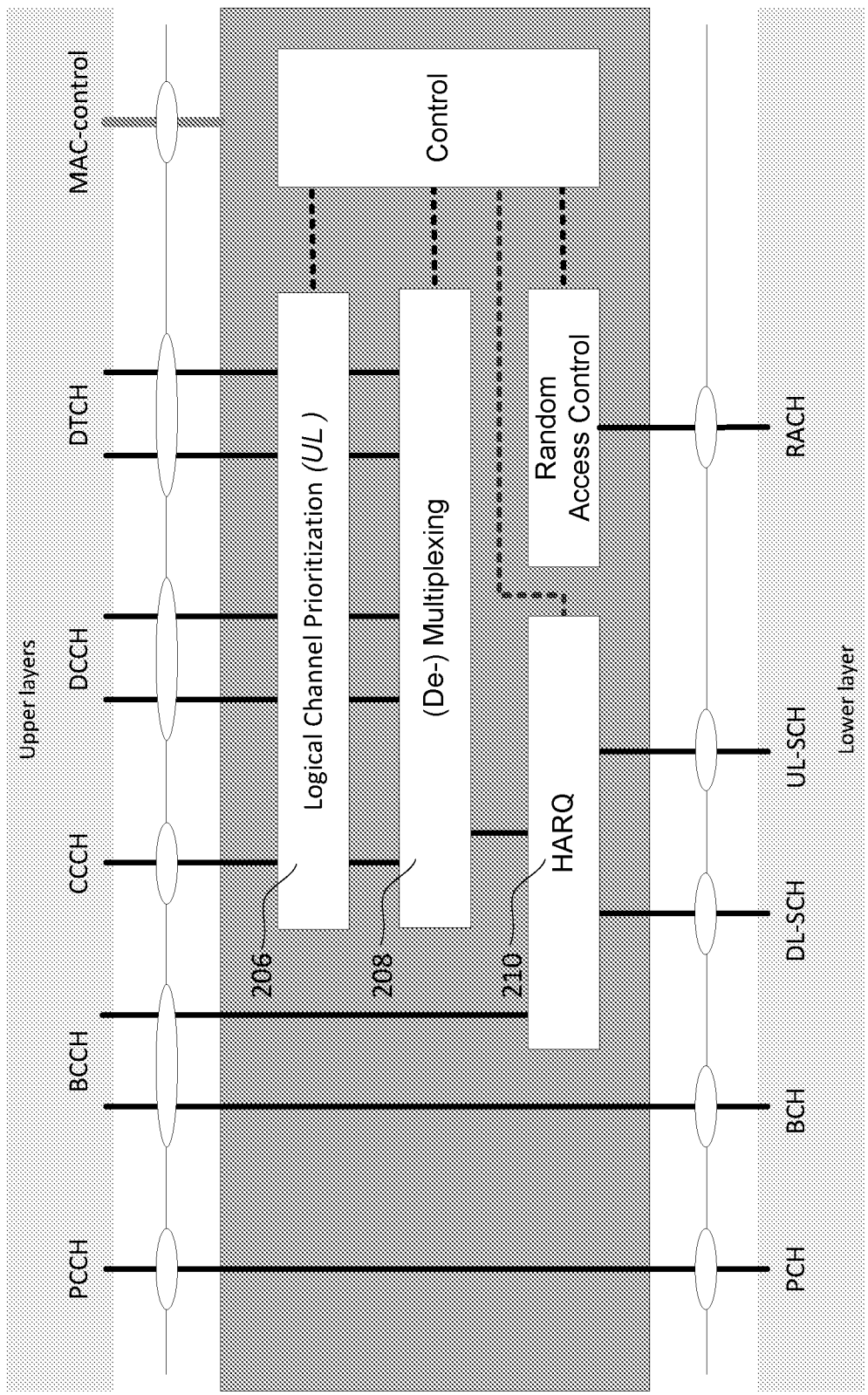
FIG. 3 is an example of LTE medium access control (MAC) architecture.

FIG. 3 is an example of LTE MAC architecture. FIG. 3 illustrates an example of how various functions may interact with each other. Logical channel prioritization 206 and/or multiplexing (or demultiplexing) 208 may be functions used to determine and/or select a set of data to transmit in a transmission time interval (TTI) (e.g., MAC protocol data unit (PDU)). The logical channel prioritization 206 may be specified for an uplink. Hybrid-ARQ (HARQ) functionality 210 may control fast retransmissions over the air. HARQ 210 may rely on fast acknowledgment (ACK)/negative acknowledgment (NACK) feedback. The fast ACK/NACK feedback may be provided by the physical layer, for example, to determine whether a retransmission is or is not to be performed. Multiple concurrent HARQ processes may be used (e.g., up to 8 in LTE). An inherent delay in LTE associated with providing feedback may prompt the use of the multiple concurrent HARQ processes. For example, a receiver may decode/attempt to decode the TB and transmit feedback. A HARQ process may carry a different MAC PDU and/or may operate independently with respect to transmissions and retransmissions.

HARQ retransmissions on an LTE uplink may be synchronous. Transmissions and retransmissions for a MAC PDU may have a fixed time relationship. Synchronous HARQ may use less control signaling. The control signaling and/or a HARQ process may be associated via timing. The association between the control signaling and the HARQ process may be implicit.

HARQ operations on an LTE downlink may be asynchronous. A HARQ process ID may be signaled on a downlink signaling grant. For example, the signaling of the HARQ process ID may be explicit. HARQ ACK/NACK may be sent by a WTRU with a fixed timing, e.g., with respect to an associated transmission (e.g., 4 TTI after).

A flexible air interface may be used for NR to accommodate various scenarios. An NR air interface may enable one or more of the following scenarios: an improved broadband performance (IBB), industrial control and communications (ICC) and vehicular applications (V2X), massive machine-type communications (mMTC), and/or the like. NR may include an NR air interface or other aspects of NR. An NR air interface may be referred to as NR.

To accommodate various scenarios (e.g., supporting relative levels of backward compatibility), NR may support one or more of the following: an ultra-low transmission latency, an ultra-reliable transmission, and MTC operation (e.g., a narrowband operation), and/or the like.

NR may support an ultra-low transmission latency by supporting a range of TTI sizes. Air interface latency may be based on round-trip time (RTT). For example, NR may support shorter TTIs (e.g., 100 us to 250 us) than legacy systems to achieve an air interface latency of 1 ms RTT (e.g., the air interface latency of LTE). NR may support ultra-low access latency. Access latency may be based on time from an initial system access until a completion of a transmission of the first user plane data unit. One or more of use cases may be based on an end-to-end (e2e) latency of less than 10 ms. These use cases may include at least industrial control and communications (ICC) and/or vehicular communications (V2X).

NR may support an ultra-reliable transmission and/or a service reliability. Transmission reliability for NR may be improved over legacy LTE systems. For example, a 99.999% transmission success rate and/or service availability may be achieved. NR may support mobility for speed (e.g., in the range of 0-500 km/h). Packet loss rate (PLR) of less than 10e-6 may be used for one or more of use cases. These use cases may include at least ICC and/or V2X.

NR may support an MTC operation (e.g., by supporting a narrowband operation), an extended battery life, and/or a minimal communication overhead. For example, NR may support a narrowband operation at 200 KHz. NR (e.g., NR airNR interface) may support an extended battery life. For example, the battery life may be up to 15 years of autonomy. NR may support minimal communication overhead for relatively small and/or infrequent data transmissions. For example, NR may support a relatively low data rate in the range of 1-100 kbps with access latency of seconds to hours.

A WTRU may be configured to apply a flexible radio access system for communication. Flexible radio access operations for NR may be referred to herein as NR. The NR may use orthogonal frequency division multiplexing (OFDM) (e.g., at least for the downlink transmission scheme) and/or focus on other waveform candidates than OFDM.

OFDM may be used as a signal format for data transmissions in LTE and in IEEE 802.11. OFDM may divide a spectrum into multiple parallel orthogonal subbands. A subcarrier may be shaped using a rectangular window in the time domain. The shaped subcarrier may lead to sinc-shaped subcarriers in the frequency domain. OFDMA may rely on near-perfect frequency synchronization and/or a tight management of uplink timing alignment within the duration of a cyclic prefix to maintain an orthogonality between signals and/or minimize an inter-carrier interference.

A system where a WTRU is connected to multiple access points relatively simultaneously may use a synchronization or uplink timing alignment. A system where a WTRU is connected to multiple access points relatively simultaneously may not use the perfect frequency synchronization or tight management of uplink timing alignment. Power reduction may be applied to uplink transmissions to comply with spectral emission requirements to adjacent bands. For example, additional power reduction may be applied in the presence of aggregation of fragmented spectrum for a WTRU's transmissions.

Relatively stringent RF requirements for implementations may be applied to avoid having to achieve relatively stringent frequency synchronization requirements. For example, more stringent RF requirements for implementations may be used when operating using a contiguous spectrum. The contiguous spectrum may not use aggregation. A transmission scheme (e.g., a cyclic prefix (CP)-based OFDM transmission scheme) may lead to a use of a downlink physical layer for NR that is similar to a downlink physical layer for a legacy system. A reference signal characteristics (e.g., pilot signal density and location) may be modified.

Flexible radio access may include a transmission scheme based on a multicarrier waveform, spectrum flexibility, scheduling and rate control of multiple modes, and/or block coding. NR may be characterized by use of differing waveforms, spectrum, scheduling, rate control, block coding, etc. for different types of transmissions. A different NR TM may be used for different services and/or data-types.

The transmission scheme for NR may be based on a multicarrier waveform and/or characterized by relatively high spectral containment. For example, the relatively high spectral containment may include relatively lower side lobes and/or relatively lower out-of-band (OOB) emissions. Example MC waveforms for NR may include, but are not limited to, OFDM-offset quadrature amplitude modulation (OQAM) and universal filtered multicarrier (UFMC) (e.g., universal filtered OFDM (UF-OFDM)). Multicarrier modulation waveforms may divide a channel into subchannels. Multicarrier modulation waveforms may modulate data symbols on subcarriers in the subchannels.

With OFDM-OQAM, a filter may be applied in the time domain for a subcarrier to the OFDM signal to reduce OOB. OFDM-OQAM may cause relatively low interference to adjacent bands. OFDM-OQAM may or may not use large guard bands. OFDM-OQAM may include a filter bank multicarrier (FBMC) scheme, and/or may be considered a discrete-time formalization of the staggered multitone (SMT) multicarrier modulation scheme. OFDM-OQAM may or may not use a cyclic prefix. OFDM-OQAM may be a popular FBMC technique. OFDM-OQAM may be sensitive to multipath effects. OFDM-OQAM may be sensitive to high delay spread in terms of orthogonality. OFDM-OQAM may complicate equalization and channel estimation.

With UFMC (e.g., UF-OFDM), a filter may be applied in the time domain to the OFDM signal to reduce OOB. For example, filtering may be applied per subband to use spectrum fragments such that complexity may be reduced. It may be practical to implement UF-OFDM. For example, UF-OFDM may not be expensive in terms of hardware. OOB emissions in the spectrum fragments may remain relatively high. For example, OOB emissions in the fragments may remain as high as those for conventional OFDM when there are unused spectrum fragments in the band. UF-OFDM may improve at the edges of the filtered spectrum. UF-OFDM may or may not improve in the spectral hole. Techniques and procedures described herein may or may not be limited to the waveforms described herein. Techniques and procedures described herein may be applicable to other waveforms. The examples described herein may be applicable to the waveforms described herein and/or other types of waveforms. The uplink and downlink transmission scheme may use same or different waveforms. Multiplexing of transmissions to and/or from different WTRUs in a same cell may be based on FDMA and/or TDMA.

Multicarrier modulation waveforms herein may enable multiplexing of signals with non-orthogonal characteristics in frequency domain and/or co-existence of asynchronous signals. The non-orthogonal characteristics may include different subcarrier spacing for signals in frequency domain. The multicarrier modulation waveforms herein may or may not use complex interference cancellation receivers. The waveforms herein may facilitate an aggregation of fragmented pieces of spectrum and/or the aggregation of fragmented spectrum in the baseband processing. The aggregation of fragmented spectrum in the baseband processing may be a cost alternative to the aggregation of fragmented spectrum as part of RF processing.

Co-existence of different waveforms within a same band may be used to support operations. For example, co-existence of different waveforms within a same band may be used to support an mMTC narrowband operation. Single carrier multiple access (SCMA) may be used to support the mMTC narrowband operation. The different waveforms within the same band may be one or more of the following: CP-OFDM, OFDM-OQAM, UF-OFDM, and/or the like. The support for the combination of one or more of them may be for some or all aspects of the operation. The support for the combination/coexistence of multiple waveforms of one or more of them may be for downlink and/or uplink transmissions. The co-existence of different waveforms may include transmissions using different types of waveforms between different WTRUs. For example, the co-existence of different waveforms may include transmissions from different WTRUs simultaneously. The co-existence of different waveforms may include transmissions from different WTRUs with some overlap. The co-existence of different waveforms may include transmissions from different WTRUs consecutively in the time domain. The co-existence of different waveforms may include transmissions from a WTRU using the multiple waveforms. For example, the co-existence of different waveforms may include transmissions from the WTRU simultaneously using multiple waveforms. The co-existence of different waveforms may include transmissions from the WTRU with some overlap. The co-existence of different waveforms may include transmissions from the WTRU consecutively in the time domain.

Co-existence of different waveforms within a same band may include support for hybrid types of waveforms. The hybrid types of waveforms may include waveforms and/or transmissions that support one or more of a varying CP duration (e.g., from one transmission to another), a combination of a CP and a low power tail (e.g., a zero tail), and/or a form of hybrid guard interval and/or the like. The form of hybrid guard interval may include a low power CP and/or an adaptive low power tail. The waveforms may support dynamic variation and/or control of aspects including aspects associated with filtering. For example, the waveforms may support control of whether filtering is applied at the edge of a spectrum used for reception of a transmission. The waveforms may support control of whether filtering is applied at the edge of the spectrum used for reception of a transmission(s) for a given carrier frequency. The transmission may be associated with a spectrum operating mode (SOM), or per subband, or per group of subbands.

The transmission scheme may be based on spectrum flexibility, and the spectrum flexibility may include flexibility in duplexing arrangement, bandwidth flexibility, flexible spectrum allocation, spectrum aggregation, and/or flexible timing. NR radio access may be associated with a relatively high degree of spectrum flexibility. The spectrum flexibility may enable deployment in different frequency bands with different characteristics. The deployment may include one or more of the following: different duplex arrangements, different and/or variable sizes of the available spectrum including contiguous and non-contiguous spectrum allocations in the same or different bands. The spectrum flexibility may support variable timing aspects including support for multiple TTI lengths and/or support for asynchronous transmissions.

The spectrum flexibility may include flexibility in duplexing arrangement. NR may use flexibility in duplexing arrangement. TDD and/or FDD duplexing schemes may be supported. For FDD operation, supplemental downlink operation may be supported using spectrum aggregation. FDD operation may support full-duplex FDD and/or half-duplex FDD operation. For TDD operation, the DL/UL allocation may be dynamic. For example, the DL/UL allocation may or may not be based on a fixed DL/UL frame configuration. The length of a DL or a UL transmission interval may be set per transmission opportunity.

The spectrum flexibility may include bandwidth flexibility. NR may use bandwidth flexibility. NR may enable different transmission bandwidths on uplink and/or downlink transmissions. The transmission bandwidths may range from a nominal system bandwidth to a maximum value corresponding to a system bandwidth. The supported system bandwidths may be a bandwidth in a range. For example, the range may be one from a few MHz up to 160 MHz. For a single carrier operation, the supported system bandwidths may include one or more of the following: 5, 10, 20, 60, and 80 MHz. Nominal bandwidths may have one or more fixed values. For example, narrowband transmissions of up to 200 KHz may be supported within the operating bandwidth for MTC devices. NR may be considered and/or used for a type of NR transmission.

Figure 4:
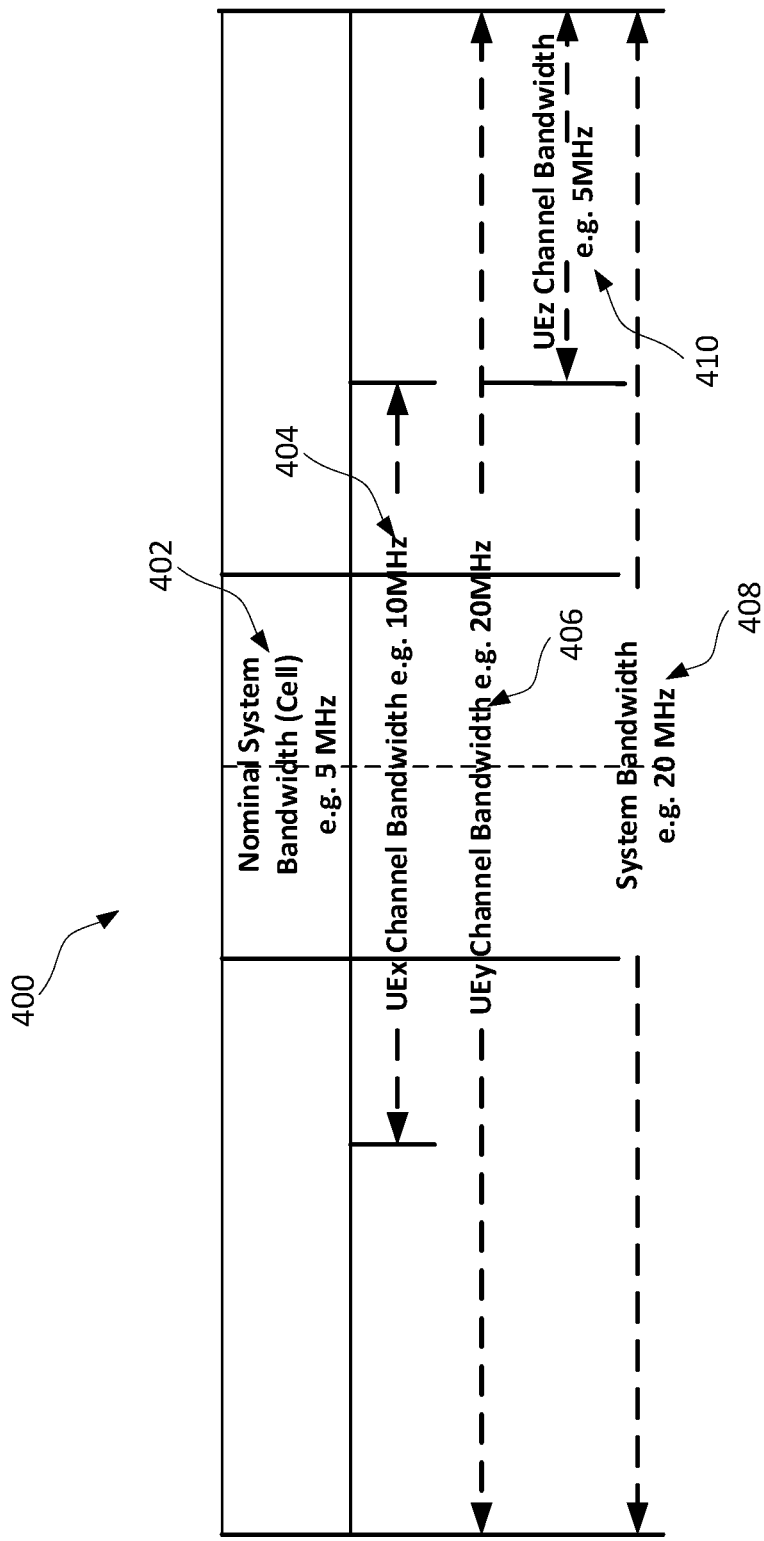
FIG. 4 is an example of transmission bandwidths.

FIG. 4 illustrates an example of transmissions bandwidths (400). System bandwidth herein may refer to the largest portion of spectrum that the network may be able to manage for a given carrier (e.g., 408). Nominal system bandwidth may refer to a portion that a WTRU minimally supports for cell acquisition, measurements and initial access to the network for the carrier (e.g., 402). The WTRU may be configured to use a channel bandwidth (e.g., 404, 406, and 410) that is within the range of the system bandwidth. FIG. 4 shows that the WTRU's configured channel bandwidth may or may not include the nominal part of the system bandwidth.

Bandwidth flexibility may be achieved through support of baseband filtering of the frequency domain waveform. For example, some or all applicable sets of RF requirements for an (e.g., a given maximum) operating bandwidth in a band may be met. Additional allowed channel bandwidths for that operating band may or may not be introduced. For example, additional allowed channel bandwidths for that operating band may or may not be introduced when support of baseband filtering of the frequency domain waveform is efficient. Implementations may be provided to configure, reconfigure and/or dynamically change a WTRU's channel bandwidth for single carrier operation. Implementations may be provided to allocate spectrum for narrowband transmissions within a nominal system, system or configured channel bandwidth.

A physical layer of an NR air interface may be band-agnostic and/or may support operation in licensed bands below 5 GHz and/or operation in unlicensed bands in the range 5-6 GHz. Listen-before-talk (LBT) Cat 4 based channel access framework, e.g., similar to LTE License assisted access (LAA), may be supported, for example, for operation in unlicensed bands.

Cell-specific and/or WTRU-specific channel bandwidths for arbitrary spectrum block sizes may be scaled and managed, for example, using scheduling, addressing of resources, broadcasted signals, measurements, etc.

The spectrum flexibility may include flexible spectrum allocation. NR may use flexible spectrum allocation. Downlink control channels and/or signals may support FDM operation. A WTRU may acquire a downlink carrier by receiving transmissions using the nominal part of the system bandwidth. For example, the WTRU may not initially receive transmissions covering the bandwidth that is being managed by the network for the concerned carrier. Downlink data channels may be allocated over a bandwidth that may not correspond to the nominal system bandwidth. Downlink data channels may be allocated with or without restrictions. For example, a restriction may be being within the WTRU's configured channel bandwidth. For example, the network may operate a carrier with a 12 MHz system bandwidth and a 5 MHz nominal bandwidth. Devices may support a maximum RF bandwidth of 5 MHz to acquire and/or access the system. The devices may allocate +10 to −10 MHz of the carrier frequency to other WTRU's supporting up to 20 MHz worth of channel bandwidth.

Figure 5:
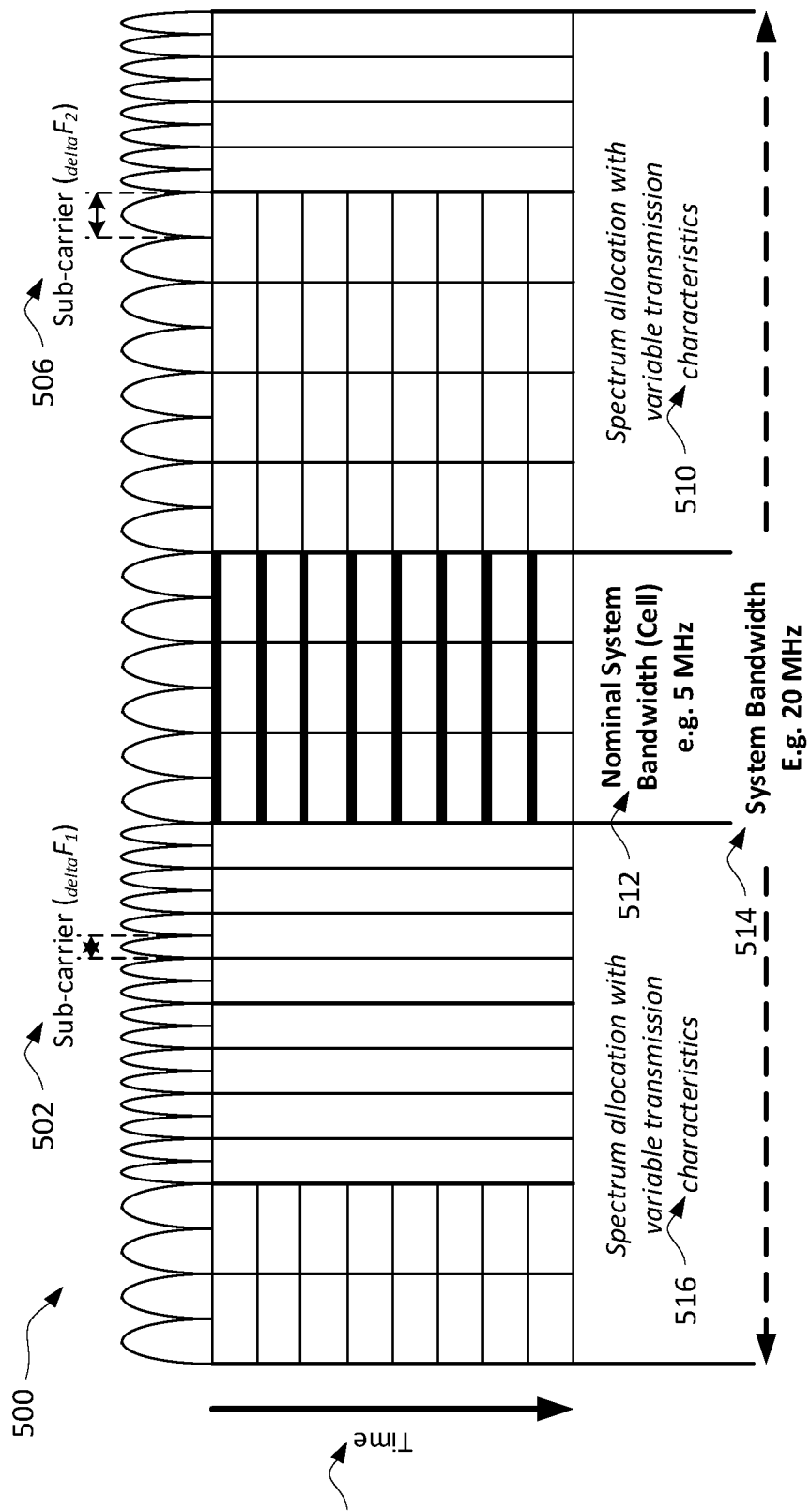
FIG. 5 is an example of spectrum allocation where different subcarriers may be assigned to different modes of operation.

FIG. 5 may be an example of spectrum allocation 500 where different subcarriers may be conceptually assigned to different modes of operation. Within the system bandwidth 514, different frequency resources may be associated with different transmission modes/types. For example, the nominal system bandwidth 512 may be used for a first transmission mode (e.g., LTE). The portions of the spectrum corresponding to bandwidth 510 and/or bandwidth 516 may be associated with one or more different transmission modes than that used in nominal bandwidth 512. For example, different numerologies may be used for assigning resources in bandwidth(s) 516, 510 than is used for nominal bandwidth 512. For example, the subcarrier spacing may be different for each of bandwidths 510, 512, 516. The bandwidth 510 and bandwidth 516 may be associated with variable transmission characteristics. For example, the bandwidth for subcarrier 502 and subcarrier 506 may differ.

Different SOM may be used for different transmissions. A SOM may include one or more of the following parameters: a subcarrier spacing, a waveform type, a TTI length, and/or a reliability aspect(s). Different SOMs may be associated with different numerologies used for defining transmission resources. The terms SOM and numerology may be used interchangeably. For example, a reliability aspect used to define a SOM and/or numerology may include HARQ processing aspects and/or an identity of a secondary control channel. A SOM may refer to a specific waveform. Multiple types of waveforms may be used for one or more SOM types. A SOM may be related to or defined by a processing aspect to be performed by the transmitter and/or receiver. For example, a SOM may support co-existence of different waveforms in the same carrier using FDM and/or TDM. Coexistence of FDD operation in a TDD band may be supported, e.g., in a TDM manner or similar manner.

A WTRU may be configured to perform transmissions according to one or more SOMs. For example, a SOM/numerology may correspond to transmissions that use and/or are defined by one or more of a TTI duration, an initial power level, a HARQ processing type, an upper bound for successful HARQ reception/transmission, a transmission mode, a physical channel (uplink or downlink), an operating frequency, band or carrier, a specific waveform type or transmission according to a RAT (e.g., for NR or LTE). A SOM may correspond to a QoS level and/or related aspect (e.g., maximum/target latency, maximum/target block error rate (BLER) or similar). A SOM may correspond to a spectrum area and/or to a control channel or aspect thereof (e.g., search space, downlink control information (DCI) type). For example, a WTRU may be configured to use a SOM for a ultra-reliable communications (URC) type of service, a low latency communication (LLC) type of service and/or a mBB massive broadband ctype of service. A WTRU may have a configuration for a SOM for system access and/or for transmission/reception of layer 3 (L3) control signaling (e.g., RRC), such as in a portion of a spectrum associated with the system (e.g., nominal system bandwidth).

The spectrum flexibility may include spectrum aggregation. NR may use spectrum aggregation. For a single carrier operation, spectrum aggregation may be supported. For example, spectrum aggregation may be supported when a WTRU supports transmission and reception of multiple transport blocks over contiguous and/or non-contiguous sets of physical resource blocks (PRBs) within an operating band. A single transport block may be mapped to separate sets of PRBs. Support for simultaneous transmissions associated with different SOM requirements may be used.

A multicarrier operation may be supported using contiguous and/or non-contiguous spectrum blocks within an operating band. Multicarrier operation may be supported using contiguous and/or non-contiguous spectrum blocks across two or more operating bands. Aggregation of spectrum blocks using different modes (e.g., FDD and TDD) may be supported. Aggregation of spectrum blocks using different channel access techniques may be supported. For example, licensed and unlicensed band operation below 6 GHz may be supported.

Support for techniques and/or procedures that configure, reconfigure, and/or dynamically change the WTRU's multicarrier aggregation may be used.

The spectrum flexibility may include flexible framing, timing, and/or synchronization. Downlink and uplink transmissions may be organized into radio frames. The radio frames may be characterized by a number of fixed aspects (e.g., a location of downlink control information) and/or a number of varying aspects (e.g., transmission timing, supported types of transmissions).

The basic time interval (BTI) may comprise an integer number of one or more symbol(s). Symbol duration may be a function of a subcarrier spacing applicable to the time-frequency resource. For FDD, subcarrier spacing may differ between the uplink carrier frequency $f_{UL}$ and/or the downlink carrier frequency $f_{DL}$ for a frame.

A transmission time interval (TTI) may be used to demarcate timing of transmission and/or the minimum time supported by the system between consecutive transmissions. A consecutive transmission may be associated with different transport blocks (TBs) for the downlink ($TTI_{DL}$) and for the uplink (UL TRx). The UL TRx may exclude a preamble, if applicable. The UL TRx may include control information. For example, the control information may be a DCI for downlink and/or UCI for uplink. A TTI may be expressed in terms of integer number of one of more BTI(s). A BTI may be associated with a SOM, and a SOM may be associated with different BTI lengths. Supported frame duration may include 100 us, 125 us or ⅛ ms, 162.85 us (e.g., ½ ms is 2 nCP LTE OFDM symbols), and 1 ms. Such supported frame durations may enable alignment with the legacy LTE timing structure.

Figure 6:
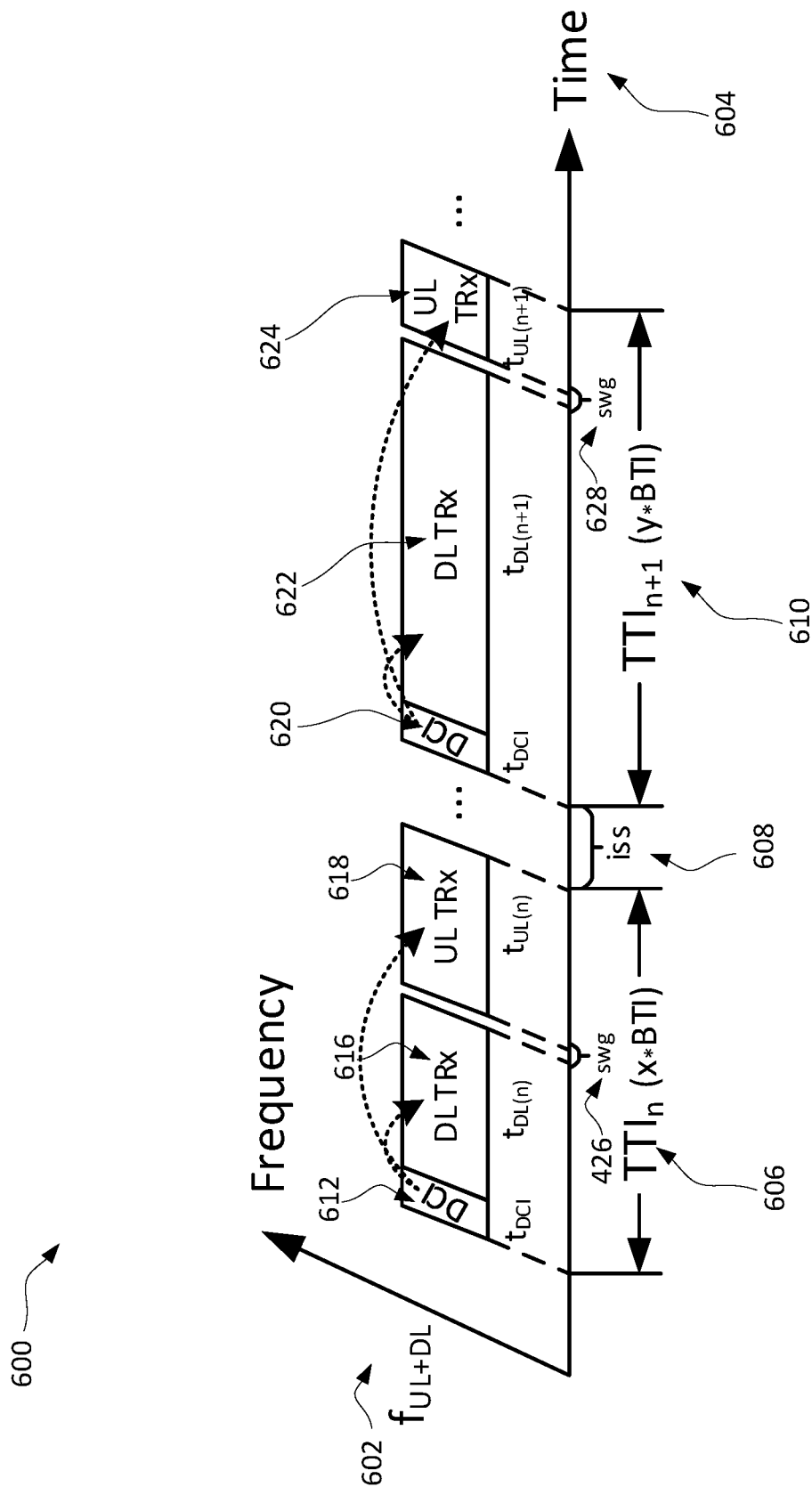
FIG. 6 is an example of timing relationships for time division duplexing (TDD).

Fixed framing aspects may be used in time domain and/or frequency domain. FIG. 6 illustrates an example of timing relationships 600 for time-division duplexing. In a time 604 and frequency 602 domain, a frame (e.g., 606 and 610) may start with a DCI (e.g., 612 and 620, respectively) of a fixed time duration $t_{dci}$ preceding a downlink data transmission (DL TRx) (e.g., 616 and 622, respectively) for the concerned carrier frequency—$f_{UL+DL}$ for TDD (e.g., 602) and $f_{DL}$ (e.g., 502) for FDD. For TDD duplexing, a frame may include a downlink portion (e.g., DCI 612 and 620 and DL TRx 626 and 622) and/or an uplink portion (e.g., UL TRx 618 and 624). A switching gap (swg hereafter) (e.g., 626 and 628) may precede the uplink portion of the frame, if present. The number of resources (e.g., 608) may represent a position of the frame 606 relative to the frame 610.

Figure 7:
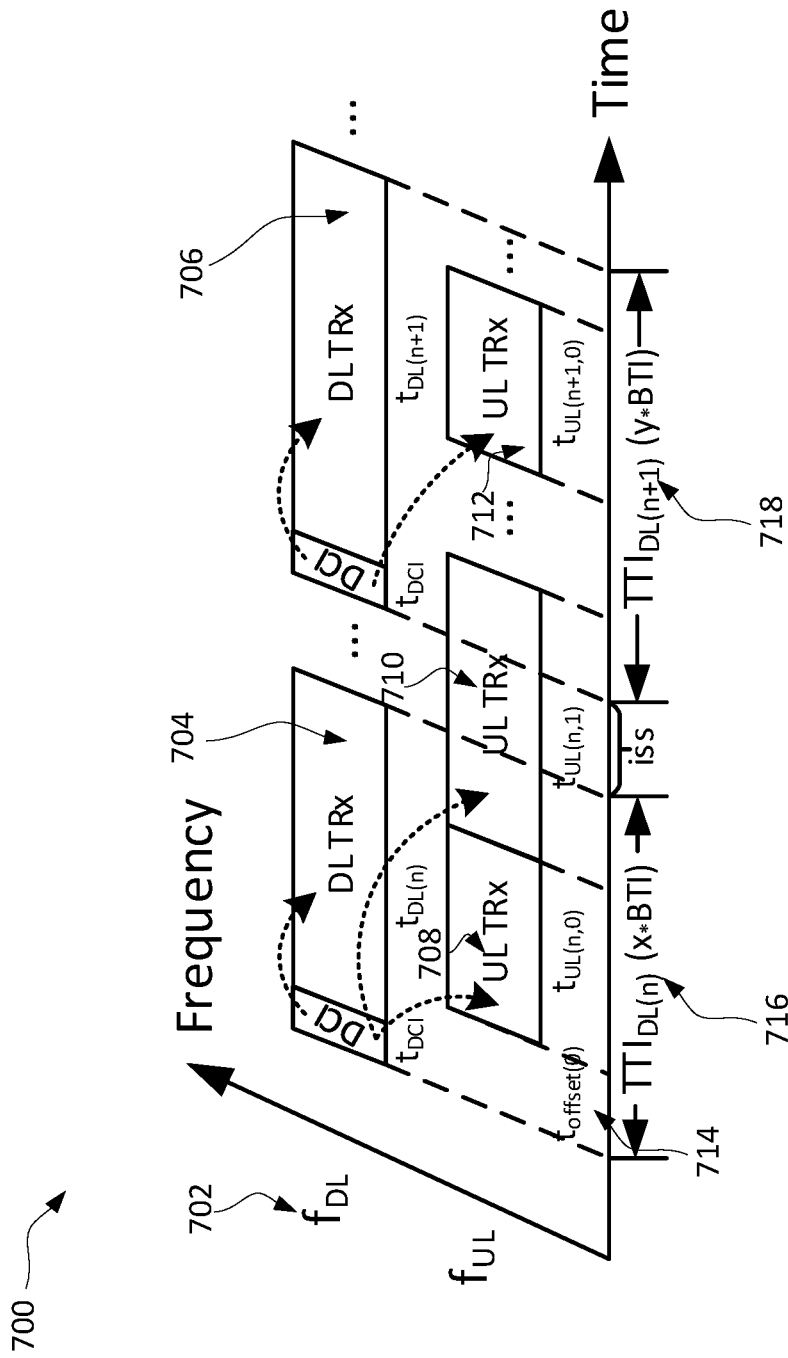
FIG. 7 is an example of timing relationships for frequency division duplexing (FDD).

FIG. 7 illustrates an example of timing relationships 700 for frequency-division duplexing. For FDD, a frame (e.g., 716 and 718) may include a downlink reference TTI (e.g., 704 and 706) and/or one or more TTI(s) for the uplink (e.g., 708, 710, and 712). The start of an uplink TTI (e.g., 708) may be derived using an offset ($t_{offset}$) (e.g., 714). The $t_{offset}$ 714 may be applied from the start of the downlink reference frame 704. The start of the downlink reference frame (e.g., 704 and 706) may overlap with the start of the uplink frame (e.g., 708, 710, and 712).

For TDD, NR may support D2D/V2x/Sidelink operation in the frame. NR may include respective downlink control and/or forward direction transmission in the DCI+DL TRx portion. For example, NR may include respective downlink control and/or forward direction transmission in the DCI+DL TRx portion when a semi-static allocation of the respective resources is used. NR may include respective downlink control and/or forward direction transmission in the DCI+DL TRx portion in the DL TRx portion. For example, NR may include respective downlink control and/or forward direction transmission in the DCI+DL TRx portion in the DL TRx portion for dynamic allocation. NR may include the respective reverse direction transmission in the UL TRx portion. For FDD, NR may support D2D/V2x/Sidelink operation in the UL TRx portion of the frame by including one or more of the following: respective downlink control, forward direction transmissions in the UL TRx portion, reverse direction transmissions in the UL TRx portion (e.g., dynamic allocation of the respective resources may be used), and/or the like. For example, forward direction transmissions in the UL TRx portion and/or reverse direction transmissions in the UL TRx portion may occur when dynamic allocation of the respective resources may be used. FIG. 6 is an example of a frame structure (e.g., TDD). FIG. 7 is an example of a frame structure (e.g., FDD).

The transmission scheme may be based on scheduling and rate control of multiple modes. The scheduling and rate control may include network-based scheduling, WTRU-based scheduling, and/or logical channel prioritization. A scheduling function may be supported in the MAC layer. One or more of the scheduling modes may be supported: network-based scheduling for tight scheduling in terms of resources, timing and transmission parameters of downlink transmissions and/or uplink transmissions, WTRU-based scheduling for more flexibility in terms of timing and transmission parameters, and/or the like. Scheduling information may be valid for a single TTI or for multiple TTIs for one or more of the scheduling modes herein.

NR may support a network-based scheduling. A network-based scheduling may enable the network to manage the available radio resources assigned to different WTRUs. For example, the management may include optimizing the sharing of the available radio resources assigned to different WTRUs. Dynamic scheduling may be supported.

NR may support a WTRU-based scheduling. A WTRU-based scheduling may enable the WTRU to opportunistically access uplink resources. A WTRU-based scheduling may enable minimal latency on a per-need basis within a set of shared or dedicated uplink resources assigned (e.g., dynamically) by the network. Both synchronized and unsynchronized opportunistic transmissions may be considered. Both contention-based transmissions and contention-free transmissions may be considered. Support for opportunistic transmissions (e.g., scheduled or unscheduled) may be included. For example, support for opportunistic transmissions (e.g., scheduled or unscheduled) may be included to meet the ultra-low latency requirements for NR and/or the power saving requirements of the mMTC use cases.

NR may support logical channel prioritization. NR may support a form of an association between data available for transmission and/or available resources for uplink transmissions. Multiplexing of data with different quality of services (QoS) requirements within a transport block may be considered. For example, multiplexing of data with different QoS requirements within the transport block may be supported when the multiplexing may not introduce negative impact to a service with a stringent QoS requirement. Multiplexing of data with different QoS requirements within the transport block may be supported when the multiplexing may not introduce unnecessary waste of system resources.

NR may support forward error correction (FEC) and/or block coding. A transmission may be encoded using a number of different encoding techniques. Different encoding techniques may have different characteristics. For example, an encoding technique may generate a sequence of information units. An information unit and/or block, may be self-contained. For example, an error in the transmission of a first block may not impair the ability of the receiver to successfully decode a second block. An error in the transmission of a first block may not impair the ability of the receiver to successfully decode a second block if the second block is error-free. An error in the transmission of a first block may not impair the ability of the receiver to successfully decode a second block if sufficient redundancy may be found in the second block and/or in a different block for which at least a portion was successfully decoded.

Examples of encoding techniques may include raptor/fountain codes. A transmission may include a sequence of N raptor codes. One or more codes may be mapped to one or more transmission symbol in time. A symbol may correspond to one or more set of information bits (e.g., one or more octets). The encoding may be used to add FEC to a transmission. The transmission may use N+1 or N+2 raptor codes or symbols (e.g., when a one raptor code symbol relationship is assumed). The transmission may be resilient to the loss of a symbol. The interference and/or puncturing by another transmission overlapping in time may make the transmission resilient to the loss of one symbol.

A WTRU may be configured to receive and/or detect one or more system signatures. A system signature may include a signal structure using a sequence. A signal may be similar to a synchronization signal (e.g., similar to LTE primary synchronization signal (PSS) and/or secondary synchronization signal (SSS)). A signature may be specific (e.g., uniquely identified) to a node and/or a TRP within an area. A signature may common to a plurality of nodes and/or TRPs within an area. Whether the signature is specific or common may not be known and/or relevant to a WTRU. A WTRU may determine and/or detect a system signature sequence. A WTRU may determine one or more parameters associated with a system. For example, a WTRU may derive an index therefrom and/or may use the derived index to retrieve associated parameters. For example, the associated parameters may be within a table such as an access table. The signature may be associated with a received power and/or a certain timing. A WTRU may use the received power associated with a signature for open-loop power control, for example, to set an initial transmission power. A WTRU may use the received power associated with a signature for open-loop power control when the WTRU determines that the WTRU may access (and/or transmit to) using applicable resources of the system. A WTRU may use the timing of a received signature sequence, for example, to set timing of a transmission. The timing of the transmission may include a preamble on a physical random access channel (PRACH) resource. The WTRU may use the timing of a received signature sequence when the WTRU determines that the WTRU may access (and/or transmit) using applicable resources of the system.

A WTRU may be configured to use an access table containing a list of one or more entries. The list may be indexed whereby an entry may be associated with a system signature and/or with a signature sequence. An access table may provide initial access parameters for one or more areas. An entry may provide one or more parameters that are used to perform an initial access to the system. The parameters may include at least one of a set of one or more random access parameters. The random access parameters may include applicable physical layer resources (e.g., PRACH resources) in time and/or frequency, initial power level, physical layer resources for reception of a response, and/or the like. The parameters may include access restrictions, such as public land mobile network (PLMN) identity and/or closed subscriber group (CSG) information. The parameters may include routing-related information, such as applicable routing area(s). An entry may be associated with (and/or indexed by) a system signature. An entry may be common to a plurality of nodes and/or TRPs. A WTRU may receive an access table via a transmission using dedicated resources (e.g., by RRC configuration). A WTRU may receive an access table via a transmission using broadcast resources. A periodicity of a transmission of an access table may be relatively long (e.g., up to 10240 ms). A periodicity of a transmission of an access table may be longer than the periodicity of the transmission of a signature (e.g., in the range of 100 ms).

An NR network deployment may be forward compatible and/or support a wide range of radio access technologies (RATs) including ultra-reliable and low latency communications (URLLC), mMTC, and enhanced mobile broadband (eMBB). An NR network deployment may utilize a waveform and/or a protocol stack that is different from that of a legacy system. The legacy system may include LTE or an evolution thereof. An NR network may use components, functions, layers and/or the like that are different from those of a legacy system. An NR network may be deployed as a stand-alone system without an integration with a legacy system. The NR network may be deployed using a dedicated spectrum. For example, the NR network may be deployed using a dedicated spectrum when an NR network is further adopted.

The NR network may be deployed by phases. In certain phases, such as initial phases, the NR network may be integrated with a legacy system. The integration with the legacy system may enable the deployment of NR and/or NR-based technologies. An NR network deployment may be combined with deployments and/or technologies of a legacy system (e.g., deployed under the umbrella of an LTE system). The deployments and/or technologies of a legacy system may be adopted and/or adapted to be used in the NR network deployment. For example, the radio access network components, core network components and/or the like of the legacy system may be adopted and/or adapted to be used in the NR network deployment (e.g., an LTE-assisted deployment).

In the LTE-assisted deployment, an LTE network may provide cellular functions (e.g., mobility to/from LTE and/or core network functions). An NR system may provide technologies to support the cellular functions and/or supplement other functions for an integration with the LTE network. The integration between a legacy system and one or more deployments and/or technologies of the NR system may be carried out in one or more layers of one or more applicable protocol stack(s). For example, the NR network may be deployed in various architectures where the integration of the legacy system and the NR technologies are carried out in different protocol stacks.

Figure 8:
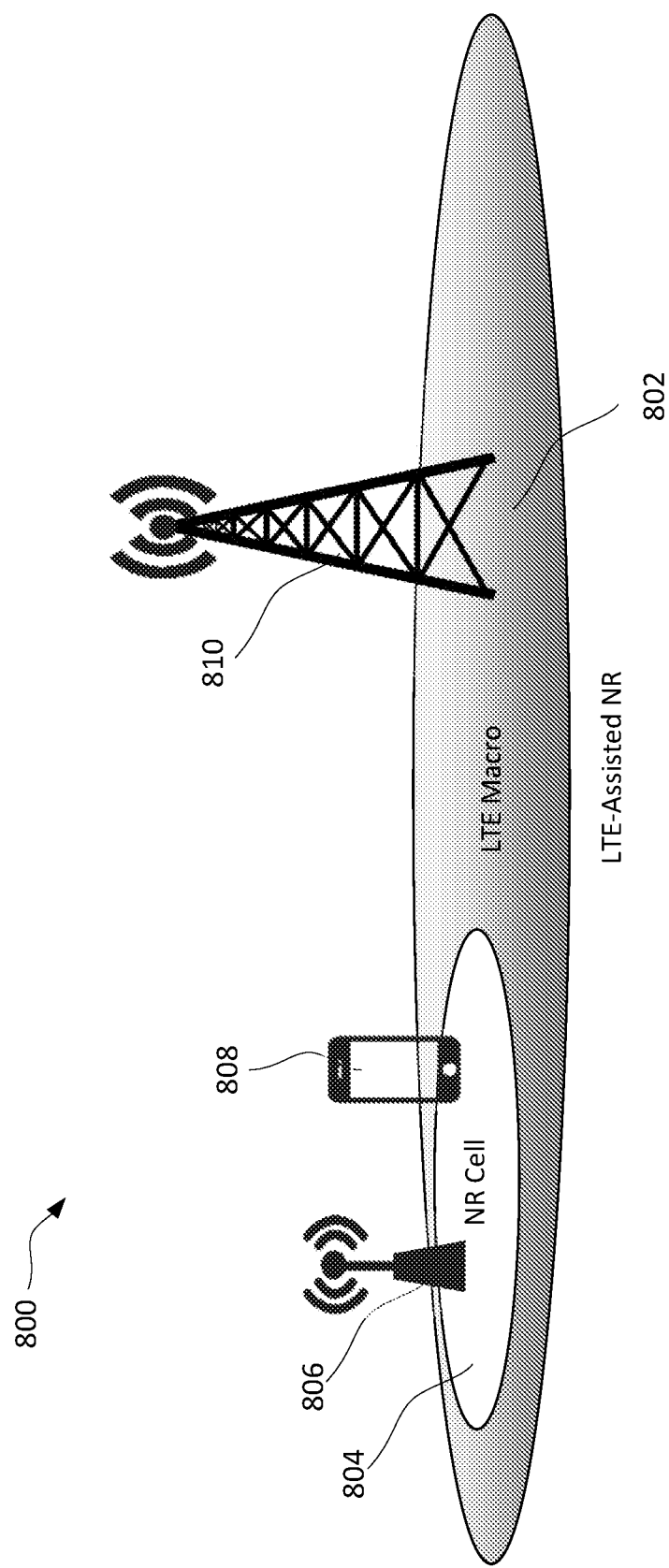
FIG. 8 is an example of an LTE-assisted and unassisted NR deployment.

FIG. 8 is an example of an LTE-assisted NR deployment. As shown in FIG. 8, an architecture 800 may support LTE deployment and NR deployment. The cell in FIG. 8 may be example of a set of resources, a set of PRBs, a spectrum etc. For example, the LTE cell in FIG. 8 may be examples of a set of LTE resources, a set of LTE PRBs, an LTE spectrum etc. The NR cells in FIG. 8 may be examples of a set of NR resources, a set of NR PRBs, an NR spectrum etc. In the example shown in FIG. 8, an LTE cell 802 may operate in a similar region as an NR cell 804 that is served by an NR RAN node 806. A WTRU 808 may be located within the NR cell 804. The LTE cell 802 may be served by the LTE RAN 810. The WTRU 808 may be configured to access NR cell 804 and LTE cell 802. The bandwidth of the NR cell 804 and LTE cell 802 may partially (or at least partially) overlap. Although NR cell 804 and LTE cell 802 are shown to be served by separate RAN entities in FIG. 8 (e.g., NR RAN 806 and LTE RAN 810, respectively), NR cell 804 and LTE cell 802 may be served by a single TRP in some examples (e.g., a TRP with multi-mode capabilities).

In the LTE-assisted deployment, one or more WTRUs with varying capabilities may be supported. A WTRU (e.g., a WTRU with LTE capabilities) may have capabilities to send transmissions to and/or receive transmissions using a set resources associated with LTE over a spectrum (e.g., an LTE spectrum). For example, the set of resources associated with the LTE may include a LTE cell, a set of LTE resources, a set of LTE physical resource blocks (PRBs), an LTE spectrum etc. A WTRU (e.g., a WTRU with LTE capabilities) may have capabilities to send transmissions to and/or receive transmissions using a set of resources associated with. The set of resources associated with NR may include a NR cell, a set of NR resources, a set of NR PRBs, NR spectrum etc. The WTRU may have capabilities to send transmissions to and/or receive transmissions from an overlapping portion of the set of LTE resources and the set of NR resources. For example, the NR network may be deployed using a spectrum that overlaps a spectrum used by the legacy system. When the set of LTE resources and the set of NR resources overlap, an LTE transmission (e.g., the transmissions from an LTE cell) may interfere with an NR transmission (e.g., the transmissions from an NR cell). The WTRU with LTE capabilities may not be able to detect the LTE transmission and/or signals (LTE transmissions hereafter) due to the interferences. The interference may be prevented or avoided by various approaches that manage radio access architectures, protocol stacks, and/or physical resources. Channels and/or carriers may be used for the various approaches that manage radio access architectures, protocol stacks, and/or physical resources.

Channels and/or carriers may be developed to support LTE-assisted and/or unassisted NR architectures. The channels may include logical channels (LCHs), logical channel groups (LCGs) and/or transport channels (TrCHs). A logical channel (LCH) may include a logical association between a data packet and other data packets, or a PDU and other PDUs. In an NR architecture, a LCH may have a different and/or broader meaning than a similar term for a legacy architecture such as an LTE system. For example, a logical association may be established if data packets, data units and/or PDUs are associated with a same bearer. A logical association may be established if data packets, data units and/or PDUs are associated with a same SOM. A logical association may be established if data packets, data units and/or PDUs are associated with a same slice. For example, the slice may include a processing path using a set of physical resources. In an example, an association may be characterized by one or more of a chaining of processing functions, an applicable physical data (and/or control) channel (or instance thereof) and/or an instantiation of a protocol stack. The instantiation of a protocol stack may include a portion being centralized such as layers, components or functions beyond portions of physical layer processing (e.g., radio front (RF) end) and/or a portion being close to the edge such as MAC/PHY in the TRP or RF. The layers, components or functions beyond portions of the physical layer processing may include PDCP or other layers. The portion being close to the edge may be separated by a fronthauling interface.

A logical channel group (LCG) may comprise a group of LCH(s) and/or the like (e.g., as described herein). In an NR architecture, an LCG may have a different and/or broader meaning than a similar term for a legacy architecture such as an LTE system. A grouping may be based on one or more criterion. In the one or more criterion, one or more LCH(s) of an LCG may have a similar priority level that is applicable to some or all LCHs of the LCG (e.g., similar to a legacy architecture such as an LTE system). In the one or more criterion, one or more LCH(s) of an LCG may be associated with a same SOM (or type thereof). In the one or more criterion, one or more LCH(s) of an LCG may be associated with a same slice (or type thereof). In an example, an association may be characterized by one or more of a chaining of processing functions, an applicable physical data (and/or control) channel (or instance thereof) and/or an instantiation of a protocol stack. The instantiation of a protocol stack may include a portion being centralized such as layers, components or functions beyond portions of the physical layer processing (e.g., radio front (RF) end) and a portion being close to the edge such as MAC/PHY in the TRP or RF. The layers, components or functions beyond portions of the physical layer processing may include PDCP or other layers. The portion being close to the edge may be separated by a fronthauling interface.

Transport channel (TrCH) may comprise a set of processing steps and/or functions. The set of the processing steps and/or functions may be applied to data and/or information. The data and/or information may affect one or more transmission characteristics over a radio interface.

A RAT may include one or more types of TrCHs. For example, for a legacy such as an LTE RAT, the types of TrCHs may include one or more of a broadcast channel (BCH), a paging channel (PCH), a downlink shared channel (DL-SCH), a multicast channel (MCH), an uplink shared channel (UL-SCH), a random access channel (RAC), and/or the like. The RAC may or may not carry user plane data. DL-SCH may carry user plane data for the downlink. UL-SCH may carry user plane data for the uplink. DL-SCH and/or UL-SCH may be primary types of transport channels for carrying user plane data.

A TrCH in an NR architecture may have a different and/or broader meaning than a similar term for a legacy architecture such as an LTE system. An augmented set of characteristics and/or requirements supported by the air interface may use support for multiple transport channels (e.g., for user and/or control plane data) for a WTRU. For example, a TrCH for URLLC (e.g., URLLCH), for mobile broadband (MBBCH) and/or for machine type communications (MTCCH) may be used for downlink transmission (e.g., DL-URLLCH, DL-MBBCH and DL-MTCCH, respectively). A TrCH for URLLC (e.g., URLLCH), for MBBCH and/or for MTCCH may be used for uplink transmissions (e.g., UL-URLLCH, UL-MBBCH and UL-MTCCH, respectively).

Multiple TrCH may be mapped to a different set of physical resources that (e.g., PhCH) belong to a SOM. Simultaneous transmission of traffic with different requirements may be transported over the SOM. In an example, a URLLCH may be transmitted along MTCCH simultaneously when a WTRU is configured to use the SOM.

A WTRU may be configured to use one or more parameters associated with a characterization of how data is to be transmitted. For example, the parameters may include quality of service (QoS)-based parameters for data. A characterization may represent constraints and/or requirements that a WTRU may be expected to meet and/or enforce. A WTRU configured to use one or more parameters associated with a characterization may perform different operations as a function of a state associated with data and/or based on the characterization. A WTRU configured to use one or more parameters associated with a characterization may adjust behaviors as a function of a state associated with data and/or based on the characterization. Parameters may include, for example, time-related aspects, rate-related aspects and/or configuration related aspects (e.g., absolute priority). The time-related aspects may include time to live (TTL) for a packet. TTL may represent the time before which the packet is to be transmitted, acknowledged, and/or the like to meet latency requirements. Parameters may be changed with time while the packet or data is pending for transmission.

Various radio access architectures may be implemented to support an integration of the LTE network and the NR system. A system may support NR with LTE-assisted radio access (e.g., LTE-assisted NR radio access). The NR system may be integrated with a system that may support one or more aspects of LTE radio access. Systems, methods and/or instrumentalities may be developed to realize a radio access that supports at least one NR physical channel using one or more components of an LTE system. The aspects of LTE radio access may include LTE control plane and/or cell-specific components such as broadcast signals (e.g., PSS, SSS, master information block (MIB), system information blocks (SIBs) and/or the like).

LTE-assisted NR radio access may be realized using various approaches. The approaches may include one or more of a multi-connectivity/layer approach, a carrier aggregation approach, a superposition-based approach, and/or a substitution-based approach. A control plane based on LTE or an evolution thereof (e.g., L3/RRC connnections and related behaviors) may be used in one or more of the approaches in support of NR control and/or configuration aspects. In a multi-connectivity/layer approach, a carrier aggregation approach and/or a superposition-based approach, a separate MAC instance may be used for NR or LTE access. A MAC instance may support NR and/or LTE access in the carrier aggregation approach and/or the superposition-based approach.

LTE-assisted NR radio access may be implemented using a multi-connectivity/layer approach. The multi-connectivity/layer approach may be developed and/or deployed in a dual connectivity (DC) and/or offload-like manner. For example, NR may be controlled by LTE MeNB using independent scheduling with common S1-u or split S1-u. NR (e.g., as a black box) may be connected to LTE eNB with common or split S1-u. The LTE eNB may be unaware that components, layers, and/or functionalities connected to the LTE eNB are based on NR and/or NR related-based technologies.

Radio access may include an LTE (M)eNB that interacts and/or is connected to one or more NR nodes and/or to an NR access network. Interactions between an LTE eNB and NR node may include sharing and/or mechanisms for sharing one or more aspects of a WTRU's context. An MeNB may implement a request/response mechanism with the NR node and/or access network (e.g., in a DC-like manner). FIG. 9A-9D are examples of network architectures where an LTE (M)eNB interacts and/or is connected to one or more NR nodes and/or to an NR access network. The cells in FIG. 9A-9D may be examples of a set of resources, a set of PRBs, a spectrum etc. For example, the LTE cells in FIG. 9A-9D may be examples of a set of LTE resources, a set of LTE PRBs, an LTE spectrum etc. The NR cells in FIG. 9A-9D may be examples of a set of NR resources, a set of NR PRBs, an NR spectrum etc.

For example, the (M)eNB 902 may be configured to request an NR WTRU context from an NR node 906. The NR node 906 may respond to the request and/or provide the NR WTRU context to the LTE (M)eNB 902. As shown in FIGS. 9A-9D, a network architecture may allow user plane connection to a network via LTE (e.g., through (M)eNB 902). A network architecture may allow a user plane connection to an NR cell 904, the NR cell 904 to network 912, and/or the NR cell 904 to local access. The NR node 906 may include one or more control functionalities.

Figure 9A:
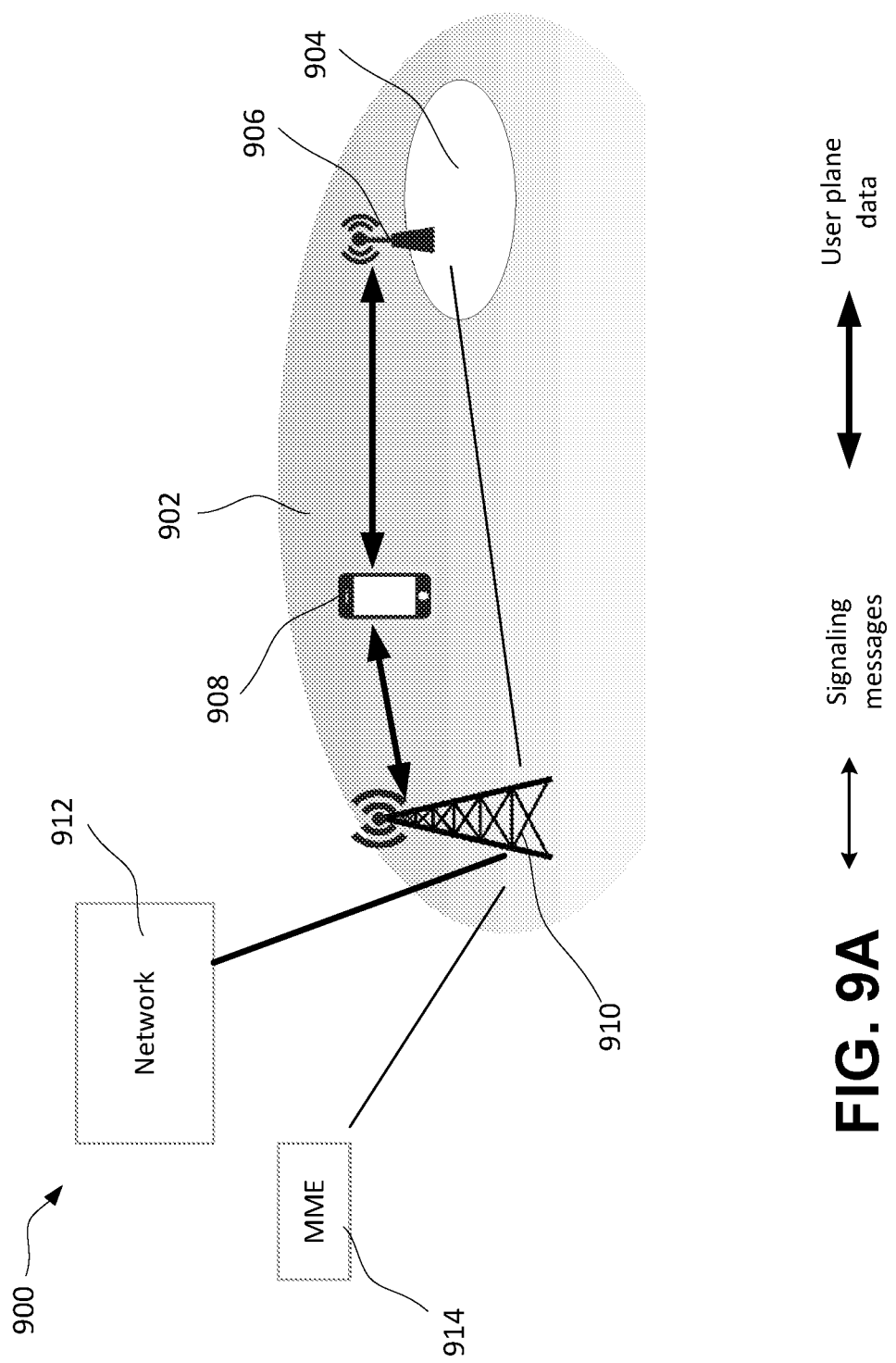
FIG. 9A is an example of a network architecture for a user plane connection to a network via LTE.

FIG. 9A is an example of a network architecture for a user plane connection to a network via LTE (e.g., through (M)eNB 902). As shown in FIG. 9, a cell architecture 900 may support LTE deployment and NR deployment. An LTE cell 902 may operate in a similar region as an NR cell 904 that is served by an NR RAN node 906. A WTRU 908 may be located within the LTE cell 902. The LTE cell 902 may be served by the LTE RAN 910. The WTRU 908 may be configured to access NR cell 904 and LTE cell 902. The bandwidth of the NR cell 904 and LTE cell 902 may partially (or at least partially) overlap. Although NR cell 904 and LTE cell 902 are shown to be served by separate RAN entities in FIG. 9 (e.g., NR RAN 906 and LTE RAN 910, respectively), NR cell 904 and LTE cell 902 may be served by a single TRP in some examples (e.g., a TRP with multi-mode capabilities).

As shown in FIG. 9A, an NR node 906 may be connected to a network 912 via the LTE eNB 902. The user plane data may be sent to the LTE eNB 902 (e.g., from the network 912 and via the LTE RAN 910). The user plane data may be sent from the LTE eNB 902 to an NR node 906. The network node 906 may correspond to an LTE network (e.g., via., an S1-u connection), a mobility management entity (MME), a local network/access and/or an NR core network (CN). The CN (e.g., LTE CN or NR CN) may not be aware whether data is being transmitted over an LTE air interface or an NR air interface.

Figure 9B:
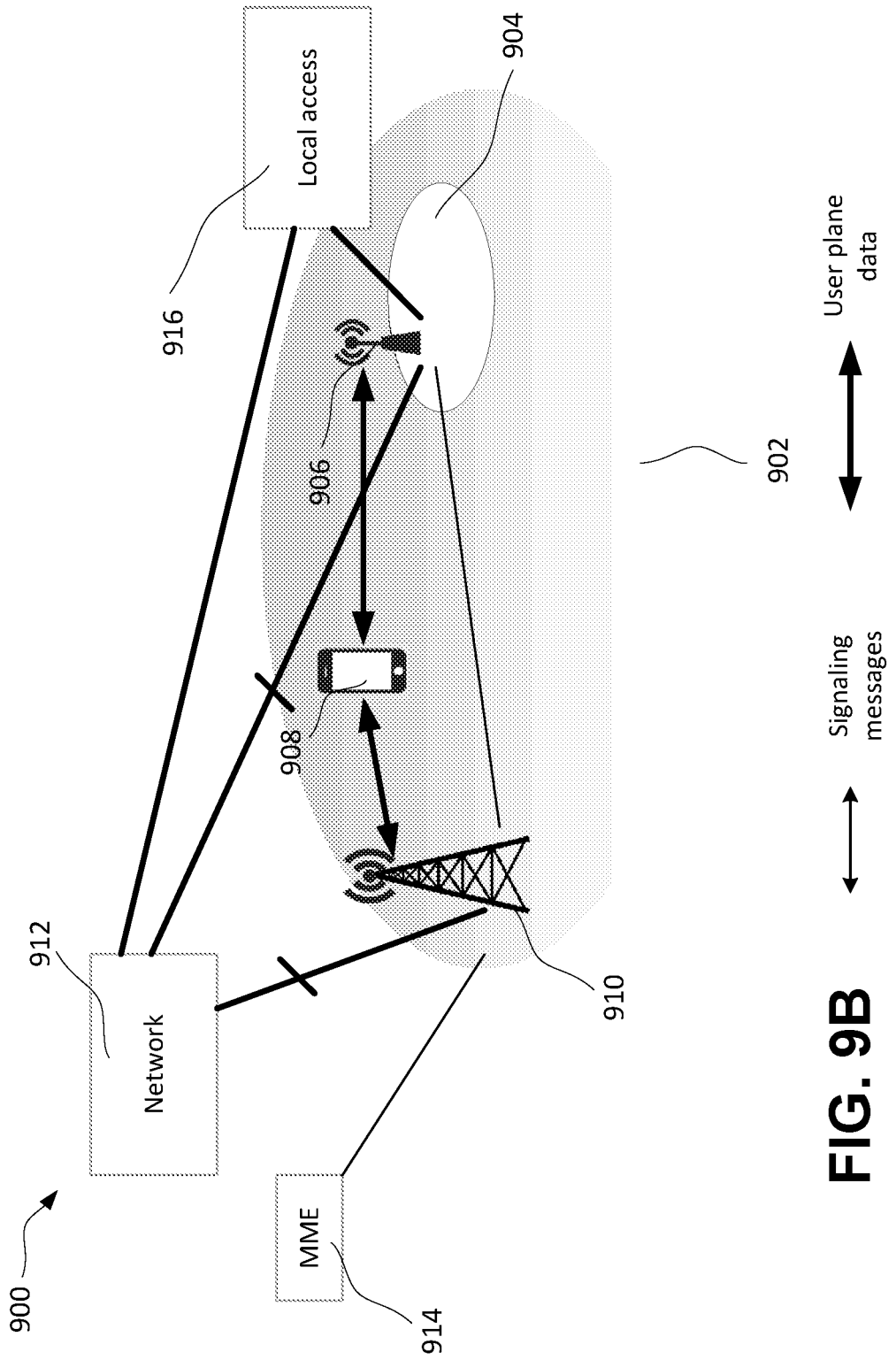
FIG. 9B is an example of a network architecture for a direct user plane connection to an NR cell to network or local access.

FIG. 9B is an example of a network architecture for a user plane connection to an NR cell. An NR node 906 may be connected to a CN entity to receive/transmit user plane data. The LTE node 910 and/or the NR node 906 may connect to the same CN, different network entities (e.g., 4G or NR networks), and/or local network/access. For example, the CN may include the network entity 912 as shown in FIG. 9B. The user plane connection to an NR cell 904, the NR cell 904 to network 912, and/or the NR cell 904 to local access may be direct. The connection between the NR node 906 and the CN entity may be direct. The connection between the NR node 906 and the CN entity may be used to receive/transmit user plane data. In the example shown in FIG. 9B, an LTE node 910 and/or NR node 906 may connect to the network entity 912. The LTE node 910 may connect to the network entity 912. The LTE node 910 may be directly connected to a network 912 or via a connection to a local access entity. The connection between the LTE node 910 and the local access entity may be direct. The NR node 906 may connect to the network entity 912 directly and/or via a local network/access entity 916. The connection between the NR node 906 and the local network/access entity 916 may be direct. The connection between the NR node 906 and the local network/access entity 916 and the connection between the NR node 906 and the network entity 912 may be different.

Figure 9C:
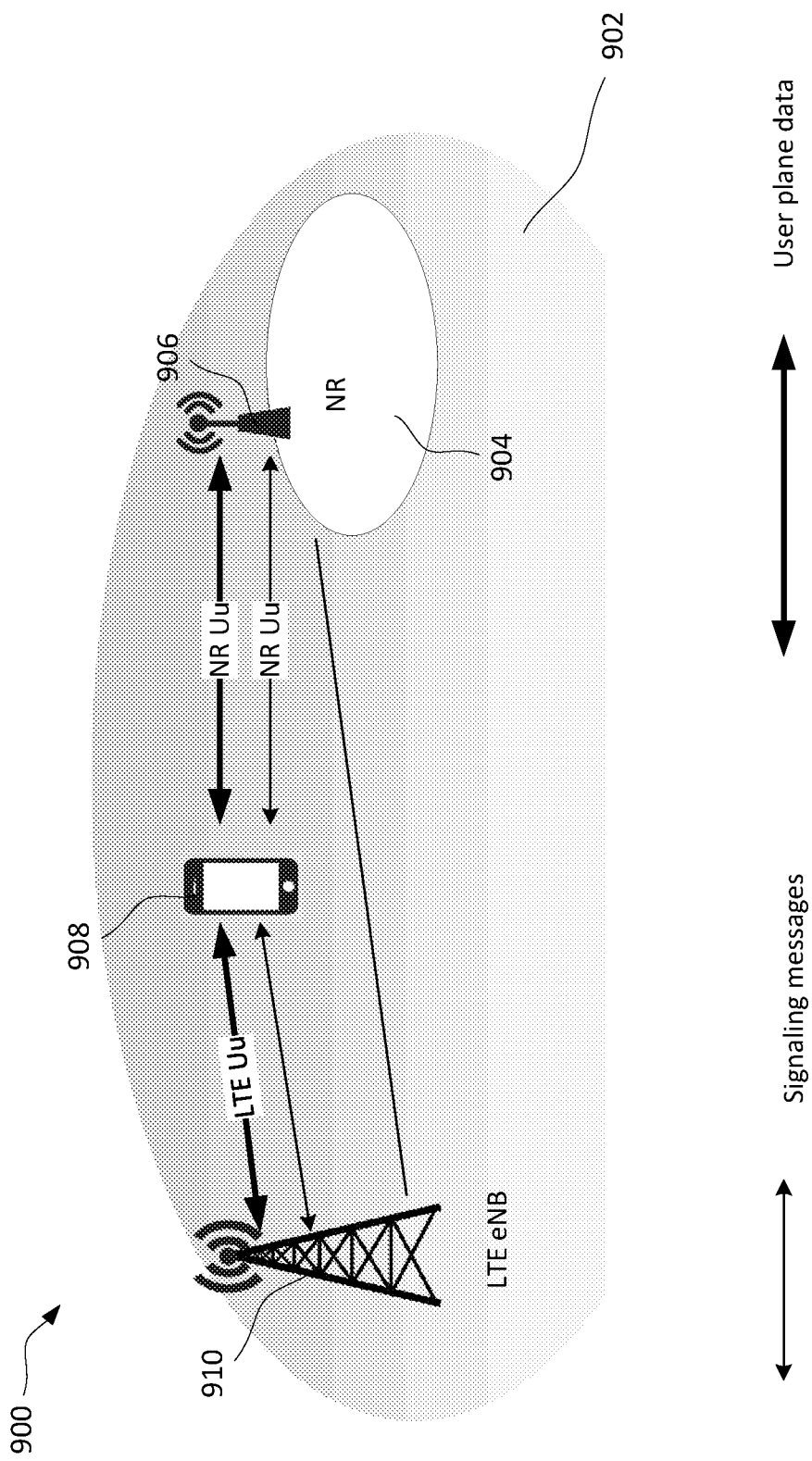
FIG. 9C is an example of network architectures where some control functionalities are available in the NR node.

One or more control functionalities may be available in an NR node. The control functionalities in an NR node may allow a flexible and/or dynamic configuration approach for NR resources (e.g., the NR cell 904 as shown in FIG. 9C). In the examples of network architectures in FIGS. 9C and 9D, the NR node 906 may have certain control functionalities. The control functionalities in an NR node may reduce signaling exchange between the LTE eNB 902 and the NR node 906. The signaling exchange between the LTE eNB 902 and the NR node 906 may not be excessive. In FIGS. 9C and/or 9D, NR-specific signaling messages may be sent over the NR and/or may be processed by the WTRU 908. The NR-specific signaling messages may be sent directly over the NR.

In FIG. 9C, a control plane may extend to the NR node 906. Signaling messages may be generated and/or be exchanged over the NR air interface (or directly exchanged over the NR air interface). Configuration and/or handshakes may be performed between the WTRU 908 and the NR node 906. A configuration including a final configuration may be sent to the WTRU 908 over an LTE Uu and/or an NR Uu.

Figure 9D:
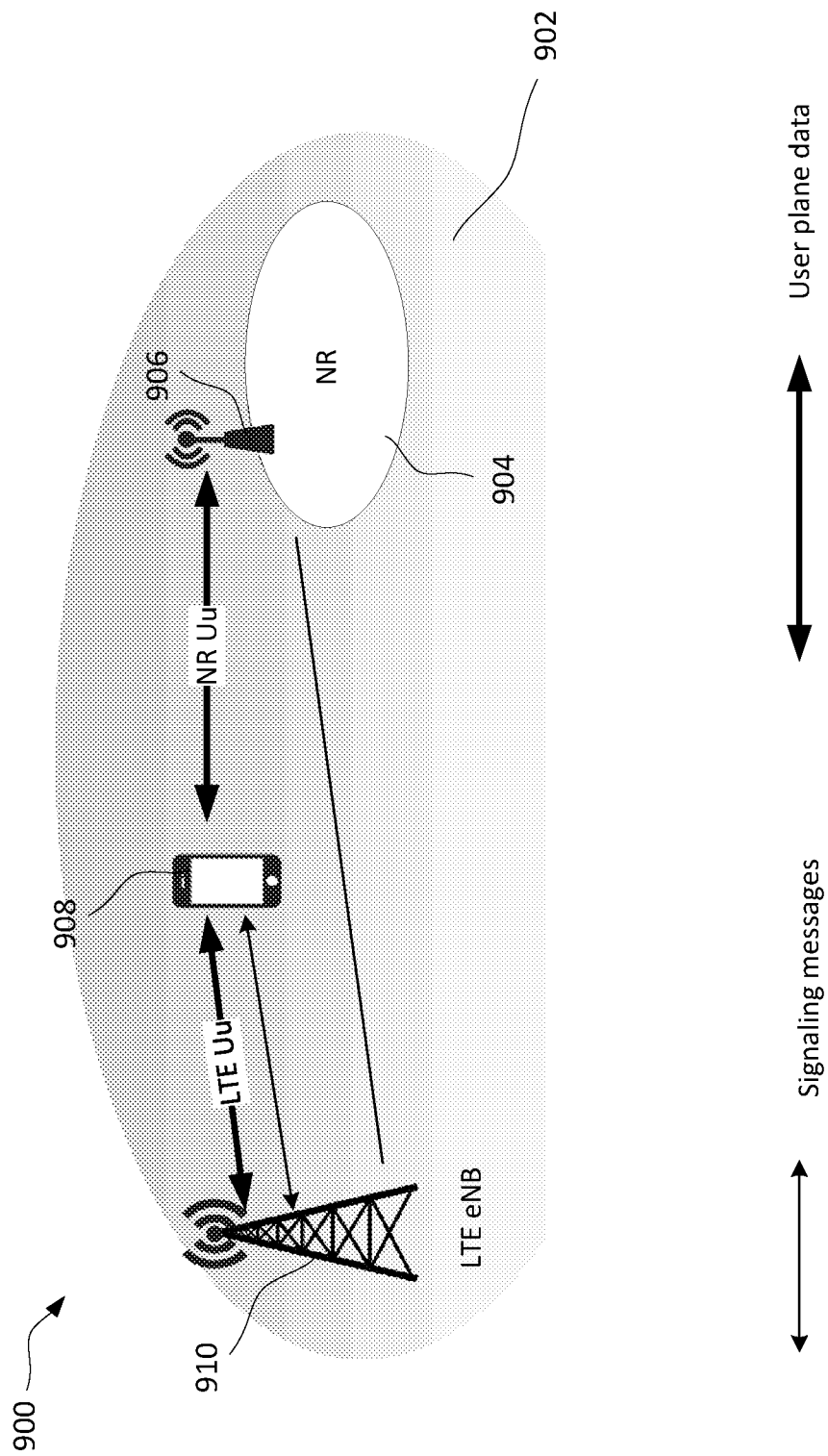
FIG. 9D is an example of network architectures where some control functionalities are available in the NR node.

In FIG. 9D, a control plane may terminate in the LTE eNB 902. Signaling messages may not be generated. Signaling messages may not be exchanged over the NR air interface, or at least not directly exchanged over the NR air interface. The control plane in FIG. 9D may be similar to the control plane for dual connectivity. Configuration and/or handshakes may be performed between the LTE eNB 902 and NR node 906. A configuration including a final configuration may be sent to the WTRU 908 over the LTE Uu.

The multi-connectivity/layer approach for LTE-assisted NR radio access may be implemented using WTRU-related control mechanisms (e.g., as described herein). A WTRU may receive LTE RRC signaling. The LTE RRC signaling may configure one or more parameter(s) (e.g., an access table) for accessing an NR system. The WTRU may acquire parameters (e.g., access table) from the NR system. The parameters may include antenna configuration and/or transmission modes, logical channel configurations and/or priorities, MAC parameters (e.g., DRX parameters), PDCP configuration, PHICH configuration, and/or the like. The LTE RRC signaling may instruct a WTRU to acquire information, perform measurements and/or access the NR system (e.g., according to the parameters). LTE RRC signaling may include a configuration of one of more data bearers (e.g., user plane bearers applicable to the NR radio interface).

The multi-connectivity/layer approach for LTE-assisted NR radio access may be implemented using user plane routing (e.g., as described herein). In one or more architecture (e.g., examples in FIGS. 9A-9D), a WTRU may receive user plane data from one or more of an LTE interface, NR interface, and/or the like. A service or bearer may be mapped to one or more of LTE and/or NR. For example, a WTRU may be connected to the LTE RRC control plane. Data associated with signaling radio bearers may be exchanged over the LTE interface. The user plane routing may include split data radio bearers (DRBs) and common S1-u. The user plane routing may include NR-only DRBs and split S1-u (e.g., as described herein). User plane data bearers may support split routing of data over LTE Uu and NR radio interface. An LTE eNB and/or NR access network may support forwarding mechanisms for user plane data for applicable WTRU(s) and/or DRB(s). For example, the split routing of data over LTE Uu and NR radio interface may be for downlink, uplink, or both. User plane data bearers may be dedicated to the NR radio interface. An LTE eNB and/or NR access network may support mechanisms to set up an S1-u interface between the NR access network and the LTE CN. For example, the dedicated NR radio interface may be for downlink, uplink, or both.

The multi-connectivity/layer approach for LTE-assisted NR radio access may enable and/or allow a WTRU to use a separate set of physical layer resources for LTE-based transmissions and for NR-based transmissions. A WTRU may be configured to use a separate set of physical layer resources for LTE-based transmissions and for NR-based transmissions. Different carriers and/or numerology may be used for the separate physical layer resources for LTE-based transmissions and for NR-based transmissions. The separate physical layer resources may be associated with different MAC processing. A WTRU may use one or more separate MAC instances for LTE-based access and for NR-based access. One or more MAC instances may be used if dual connectivity may be configured. For example, dual connectivity may be configured for LTE-based access and for NR-based access. A WTRU may receive scheduling instructions for a MAC instance. The scheduling instructions may be received independently for a MAC instance.

LTE-assisted NR radio access may be implemented using an aggregation approach. The aggregation approach may include a carrier aggregation like (CA-like) architecture. Radio access may include an LTE eNB that supports an NR physical layer and/or the like. For example, the LTE eNB may support at least the NR physical layer. The LTE eNB may configure NR to use separate resources including one or more of physical resources, carrier, cell, and/or the like.

The aggregation approach for LTE-assisted NR radio access may be implemented using WTRU-related control mechanisms (e.g., as described herein). A WTRU may receive LTE RRC signaling. The LTE RRC signaling may configure one or more parameter(s) (e.g., an access table) for accessing an NR system. The WTRU may acquire parameters (e.g., access table) from the NR system. The parameters may include antenna configuration and/or transmission modes, logical channel configurations and/or priorities, MAC parameters (e.g., DRX parameters), PDCP configuration, PHICH configuration, and/or the like. The LTE RRC signaling may instruct a WTRU to perform measurements and/or access the NR system (e.g., according to the parameters). LTE RRC signaling may include a configuration of one of more data bearers (e.g., bearers applicable to the NR radio interface). User plane data bearers may support split routing of data over LTE Uu and NR radio interface.

The aggregation approach for LTE-assisted NR radio access may be implemented using user plane routing (e.g., as described herein). The user plane routing may include split DRBs and common S1-u and/or NR-only DRBs and common S1-u. For example, the split routing of data over LTE Uu and NR radio interface may be for downlink, uplink, or both. User plane data bearers may be dedicated to the NR radio interface (e.g., for URLLC type of service). For example, the dedicated NR radio interface may be for downlink, uplink, or both.

The aggregation approach for LTE-assisted NR radio access may enable and/or allow a WTRU to use a separate set of physical layer resources for LTE-based transmissions and for NR-based transmissions. A WTRU may be configured to use a separate set of physical layer resources for LTE-based transmissions and for NR-based transmissions. Different carriers and/or numerologies may be used for the separate physical layer resources for LTE-based transmissions and for NR-based transmissions. The separate physical layer resources may be associated with different MAC processing. A WTRU may use one or more separate MAC instances for LTE-based access and for NR-based access. A WTRU may receive scheduling instructions for a MAC instance. The scheduling instructions may be received independently for a MAC instance. In an example, a WTRU may use a single MAC instance to support LTE-based access and NR-based access. A WTRU may receive scheduling instructions that may be applicable to the first type of access over a second type of access. For example, A WTRU may receive scheduling instructions that may be applicable to NR-based access over a LTE-based access. A WTRU may transmit, the uplink, uplink control information (UCI) that may be applicable to the first type of access over the second type of access. For example, A WTRU may transmit, the uplink, uplink control information (UCI) that may be applicable to a NR-based access over a LTE-based access. In one or more examples, cross-carrier scheduling and/or an operation of a primary cell may be applicable to one or more of LTE-based access and NR-based access. The primary cell may be a LTE cell. The cell may be example of a set of resources, a set of PRBs, a spectrum etc. For example, the LTE primary cell may be examples of a set of LTE resources, a set of LTE PRBs, an LTE spectrum etc.

LTE-assisted NR radio access may be implemented using a superposition-based approach. An NR radio access including the LTE-assisted NR radio access may be deployed using a dedicated spectrum. The LTE-assisted NR radio access may be deployed in a spectrum that is used for LTE-based access. For example, the spectrum that the LTE-assisted NR radio access uses may overlap the spectrum that is used for LTE-based access. The LTE-assisted NR radio access and LTE-based access may be enabled by a same carrier.

Figure 10:
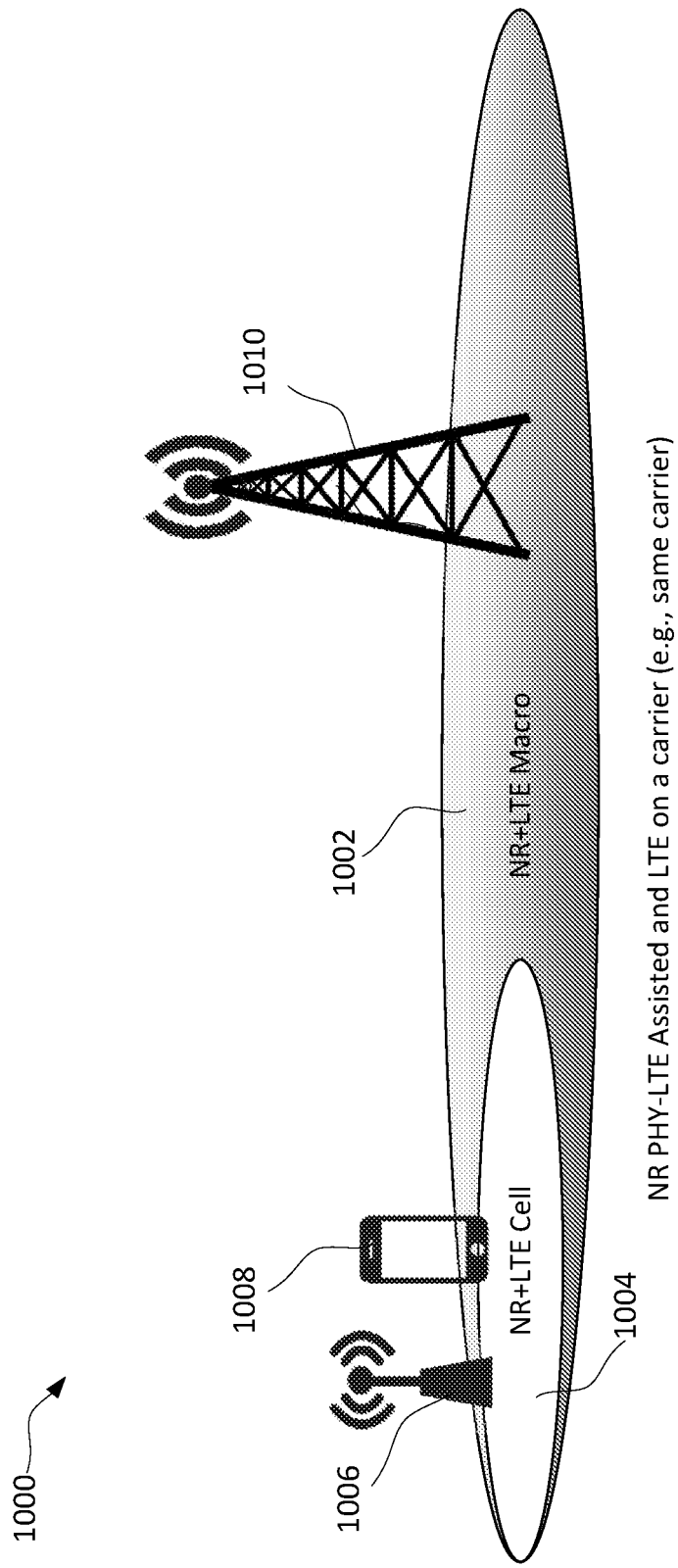
FIG. 10 is an example of superpositioned (common spectrum) deployment.

FIG. 10 is an example of the superposition-based approach. The cells in FIG. 10 may be examples of a set of resources, a set of PRBs, a spectrum etc. For example, the LTE cells in FIG. 10 may be examples of a set of LTE resources, a set of LTE PRBs, an LTE spectrum etc. The NR cells in FIG. 10 may be examples of a set of NR resources, a set of NR PRBs, an NR spectrum etc. The LTE+NR cells in FIG. 10 may be examples of a set of NR resources that at least partially overlap with a set of LTE resources, a set of NR PRBs that at least partially overlap with a set of LTE PRBs, an NR spectrum that at least overlaps with an LTE spectrum, etc.

The deployment 1000 may include a marcocell 1002 for LTE-based access and NR-based access, a cell 1004 for LTE-based access and NR-based access, an NR node 1006, a WTRU 1008, and a LTE node 1010. As shown in FIG. 10, a cell architecture 1000 may support LTE-based access and NR-based access. A macro LTE+NR cell 1002 may operate in a similar region as an LTE+NR cell 1004 that is served by an NR RAN node 1006. A WTRU 1008 may be located within the LTE+NR cell 1004. The macro LTE+NR cell 1002 may be served by the LTE RAN 1010. The WTRU 1008 may be configured to access the macro LTE+NR cell 1002 and the LTE+NR cell 1004. The deployment 1000 may operate on a common spectrum that supports LTE-based access and NR-based access. For example, the bandwidth of the NR cell 1004 and LTE cell 1002 may partially (or at least partially) overlap. The common spectrum may enable transition(s) and/or migration between 4G and NR deployments. The common spectrum may enable LTE-assisted NR radio access with little or no spectrum dedicated to an NR system. The LTE node 1010 may configure one or more NR physical channels. The NR physical channels may be plugged into LTE Uu or an evolution thereof. The marcocell 1002, through the LTE node 1010 may support an NR physical layer in a radio access. Although NR cell 1004 and LTE cell 1002 are shown to be served by separate RAN entities in FIG. 10 (e.g., NR RAN 1006 and LTE RAN 1010, respectively), NR cell 1004 and LTE cell 1002 may be served by a single TRP in some examples (e.g., a TRP with multi-mode capabilities).

The superposition-based approach for LTE-assisted NR radio access may be implemented using control mechanisms (e.g., as described herein). A WTRU may receive LTE RRC signaling. The LTE RRC signaling may configure one or more parameter(s) for performing/receiving transmissions. The transmissions may be performed/received using one or more NR physical data channels (e.g., physical channels for downlink, uplink or both). The parameters may be related to physical downlink channels, physical uplink channels, or both. LTE RRC signaling may include a configuration of one or more data bearers (e.g., bearers applicable to the NR radio interface). LTE RRC signaling may include a configuration of one or more data bearers (e.g., bearers applicable to the NR radio interface).

The superposition-based approach for LTE-assisted NR radio access may be implemented using user plane routing (e.g., as described herein). The user plane routing may include split DRBs and common S1-u. The user plane routing may include NR-only DRBs and common S1-u. User plane data bearers may support splitting DRBs and common S1-u. Bearers that support splitting DRBs and common S1-u may support transmission of associated data, for example, using LTE-type of transmissions or the NR type of transmissions (e.g., for the mBB type of service). The split DRBs and common S1-u may be for downlink, uplink, or both. User plane data bearers may support NR-only DRBs and common S1-u. Bearers that support NR-only DRBs and common S1-u may be dedicated to NR transmissions (e.g., for URLLC type of service). The NR-only DRBs and common S1-u may be for downlink, uplink, or both.

The superposition-based approach for LTE-assisted NR radio access may enable and/or allow a WTRU to use a common set of physical layer resources for LTE-based transmissions and for NR-based transmissions. For example, a set of resources associated with an NR RAT may at least partially overlaps with a set of resources associated with an LTE RAT. The set of resources associated with the LTE RAT may include a LTE cell, a set of LTE resources, a set of LTE physical resource blocks (PRBs), etc. The set of resources associated with an NR RAT may include a NR cell, a set of NR resources, a set of NR PRBs, etc. The WTRU may determine that a NR transmission is to be received within the set of NR resources that at least partially overlaps with the set of LTE resources. The WTRU may determine a NR transmission is to be received within an overlapping portion of the NR set of resources. The WTRU may determine that a subset of resources within the overlapping portion of the NR set of resources correspond to an LTE common transmission. The WTRU may receive the NR transmission within the set of NR resources. The NR transmission may not be included in the subset of resources that correspond to the LTE common transmission. The LTE common transmission may include one or more of a common control signal, a cell-specific broadcast signal, cell-specific reference signals (CRS), a physical downlink control channel (PDCCH), a primary synchronization signal (PSS), a secondary synchronization signal (SSS), and/or a channel state information reference signal (CSI-RS). One or more PRBs may comprise the subset of resources within the overlapping portion of the NR set of resources that correspond to the LTE common transmission.

A different numerology may be used for LTE-based transmissions and/or for NR-based transmissions. Different types of transmission may be associated with different MAC processing. In an example, a WTRU may use a separate MAC instance for LTE-based transmissions and a separate MAC instance for NR-based transmissions. In one or more examples, a same carrier may be used for LTE-based transmissions and for NR-based transmissions. The separate MAC instance for LTE-based transmissions and for NR-based transmissions may be for a given carrier. A WTRU may receive scheduling instructions for a MAC instance. The scheduling instructions may be received independently for a MAC instance. For example, different control channels may be used for LTE-based transmissions or for NR-based transmissions. In one or more examples, a WTRU may use a single MAC instance to support LTE-based transmissions and NR-based transmissions. For example, a WTRU may receive scheduling instructions that may be applicable to NR-based access over a LTE-based access. The control channel via which the WTRU may receive scheduling instructions may be LTE PDCCH or the like. A WTRU may receive an LTE physical control format indicator channel (PCFICH) indicating the subset of resources within the overlapping portion of the NR set of resources that correspond to an LTE common transmission. The WTRU may receive a LTE physical downlink control channel (PDCCH). The LTE PDCCH may comprise an indication of one or more PRBs that are comprised in the set of NR resources for receiving the NR transmission. The WTRU may determine the one or more PRBs based on the LTE PDCCH.

A WTRU may transmit, in the uplink, uplink control information (UCI) that may be applicable to the first type of access over the second type of access. For example, a WTRU may transmit, in the uplink, uplink control information (UCI) that may be applicable to an NR-based access over a LTE-based access. The control channel via which the WTRU may transmit the uplink control information (UCI) may be LTE PUCCH or the like. In one or more examples, cross-carrier scheduling and/or an operation of a primary cell may be applicable to one or more of the transmission types (e.g., LTE-based access and NR-based access. The primary cell may be a LTE cell. The cell may be example of a set of resources, a set of PRBs, a spectrum etc. For example, the LTE primary cell may be examples of a set of LTE resources, a set of LTE PRBs, an LTE spectrum etc.

LTE-assisted radio access supporting NR may be implemented using an NR substitution-based approach. LTE RRC may configure NR physical access, for example, using a different L2 set up. Substitution-based radio access may consist of a network node (e.g., a TRP, a NR node or an eNB) and/or a plurality of network nodes/components (e.g., a central component and a remote component connected by a fronthaul interface). The network node may support part of the NR physical layer (or at least part of the NR physical layer.). A network node may support one or more LTE components, such as the LTE control plane (e.g., RRC and/or NAS) and/or one or more L2 protocols (e.g., PDCP).

The substitution-based approach for LTE-assisted NR radio access may be implemented using control mechanisms (e.g., as described herein). A WTRU may acquire a configuration of one or more parameter(s) that may be used to access the NR system (e.g., an access table). Configuration may be acquired via initial access procedures for acquiring the NR system access information and/or via reception of mobility control information. The system access information may include one or more of system broadcast, access table broadcasting or dedicated configuration. The mobility control information may include a handover command from LTE to NR. A WTRU may access the radio access network using the initial access implementations for accessing and/or associating with the NR air interface (e.g., using a random access procedure). A WTRU may receive LTE RRC signaling. The LTE RRC signaling may configure one or more parameter(s) that may be used to perform/receive transmissions using the NR physical layer. LTE RRC signaling may include a configuration of one of more data bearers (e.g., LTE L3/RRC SRBs) NR user plane bearers (e.g., L2/DRBs or equivalent), and/or the like.

Various protocol stacks may be implemented to support an integration of the LTE network and the NR system. A protocol architecture (e.g., LTE protocol architecture) may be adapted to facilitate the LTE-assisted radio access supporting NR. Example realizations of an L2 protocol stack may support a variety of options for LTE-assisted NR operation.

Figure 11:
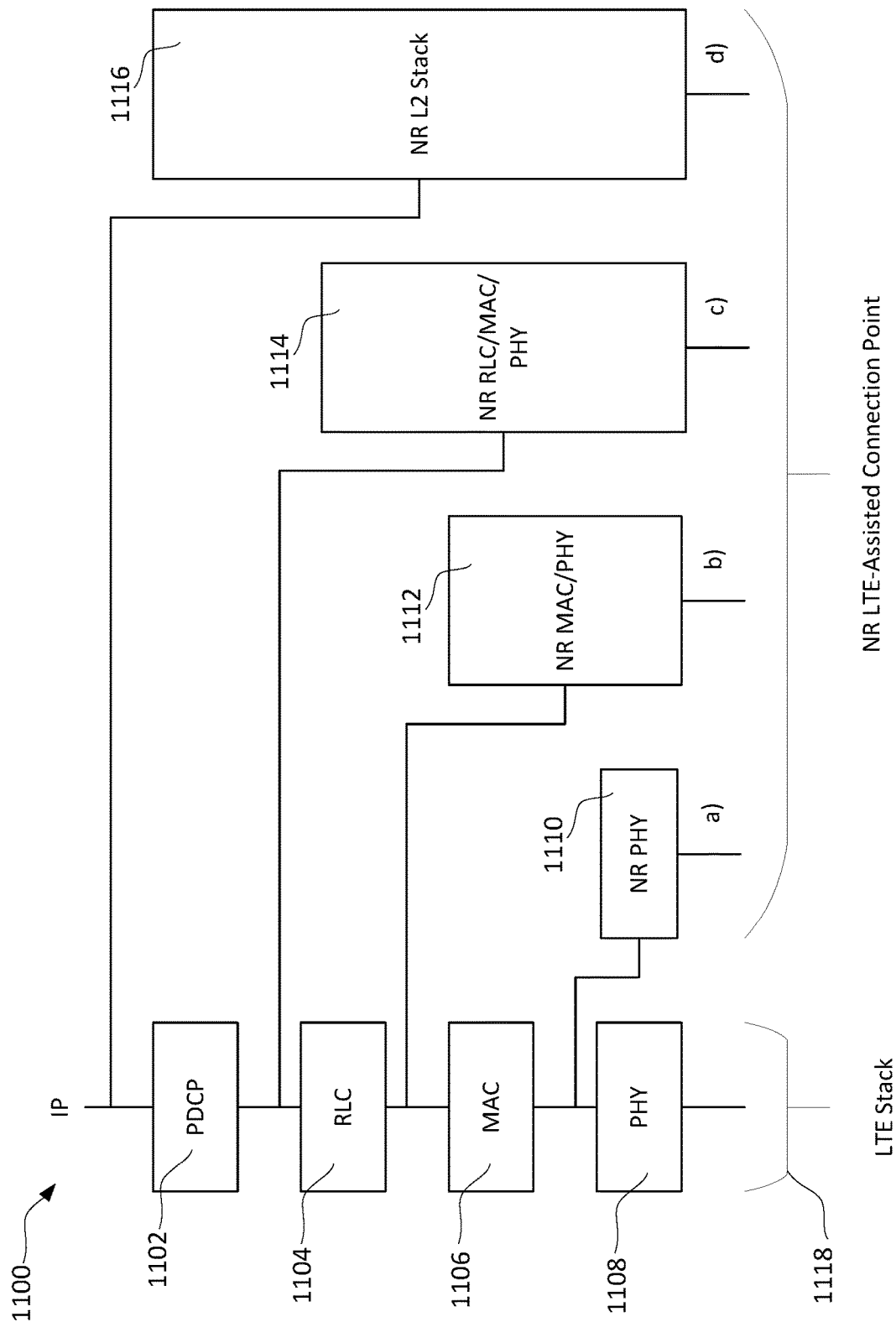
FIG. 11 provides several examples of NR LTE-assisted connection points.

FIG. 11 may provide several examples of NR LTE-assisted connection points 1100. There are a variety of implementations to connect an NR Uu system and/or NR physical channels onto an LTE protocol stack 1118. LTE protocol stack 1118 may include a PDCP layer 1102, a RLC layer 1104, an MAC layer 1106, a PHY layer 1108, and/or other layers such as an IP layer. LTE-assisted radio access supporting NR may be achieved, for example, by connecting the NR air interface that includes an NR PHY 1110 after the LTE MAC 1106, by connecting the NR air interface 1112 that includes an NR MAC/PHY 1112 after the LTE RLC 1104, or by connecting the NR air interface 1114 that includes an NR RLC/MAC/PHY 1114 after the LTE PDCP 1102. A full NR L2 stack 1116 may be provided (e.g., as shown in FIG. 11). LTE-assisted radio access supporting NR may be achieved, for example, by using a full NR L2 stack 1116. Protocols may be used alone or in combination with one or more architecture approaches. LTE RRC/NAS may be used, e.g., with appropriate extensions, to support an NR air interface. NR-related control signaling may be exchanged over the NR air interface. The exchange over the NR air interface may be in a direct manner.

A WTRU may be configured to use one protocol configuration at a time or be configured concurrently with more than one protocol configurations including one or more combinations of the protocol configurations. For example, a WTRU may be configured concurrently with a full NR L2 stack 1116 (e.g., deployed with example architecture shown in FIG. 11) and the NR air interface 1114 that includes an NR RLC/MAC/PHY. Concurrent configurations may enable a concurrent support for different services, such as URLLC and eMBB. In this example, URLLC may be supported by a full NR L2 stack 1116, and eMBB may be supported by the NR air interface 1114.

A WTRU may be configured such that an NR physical layer may interact with the LTE MAC protocol (or an evolution thereof). An NR air interface may be connected after the LTE MAC. FIG. 12 is an example of an NR PHY interacting with an LTE MAC protocol (e.g., or an evolution thereof). LTE protocol stack 1214 may include a PDCP layer 1202, a RLC layer 1204, an MAC layer 1206, a PHY layer 1208, and/or other layers such as an IP layer. An NR PHY 1210 may be connected after the LTE MAC 1206.

MAC modeling may be adapted such that the NR physical layer may interact with the LTE MAC protocol. A WTRU may be configured to use a MAC instance that handles one or more types of physical layers including a LTE PHY (e.g., a PHY layer 1208) and/or NR PHY (e.g., NR PHY 1210 in FIG. 12). A WTRU may be configured to use one or more sets of LTE and/or NR physical layer resources. The WTRU may be configured to use one or more types of physical data transport channels. The physical data transport channels may include physical data transport channels in downlink of the LTE PHY, uplink of the LTE PHY, downlink of the NR PHY, and/or uplink of the NR PHY. In one or more examples, the physical data transport channels may include at least the downlink of the NR PHY and the uplink of the NR PHY. A configuration of a MAC instance that handles one or more types of physical layers may be applicable for a same MAC entity. LTE Uu and NR Uu may share a same spectrum. LTE Uu and NR Uu may use differently configured spectrum.

Scheduling instructions may be processed in various ways such that the NR physical layer may interact with the LTE MAC protocol. For example, scheduling instructions may be processed and/or generated for a scheduler. A MAC entity may process some or all applicable scheduling instructions for the LTE PHY (e.g., a PHY layer 1208) and/or the NR PHY (e.g., NR PHY 1210 in FIG. 12). A control channel may be used for the LTE PHY (e.g., a PHY layer 1208) and/or the NR PHY (e.g., NR PHY 1210 in FIG. 12). A control channel may be used for the LTE PHY (e.g., a PHY layer 1208), and/or another control channel may be used for the NR PHY (e.g., NR PHY 1210 in FIG. 12). A WTRU may determine an applicable type of transmission based on a definition of different sets of DCIs and/or RNTIs for a type of data channel. A WTRU may determine a physical layer data channel based on a definition of different sets of DCIs and/or RNTIs for a type of data channel.

Data may be mapped to a physical data channel type such that NR physical layer may interact with the LTE MAC protocol. Data from an LTE bearer/logical channel may be mapped to go over LTE and/or NR. A WTRU may receive a DCI that schedules uplink resources for transmission of data. The DCI may include an indication indicating one or more of the applicable data bearer type, LCH(s), identity and/or a priority level thereof, LCG(s) identity and/or a priority level thereof, SOM, and/or the like. A WTRU may determine what data to include in the transmission using the indication. The indication may be explicit. The applicable data bearer type may include one or more of SRB, DRB, LTE DRB, and/or NR-only DRB.

TRP(s), TrCH and/or physical data channels may be activated or deactivated such that NR physical layer may interact with the LTE MAC protocol. A MAC protocol may be extended to allow signaling of different NR transmission points. For example, a MAC protocol may be extended to allow activation/deactivation of TRP(s), TrCH and/or physical data channels to enable fast switching between NR transmission points. A MAC protocol may support an activation/deactivation procedure for a certain TRP, physical data channel and/or TrCH of a WTRU's configuration. The activation and/or the deactivation of the TRP(s), TrCH and/or physical data channels may be a WTRU-based and/or NW-based.

A WTRU may control the activation/deactivation of TRP (s), TrCH and/or physical data channels. In one or more examples, a WTRU may include a MAC CE in a transmission. The MAC CE may be defined to indicate deactivation of one or more of TRP(s), TrCH and/or physical data channels. The WTRU and/or other WTRUs may receive a feedback (if applicable) indicating that the NW successfully received the MAC CE. A WTRU may stop monitoring an associated control channel(s) based on the feedback if no further operation on a channel is to be performed/required. The WTRU may stop decoding of an associated DCI. The associated DCI may be related to the MAC CE by type, RNTI, by control channel over which the DCI is received, and/or the like. For example, the control channel may be disabled. If the WTRU has been processing a DCI on that control channel and the control channel is disabled, the WTRU may stop decoding the DCI.

A WTRU may transmit a MAC CE to activate one or more of the TRP(s), TrCH and/or physical data channels. A WTRU may initiate a random access procedure to activate (or reactivate) one or more of the TRP(s), TrCH and/or physical data channels, e.g., for reactivation. Activation may be akin to an initial access for an NR TRP and/or may be for creating an association with a TRP.

A network (NW) may control the activation/deactivation of TRP(s), TrCH and/or physical data channels. In one or more examples, a NW may include a MAC CE in a transmission. The MAC CE may be defined to indicate activation/deactivation of one or more of TRP(s), TrCH and/or physical data channels. A WTRU may receive the MAC CE in the transmission. The WTRU may process the MAC CE that indicates the activation/deactivation of one or more of TRP(s), TrCH and/or physical data channels. The NW may send the MAC CE in a TTI of a transmission for sending a feedback (if applicable) that indicates a successful reception of another transmission by the WTRU. The WTRU may stop monitoring an associated control channel(s) based on the indication if no further operation on a channel is to be performed/required. The WTRU may stop decoding an associated DCI based on the indication. For example, the associated DCI may be related to the MAC CE by type and/or by RNTI.

RACH procedures may be provided such that NR physical layer may interact with the LTE MAC protocol. The RACH procedures may be used when a WTRU may be expected to transmit data in the UL on NR. The transmission in the UL on NR may facilitate successful configuration completion. A RACH response (RAR) format may be adjusted for NR specific information (e.g., timing alignment) and/or for signaling NR UL resources.

Control scheduling may be provided such that NR physical layer may interact with the LTE MAC protocol. Control channels for NR scheduling assignments may be transmitted by the NR PHY. Control channels for NR data channels may be transmitted by the NR PHY. The transmission of the control channels may be direct.

Cross-TrCH scheduling and/or cross carrier scheduling may be used such that NR physical layer may interact with the LTE MAC protocol. Cross-TrCH scheduling and/or cross carrier scheduling may be used to provide downlink control information (DCI) for configuring various types of physical data channel, TrCHs, SOMs and/or carriers that support different instances thereof. For example, a WTRU may be configured such that a given control channel may provide DCI applicable to one or more types of physical data channel, TrCHs, SOMs and/or carriers (e.g., cross-X scheduling). A WTRU may be configured such that a given control channel may provide DCI to a type of physical data channel, TrCH, SOMs and/or carrier (e.g., self-scheduling).

A WTRU may determine an instance to which a DCI may be applicable, for example, based on one or more parameters. The parameters may include whether the WTRU is configured to attempt decoding the DCI per instance. The parameters may include whether the WTRU is configured to use a RNTI per instance. The parameters may include whether the WTRU is configured to use a set of one or more DCI format(s) per instance. The set of one or more DCI format(s) per instance may include a different DCI providing information for an NR assignment. The set of one or more DCI format(s) per instance may include a different DCI indicating presence, type of assignment, size of assignment, and/or a transparent NR scheduling container (e.g., a string of bits to be passed and/or processed to NR stack by a WTRU). The parameters may include whether the WTRU is configured to use a search space per instance (e.g., search spaces may overlap). The parameters may include whether the WTRU is configured to receive a first DCI indicating the location of a second DCI per instance. For example, the first DCI may be an LTE DCI that indicates the presence of an NR assignment and/or an NR control region. The first DCI may be used as an indication to monitor a configured NR control region(s) or a signaled region.

A WTRU may be configured, for example, so that a concerned control channel may be an NR control channel or an LTE control channel (e.g., physical downlink control channel (PDCCH) or an evolution thereof).

An interface or dynamic grant may be selected such that NR physical layer may interact with the LTE MAC protocol. A WTRU may select an interface over which the WTRU may send or receive transmissions, for example, based on a dynamic grant. A dynamic grant may direct traffic over one or more RATs. For example, some traffic may be directed over one or both NR and LTE based on the grant. An LTE MAC CE may be used to direct certain bearers to be transmitted over NR or not over NR. A WTRU may autonomously perform selection of an interface and/or based on one or more parameters. The parameters may include, for example, a coding that the WTRU uses for encoding the data, an indication on the dynamic grant, the type of data to be transmitted. For example, a WTRU with LTE capabilities may use a coding that is different from a coding used by a WTRU with NR capabilities.

UL feedback may be used such that NR physical layer may interact with the LTE MAC protocol. For example, UL feedback may be provided using a first RAT over the interface of a second RAT. There may be impacts on scheduling, multiplexing, prioritization, etc., for example, when different HARQ timelines or TTIs are used by different PHYs.

A WTRU may be configured such that an NR MAC may interact with the LTE RLC and/or PDCP. An NR air interface may be connected after the LTE RLC (e.g., as shown in the connection of NR air interface 1112 after LTE RLC 1104). For example, an NR air interface may be connected after the LTE RLC in RLC transparent mode or when RLC (or an evolution thereof) is not applicable. An NR MAC may support segmentation. The NR MAC may handle PCP PDUs, for example, when little or no split occurs in PDCP. Functions applicable when a WTRU is configured by connecting an NR air interface after the LTE MAC (e.g., as described herein) may be applicable when a WTRU is configured by connecting the NR air interface after the LTE RLC. A WTRU may be configured by higher layer protocols to determine whether a function is supported or not. A WTRU may be configured by higher layer protocols to determine whether a function may be supported when a same network node handles scheduling for the MAC instances of the different types including LTE MAC instance and NR MAC instance. A WTRU may be configured by higher layer protocols to determine whether a function may be supported when there is an interface in between nodes. The interface may be an ideal interface.

Separate schedulers may be implemented with similar impacts as described herein (e.g., with an ideal interface). A difference may be that the MAC protocol may be an NR stand-alone NR MAC protocol. In an example, MAC functionalities may be limited to multiplexing and prioritization of data (e.g., without other functionalities). If MAC functionalities are limited to multiplexing and prioritization of data, a feedback may be provided between RLC and MAC, and/or the feedback may be a tight one. MAC may provide scheduling decisions to RLC. LTE RLC may provide packets of optimal size according to MAC scheduling decisions. If MAC functionalities are limited to multiplexing and/or prioritization of data, RLC may create PDUs (e.g., assuming a certain TB size). If MAC functionalities are limited to multiplexing and/or prioritization of data, the NR MAC/PHY may accommodate the given TB. For example, the NR MAC/PHY may schedule with sufficient resource allocations such that the TB may be transmitted. If MAC functionalities are limited to multiplexing and prioritization of data, flow control may occur between two nodes (e.g., in cases of non-ideal interface).

In one or more examples, MAC functionalities may be enhanced, for example, when compared to LTE. NR MAC may perform scheduling, assembly, multiplexing, and segmentation of packets. Impacts to RLC may occur in various ways. For example, data over LTE RLC may be configured to be in a transparent mode (TM) (e.g., splitting of bearers may occur). RLC acknowledged mode (AM)/unacknowledged mode (UM) may be a configured MAC entity. The MAC entity (e.g., RLC AM/UM) may segment and/or optimize packets as received by the RLC AM (e.g., splitting of bearers may occur). RLC may not be applicable to some or all bearers applicable to NR transmissions. NR MAC SDUs may include LTE PDCP PDUs and/or the like.

A WTRU may be configured by connecting the NR air interface after the PDCP. Functions applicable when a WTRU is configured by connecting an NR air interface after the LTE MAC or RLC may be applicable when a WTRU is configured by connecting the NR air interface after the PDCP. A WTRU may be configured by higher layer protocols, for example, to determine whether a function may be supported or not. A WTRU may be configured by higher layer protocols to determine whether a function may be supported when a same network node handles scheduling for the MAC instances of the different types including LTE MAC instance and NR MAC instance. A WTRU may be configured by higher layer protocols to determine whether a function may be supported when there is an interface in between nodes. The interface may be an ideal interface.

A WTRU may be configured to operate for the L2 processing path using procedures that are similar to procedures used for legacy systems, such as LTE dual connectivity. PDCP may be mapped to an NR RLC, NR MAC, and/or LTE RLC. RLC/MAC/PHY may be implemented, for example, similar to a stand-alone case. Techniques and/or approaches may be developed for QoS/channel quality feedback. An LTE eNB may be notified of NR quality, such as channel quality or whether QoS is being met in NR.

A WTRU may be configured by connecting the NR air interface to a full NR L2 stack. Functions applicable when a WTRU is configured by connecting an NR air interface after the LTE MAC, RLC or PDCP may be applicable when a WTRU is configured by connecting the NR air interface to a full NR L2 stack. A WTRU may be configured by higher layer protocols, for example, to determine whether a function may be supported or not. A WTRU may be configured by higher layer protocols to determine whether a function may be supported when a same network node handles scheduling for the MAC instances of the different types including LTE MAC instance and NR MAC instance. A WTRU may be configured by higher layer protocols to determine whether a function may be supported when there is an interface in between nodes. The interface may be an ideal interface.

A WTRU configured to use a full NR L2 stack may be deployed with example architectures shown in FIGS. 9A and 9B. The architecture shown in FIG. 9B may, for example, enable URLLC use cases with LTE assisted NR (e.g., LTE assisted NR access). From a layer 2 perspective the protocol stack may be similar to the NR unassisted L2 protocol stack (e.g., to the stand-alone case). Impacts to RLC may occur in various ways. For example, a PDCP protocol may support LTE functionalities for security when an NR node has a connection (e.g., direct connection) to a 4G network and when there may be a requirement to support security. A PDCP may be an LTE PDCP or an NR PDCP that supports security, which may be compatible with LTE security. A protocol stack may be the same as the standalone NR protocol, for example, when an NR node may be connected to an NR node. Techniques and/or approaches may be developed for QoS/channel quality feedback. An LTE eNB may be notified of NR quality, such as channel quality or whether QoS is being met in NR.

NR and LTE physical channels may be combined. FIG. 13 is an example of combining NR and LTE physical channels. A WTRU may transmit data over one or both air interfaces for NR and LTE. In FIG. 13, a logical decision point may be used to transmit data to a WTRU. The data for a WTRU may be carried on an LTE TrCH 1302 or an NR TrCH 1304. The LTE TrCH 1302 and/or the NR TrCH 1304 may reside on the same carrier 1306 and/or may be transmitted simultaneously (e.g., to/from different or same sources/destinations).

Figure 14:
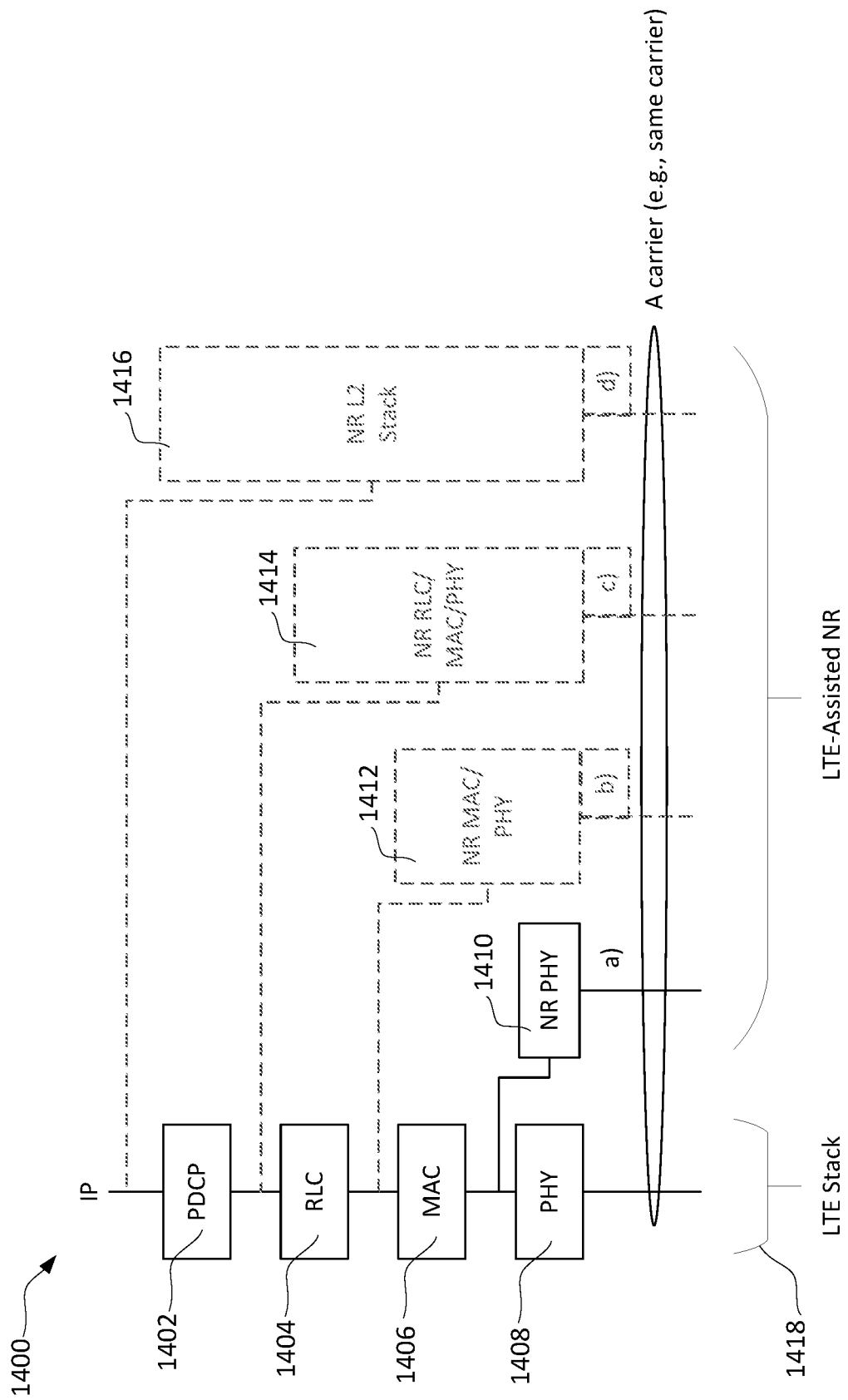
FIG. 14 is an example of a protocol stack of combining NR and LTE physical channels.

FIG. 14 is an example of a protocol stack 1400 of combining NR and LTE physical channels. From a protocol stack perspective, a WTRU may have a connection to the LTE network via the LTE Uu and/or via the NR PHY (e.g., as shown in FIG. 14). A WTRU may or may not be configured to transmit and/or receive from a single interface at a time. Similar to an LTE-assisted implementation (e.g., the implementation as shown in FIG. 11), there may be different variations of how the protocol stack for LTE and NR interact (e.g., examples (a)-(d) shown in FIG. 14). There are a variety of implementations to connect an NR Uu system and/or NR physical channels onto an LTE protocol stack 1418. LTE protocol stack 1418 may include a PDCP layer 1402, a RLC layer 1404, an MAC layer 1406, a PHY layer 1408, and/or other layers such as an IP layer. LTE-assisted radio access supporting NR may be achieved, for example, by connecting the NR air interface that includes an NR PHY 1410 after the LTE MAC 1406, by connecting the NR air interface that includes an NR MAC/PHY 1412 after the LTE RLC 1404, or by connecting the NR air interface that includes an NR RLC/MAC/PHY 1414 after the LTE PDCP 1402. A full NR L2 stack 1416 may be provided (e.g., as shown in FIG. 11). Protocols may be used alone or in combination with one or more architecture approaches. Protocol stack examples (a)-(d) or other examples may be implemented alone or in a combination. In an example, it may be assumed that the data may be transmitted in the same carrier. In an example, an NR PHY may not overlap with LTE common signals/resources, e.g., for backwards compatibility.

The spectrum used by an NR carrier may overlap with the spectrum used by the LTE carrier. The overlap may be an entire overlap or a partial overlap. For example, if the spectrum for an NR carrier partially overlaps with the spectrum of the LTE carrier, a portion (e.g., non-overlapping portion) of the NR spectrum may be free of the presence of some LTE signals including LTE common signals and/or LTE symbols. In an example, an NR signal may be located in the guard band of an LTE cell, an LTE set of resources, an LTE set of PRBs, an LTE spectrum etc. A portion of the NR signal may overlap with a portion of the LTE band adjacent to the guard band used by NR.

In an overlapping spectrum or an overlapping portion of an NR spectrum or LTE spectrum, a WTRU with legacy such as LTE capabilities may be compatible with a WTRU with NR capabilities. The WTRU with LTE capabilities may use physical resources that are configured for LTE transmissions in the overlapping spectrum. The WTRU with NR capabilities may use some or all of the physical resources that are configured for LTE transmissions. The WTRU with NR capabilities may determine which physical resources (NR PHY physical resources) to use to reduce possible interference with the LTE transmissions.

The WTRU may be configured with a set of resources (e.g., in frequency) associated to a RAT. For example, the WTRU may be configured to use a first set of resources associated with LTE and a second set of resources associated with NR. For example, the set of resources (e.g., in frequency) may include an overlapping portion and/or a non-overlapping portion. In one or more examples, the WTRU may be scheduled for a NR transmission spanning resources over one or more RATs. For example, the WTRU may receive a DCI (e.g., via a control channel). The DCI may allocate resources for data reception. The allocated resources may be contained in the LTE spectrum, in the NR spectrum, or over the LTE spectrum and the NR spectrum. For example, the allocated resources may be confined in the LTE spectrum, in the NR spectrum, or in the LTE spectrum and the NR spectrum. In one or more example, if the WTRU is configured to determine the set of resources for which NR is transmitted over LTE spectrum. The WTRU may be configured to determine based on the approaches describes herein the set of resources to ignore in reception of the NR signal over the LTE spectrum (i.e. the set of LTE REs to ignore.)

Figure 15:
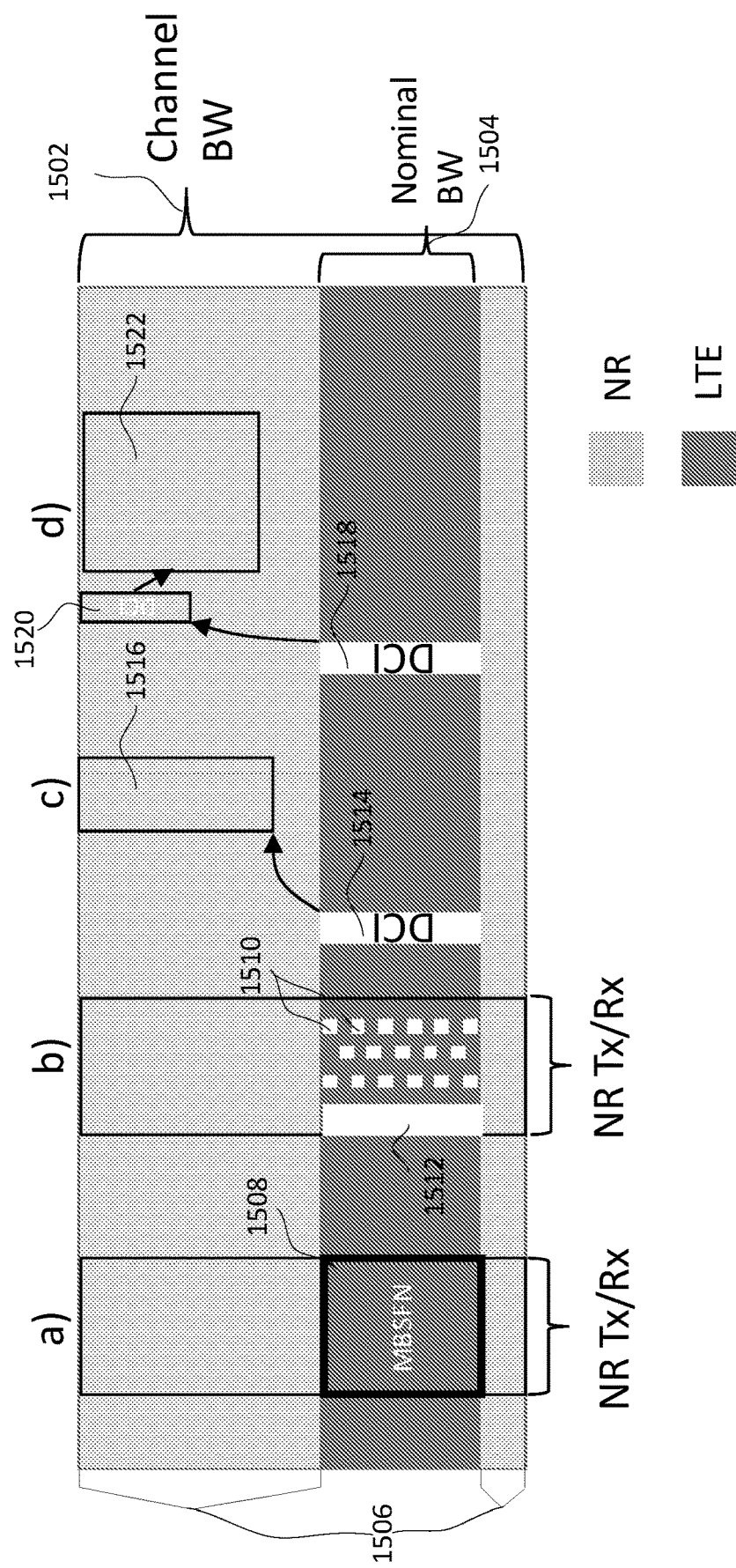
FIG. 15 illustrates examples of various approaches for using LTE resources for NR transmissions.

FIG. 15 illustrates examples of various approaches for using an overlapping and/or non-overlapping spectrum for NR transmissions. One or more of the various approaches may be combined and/or different approaches may be used for different transmissions. In FIG. 15, NR RAT may use some or all ranges of a channel bandwidth 1502 for NR transmissions. LTE RAT may use nominal bandwidth 1504 for LTE transmissions. The nominal bandwidth 1504 may include portions where the channel bandwidth 1502 and the nominal bandwidth 1504 overlap. In one or more of the approaches, NR transmissions may occur in the non-overlapping bandwidth 1506 (e.g., the portion of channel BW 1502 that does not include nominal bandwidth 1504). For example, the NR transmissions may occur in non-overlapping bandwidth 1506 (e.g., in approach d and/or approach c)). In one or more examples, the NR transmissions for data traffic may occur in the overlapping bandwidth 1504 and/or the non-overlapping bandwidth 1506 (e.g., in approach a) and/or b)). The overlapping bandwidth 1504 and/or the non-overlapping bandwidth 1506 may represent an overlapping portion or a non-overlapping portion of a set of NR resources.

In approach a), a WTRU may be configured to receive an NR transmission that at least partially overlaps with the LTE bandwidth. The NR transmission may be configured to overlap with the LTE bandwidth during a MBSFN subframe(s)subframes 1508 of the LTE scheme. Thus, certain LTE common references signals and/or LTE data may not be present in a MBSFN subframe and thus may be used for NR transmission. During such a MBSFN subframe, the nominal bandwidth may include NR PHY reference signals, for example, when WTRU-specific reference signals are used.

In approach b), a WTRU may be configured to receive NR PHY signals that at least partially overlap with the LTE spectrum. For example, in approach b), the LTE subframe may be a normal LTE subframe that includes LTE synchronization signal(s), LTE control channel(s), LTE reference signal(s), etc. The WTRU receiving an NR signal over the LTE bandwidth in approach b) may be configured to ignore the resources in the LTE bandwidth used for LTE synchronization signal(s), LTE control channel(s), LTE reference signal(s), etc. and may assume that the NR signal is present in the LTE bandwidth that does not include the LTE synchronization signal(s), LTE control channel(s), LTE reference signal(s), etc. For example, the NR signal may be present in resource elements and/or OFDM symbols that do not include RSs 1510 (e.g., CRS, DM-RS, etc.) and the WTRU may ignore the REs and/or the OFDM symbols containing RSs 1510. Similarly, the WTRU may be configured to assume that symbols corresponding to CRS. The WTRU control channel 1512 (e.g., PDCCH) may be ignored when performing NR reception over the LTE bandwidth. The resources used by some or all of the LTE signals described herein may not be included in an overlapping portion of a set of NR resources. The WTRU may receive an indication of the RS and/or control channel configured via another control channel (e.g., an NR control channel and/or via physical control format indicator channel (PCFICH)), via control channel 155, via broadcast signaling, and/or via a higher layer (e.g., RRC) configuration).

In approach c), a WTRU may be configured to receive a DCI 1514 over the overlapping bandwidth 1504 (e.g., LTE spectrum). The DCI may be received via an LTE control channel such as the PDCCH and/or EPDCCH. The DCI may include scheduling information on the resources for receiving NR PHY signals 1516. The WTRU may receive the NR PHY signals via non-overlapping bandwidth 1506 (e.g., NR spectrum) according to the DCI 1514 received over the overlapping bandwidth 1504 (e.g., LTE spectrum).

In approach d), a WTRU may be configured to receive a DCI 1518 over the overlapping bandwidth 1504 (e.g., LTE spectrum). The DCI may be received via an LTE control channel such as the PDCCH and/or EPDCCH. The DCI 1518 received over the overlapping bandwidth 1504 (e.g., LTE spectrum) may include scheduling information pointing or referring to an additional DCI 1520 (NR control information/NR control channel) that may be received over non-overlapping bandwidth 1506 (e.g., NR spectrum). The DCI 1520 received over non-overlapping bandwidth 1506 (NR spectrum) may include scheduling information on the resources for receiving NR PHY signals 1522. The WTRU may receive the NR PHY signals 1522 via non-overlapping bandwidth 1506 (e.g., NR spectrum) according to the DCI 1520 received over non-overlapping bandwidth 1506 (e.g., NR spectrum).

In an example, NR PHY physical resources may be configured to avoid physical resources allocated to a common control channel and/or certain signals used for a legacy radio access technology (RAT) such as LTE RAT. The physical resources allocated to the common control channel and/or certain signals used for a legacy radio access technology (RAT) such as LTE RAT may be on a time-frequency grid. The time-frequency grid may be associated with a legacy radio access technology (RAT) such as LTE RAT. The portions of the time-frequency grid used for NR reception may comprise the REs not used for the LTE RSs, control channels, etc.

A WTRU receiving NR signals over an LTE carrier may ignore one or more sets of signals, REs, and/or symbols. The WTRU may ignore the one or more sets of REs or symbols in the time-frequency grid when decoding the NR signals. The WTRU receiving NR signals over the LTE carrier may determine which set of REs and/or symbols to ignore. The set of REs and/or symbols to ignore may not be continuous. For example, the set of REs and/or symbols to ignore may be comprised in one or more physical resource blocks (PRBs). The set of REs and/or symbols to ignore may be continuous. For example, the set of REs and/or symbols to ignore may be within a PRB.

The WTRU may be configured to ignore one or more sets of REs and/or symbols from an overlapping portion of a NR set of physical resources. For example, the spectrum used by an NR carrier may overlap with the spectrum used by the LTE carrier. The one or more sets of REs and/or symbols may be allocated to signals used in an overlapping portion of the NR set of resources. The overlapping portion of the NR set of resources may be commonly used by NR and LTE RATs. The signals used in the LTE RAT may include one or more of common control signals, cell-specific broadcast signals, cell-specific reference signals (CRS), physical downlink control channel (PDCCH), primary synchronization signals (PSS)/secondary synchronization signals (SSS), and/or channel state information reference signals (CSI-RS). The WTRU may or may not be configured to ignore REs and/or symbols in a non-overlapping spectrum (e.g., the NR spectrum).

The WTRU may be configured to ignore a subset of the common control signals used in the LTE RAT and use another subset of the common control signals. The WTRU may be configured to use one or more of the signals used in the LTE RAT and/or one or more sets of REs and/or symbols allocated to signals used in the LTE RAT. For example, the WTRU may use the CRS to improve the channel estimation for NR PHY transmission including reception. The sets of REs and/or symbols to ignore may be dynamically configured. For example, the WTRU may receive a PDCCH used in the LTE RAT. The PDCCH received may include an indication of the sets of REs and/or symbols to ignore. The sets of REs and/or symbols to ignore may be determined from an LTE signal (e.g., PCFICH). In an example, a WTRU may receive a signal used in the LTE RAT (e.g., PCFICH). The signal used in the LTE RAT may be associated with a value. The WTRU may determine sets of REs and/or symbols to ignore using the value of the signal used in the LTE RAT. A WTRU may receive NR transmissions and/or signals (NR transmissions hereafter) on certain physical resources while ignoring the one or more sets of signals, REs, and/or symbols.

A WTRU may be dynamically configured to use certain physical resources to receive NR transmissions (e.g., via an indication). For example, the WTRU may receive a PDCCH in the LTE RAT. The PDCCH may schedule one or more subframes over which the WTRU may receive NR transmissions. A WTRU may be configured to monitor the PDCCH for a signal or message that indicates the one or more subframes over which the WTRU may receive NR transmissions. The indication may be related to a DCI such as a DCI with a certain format. The WTRU, upon receiving the indication, may determine the one or more subframes over which the WTRU may receive NR transmissions. The one or more subframes may include a subframe over which the WTRU received the indication (the current subframe).

A WTRU may be statically or semi-statically configured to use certain physical resources to receive NR transmissions. For example, a WTRU may be configured through RRC signaling to use physical resources (e.g., REs) allocated on a certain subframe(s) and/or certain physical resource blocks (PRBs). The subframe(s) and/PRBs containing REs used by the WTRU to receive the NR transmissions may be periodic. The subframe(s) and/PRBs containing REs used by the WTRU to receive the NR transmissions may be based on the LTE RAT. The RRC signaling may enable a cell/eNB/node to configure physical resources used for NR transmissions and physical resources used for LTE transmissions. The cell/eNB/node may configure and/or allocate resources between the NR transmissions and the LTE transmissions based on a traffic profile and/or traffic requirements. The traffic profile and/or traffic requirements may be an ongoing one.

A WTRU may be configured to receive NR transmissions on a multicast broadcast single frequency network (MBSFN) subframe. The MBSFN subframe may be one of MBSFN subframes that are based on the LTE RAT. The MBSFN subframe may include physical resources used for the NR transmissions. Some or all of the MBSFN subframes that are based on the LTE RAT may not include physical resources used for the NR transmissions. The WTRU may be indicated a set of MBSFN subframes including physical resources used for the NR transmissions via static, semi-static or dynamic signaling. For example, the WTRU may be indicated the MBSFN subframe including physical resources used for the NR transmissions via RRC signaling and/or the like. The RRC signaling message may include system information that indicates the MBSFN subframe including physical resources used for the NR transmissions. The WTRU may be indicated the MBSFN subframe including physical resources used for the NR transmissions via a PDCCH and/or the like. For example, the MBSFN subframe may include, LTE common reference signals including CRSs, WTRU-specific reference signals, and/or the like (as well as physical resources used for the NR transmissions, NR (e.g., NR PHY) reference signals). The WTRU may be configured to ignore the LTE common reference signals, receive the NR PHY reference signals via the physical resources used for the NR transmissions, and/or use the NR PHY reference signals. In an example, the WTRU may be configured to ignore the LTE common reference signals and/or receive the NR PHY reference signals via the physical resources used for the NR transmissions. The WTRU may be configured to use the NR PHY reference signals when WTRU-specific reference signals are received and/or used. The WTRU may be configured to use some or all signals based on LTE RAT in the MBSFN subframe such as the LTE common reference signals to improve channel estimation. For example, the WTRU may be configured to use the LTE common reference signals to improve channel estimation when common reference signals are received and/or used. The WTRU may be configured to receive NR transmissions in physical resources not containing CRS on a time-frequency grid. The MBSFN subframe may include a control region. The WTRU may be configured to receive NR transmissions in physical resources not belonging to the control region (e.g., following the control region). The physical resources not containing CRS and/or the physical resources not belonging to the control region may include one or more OFDM symbols.

A WTRU may be configured to receive NR transmissions via certain channels. A WTRU may use the channels for some or all NR transmissions (e.g., NR PHY channels). Certain channels (other than the channels used for some or all NR transmissions) may be used for some or all LTE transmissions (e.g., LTE PHY channels). Channel mapping may include configuring the channels used for some or all NR transmissions and/or the channels used for some or all LTE transmissions. The WTRU may be statically, semi-statically, and/or dynamically configured to receive NR PHY channels and/or LTE PHY channels. For example, the configuration may be received via RRC signaling. The configuration may be predefined. The WTRU may be configured to receive dedicated traffic (or channels) over the NR PHY and/or common traffic (or channels) via the LTE PHY. The common traffic may include broadcasting signals, paging signals, and/or the like.

A WTRU may be configured to use a bandwidth that is not used by the system bandwidth configured for the legacy RAT such as LTE RAT. The bandwidth that is not used by the system bandwidth configured for the LTE RAT may be outside the system bandwidth configured for the LTE RAT (e.g., extended bandwidth). The WTRU may be configured to use NR PHY channels in the extended bandwidth for control or data. For example, the WTRU may have LTE capabilities and NR capabilities. The WTRU may be configured through LTE broadcast signaling to use the extended bandwidth to receive some or all NR transmissions. In one or more examples, a 5 MHz LTE system bandwidth may operate over a 20 MHz bandwidth or channel. The 20 MHz bandwidth or channel outside the 5 MHz LTE system bandwidth may be used for some or all NR transmissions while the 5 MHz LTE system bandwidth are used for some or all LTE transmissions. 20 MHz bandwidth or channel may be based on LTE RAT. The extended bandwidth may be used for downlink and/or uplink transmissions.

A WTRU may be configured to receive transmissions (e.g., data) related to certain logical channels using NR PHY (e.g., NR PHY logical channels). The logical channels may differ from some or all logical channels based on LTE RAT (e.g., in type). The logical channels may be related to NR transmissions. Receiving transmissions related to NR PHY logical channels via NR PHY may allow transmissions related to certain type of services and/or traffic to occur over NR. The type of services and/or traffic may be generated to run based on NR. The protocol stack may be adapted to enable receiving transmissions related to NR PHY logical channels via NR PHY. For example, as shown in FIG. 14, the LTE protocol stack 1418 may be split above the MAC layer 1406 with NR MAC and PHY 1412 and LTE RLC 1404 and LTE PDCP 1402. In one or more examples, hooks may be added in the LTE MAC layer to map the logical channels to NR transport channels. The NR transport channels may be dedicated channels.

A WTRU may be configured to send transmissions in an uplink using one or more of the techniques (e.g., as described herein). A WTRU sending NR signals over an LTE carrier may ignore one or more sets of signals, REs, and/or symbols that are based on LTE RAT. The WTRU may be configured to ignore the PUCCH region and/or consider the PUCCH region as not being part of the NR PHY uplink resources. In one or more examples, the WTRU may be configured to use the PUCCH region for NR PHY feedback. A WTRU may be configured dynamically to use LTE PHY or NR PHY in associated subframe(s). For example, the WTRU may be dynamically configured via a part of a grant received over a PDCCH to use LTE PHY or NR PHY in associated subframe(s). An indication may be dynamically transmitted to the WTRU. The indication may be explicit (e.g., using a special field on the DCI) or may be implicit (e.g., based on the RNTI received).

Band and/or subframe may be decoupled in various ways. A WTRU may be configured to use a separate carrier for NR PHY (e.g., either on the uplink or the downlink) in FDD operations. For example, a WTRU may be configured to use an uplink NR PHY carrier and a downlink carrier shared between NR and LTE. In an example, a WTRU may be configured to use an NR PHY downlink carrier and an uplink carrier shared between LTE and NR. A WTRU may be configured to use a separate carrier for LTE PHY (e.g., either on the uplink or the downlink). For example, a downlink carrier may be LTE PHY while the uplink carrier may be shared between NR and LTE.

A WTRU may be configured to use a set of subframes for NR PHY shared with LTE PHY and a set of subframes for LTE-only in TDD operation. The set of subframes for LTE-only may be further separately configured for uplink and/or downlink operations.

A WTRU may send NR uplink transmission in LTE spectrum. In one or more examples, the WTRU may be configured to transmit NR signals over LTE spectrum. The LTE spectrum may be used by other WTRUs with LTE capabilities. Possible interference caused to sounding reference signals (SRS) from other WTRUs may be avoided. The WTRU (e.g., with NR capabilities) may be configured to transmit during some symbols corresponding to a LTE subframe. For example, the WTRU may be configured to transmit in the last symbol of the LTE subframe (or a plurality of symbols at the end of the LTE subframe). The symbol(s) may include a symbol(s) configured for the SRS transmission.

In one or more examples, the WTRU may be configured to refrain from transmitting over some symbols during certain set of subframes. The symbols over which the WTRU refrains from transmitting may include the last symbol of an LTE subframe. The set of subframes may include subframes known to contain (or likely to contain) SRS. The WTRU may receive from the NW a configuration indicating which subframes the WTRU should refrain from using the last symbol(s) of the subframes for transmissions. This configuration may comprise a periodic schedule of one or more subframes.

Figures 16, 17:
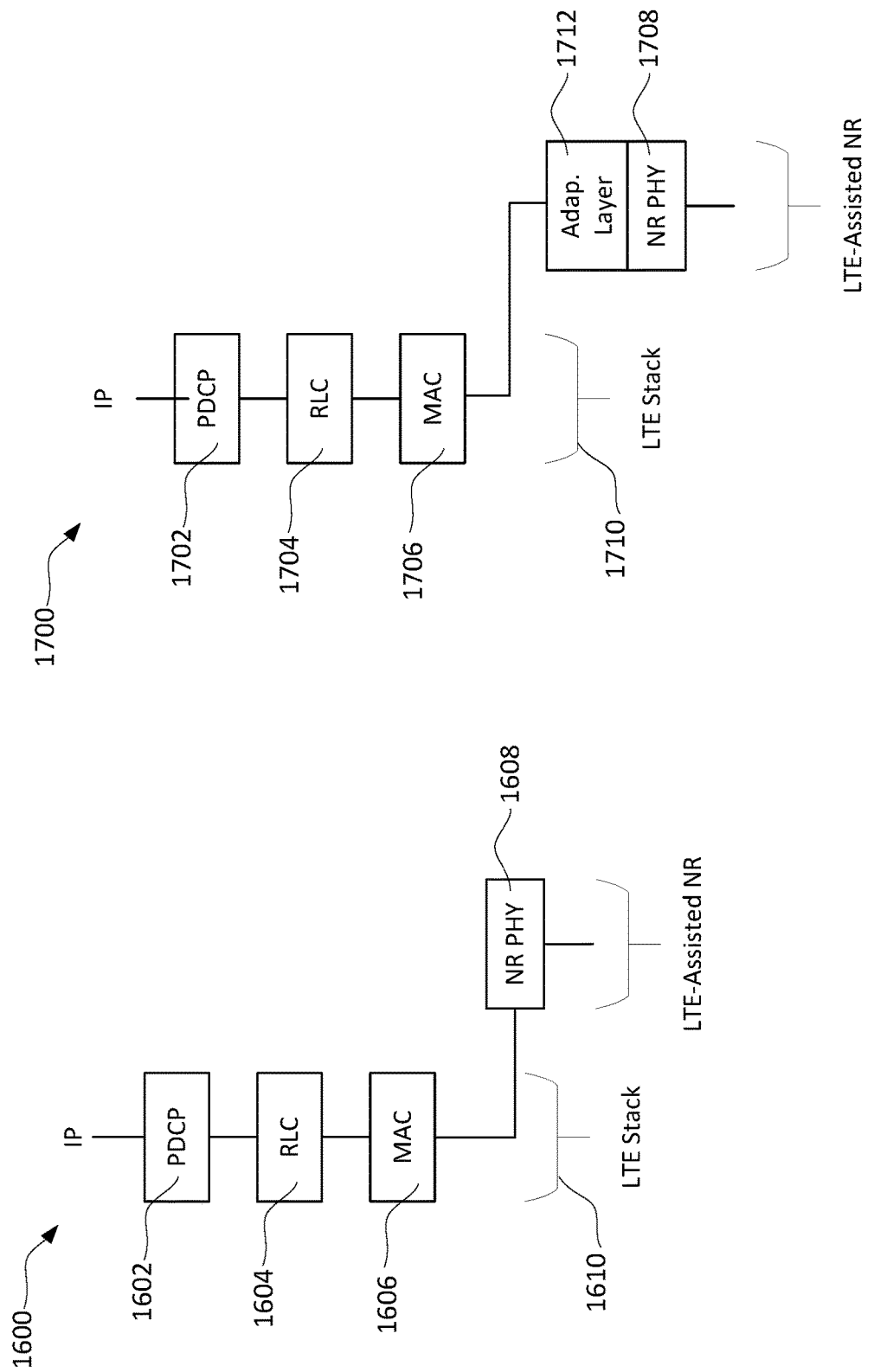
FIG. 16 is an example of an LTE protocol stack with NR PHY.
FIG. 17 is an example of an NR to LTE MAC adaptation layer.

An NR Uu interface may reuse one or more LTE components or signals. FIG. 16 is an example of an LTE stack with NR PHY. In FIG. 16, NR PHY 1608 may interact with the LTE stack 1610. The LTE stack 1610 may include a PDCP layer 1602, a RLC layer 1604, an MAC layer 1606, and/or other layers such as an IP layer. A WTRU may be configured to use an NR PHY 1608 in combination with an LTE stack 1610. FIG. 16 may be an example for combined NR and LTE physical channels shown in FIG. 13. In FIG. 16, there may not be LTE signals present on a carrier. In the example shown in FIG. 16, the NR PHY 1608 may be configured to interact with the LTE MAC 1606 in a manner similar to the way in which a LTE PHY interacts with an LTE MAC. An NR PHY may have parameters and functionalities that are different from an LTE PHY. In one or more examples, the WTRU may be configured to use an adaptation layer. The adaptation layer may perform translation between the NR PHY 1608 and the LTE MAC 1606.

FIG. 17 is an example of an LTE stack with NR PHY and an adaptation layer. The LTE stack 1710 may include a PDCP layer 1702, a RLC layer 1704, an MAC layer 1706, and/or other layers such as an IP layer. NR PHY 1708 may be configured to have some similarity with an LTE PHY from the LTE MAC 1706 point-of-view. In an example, a WTRU may be configured to use an adaptation layer 1712 to perform translation between NR PHY 1708 and LTE MAC 1706. The adaptation layer 1712 may be used to convert control mechanisms associated with or indicated by the LTE physical layer into one or more control mechanisms associated with the NR physical layer 1708. The adaptation layer 1712 may be used to convert control mechanisms associated with or indicated by the NR physical layer 1708 into one or more control mechanisms associated with the LTE physical layer. Adaptation layer converting parameters and/or control messages may be used.

The adaptation layer may perform HARQ process number translation. For example, a WTRU adaptation layer may be configured to perform conversion of HARQ process parameters. An adaptation layer may be configured to translate a 4G HARQ process number (e.g., up to 8) into an NR HARQ process (e.g., up to 16).

The adaptation layer may perform feedback translation. In an example, a WTRU adaptation layer may be configured to perform translation of feedback (e.g., ACK/NACK) signals. ACK/NACK timing of NR PHY may be different than LTE ACK/NACK timing. The LTE MAC layer may be informed with appropriate timing. A WTRU adaptation layer, for example, may be configured to store the received ACK/NACK and/or may delay delivery to the LTE MAC layer to the appropriate time. A WTRU adaptation layer may keep track of a WTRU transmission, for example, to be able to deliver the ACK/NACK with the appropriate timing.

The adaptation layer may perform access adaptation. In an example, a WTRU adaptation layer may be configured to perform adaptation of an access protocol. For example, a WTRU adaptation layer may be configured to determine the appropriate time for transmission according to the NR PHY and/or may provide appropriate indication to the LTE MAC.

An NR network may be configured to support the network and/or radio access architectures (e.g., as described herein). The NR network including NR node(s) and/or WTRUs with NR capabilities (NR WTRU hereafter) may be developed to facilitate LTE-assisted radio access supporting NR and/or LTE-NR coexistence. An NR RAT may be used to facilitate the coexistence of the RAT with legacy (e.g., LTE) signals/subframes and/or reduce possible performance loss of legacy WTRUs (e.g., the WTRUs with LTE capabilities). For example, NR transmissions, channels, and/or signals may be used in various ways such that the performance of the legacy WTRU are not degraded. The functions of the legacy WTRUs such as cell acquisition, measurement(s), cell reselection, data demodulation, and/or the like may be preserved. For example, WTRUs with NR capabilities may be configured to avoid transmitting signals on resources occupied by one or more of CRS, PDCCH, PSS/SSS, CSI-RS, other reference signals, and/or other LTE signals.

An NR WTRU may be configured to determine a configuration of resources used for transmission and/or signals of a legacy RAT (e.g., LTE RAT). The NR WTRU may be configured to determine formats of subframes used for transmission and/or signals of a legacy RAT (LTE subframe format hereafter). The NR WTRU may be configured to determine the LTE subframe format based on transmission from a network and/or node of an LTE RAT or an NR network and/or NR node.

The LTE subframe format may be configured by one or more parameters and/or a resource map. The LTE subframe format may be configured by one or more parameters including a CRS format (as function of a number of antenna ports), a number of OFDM symbols used for PDCCH, a subframe type (e.g., normal DL subframe, MBSFN subframe, and/or other type or subframe), a number of PDCCH, the presence and the configuration of LTE signals, and/or the like. The LTE signals may include one or more of CRS, PDCCH, PSS/SSS, CSI-RS, other reference signals, and/or other LTE signals. The LTE subframe format may change dynamically based on the one or more parameters described herein.

The LTE subframe format may be configured by a set of resources (e.g., a resource map), for example, to indicate to an NR WTRU which resources are used for certain types of LTE signals. The NR WTRU may be configured to determine the LTE subframe format based on the resource map. The resource map may indicate which resources are used for corresponding LTE signals. The NR WTRU may be configured to determine whether to ignore and/or mask certain resources based on the resource map. An LTE subframe mask may be used to configure the set of resources to be ignored and/or masked. The WTRU may be statically/semi-statically configured to use one or more LTE subframe masks (e.g., via RRC signaling). The subframe masks may indicate which subframes and/or physical resources may be ignored or skipped by the NR WTRU. The resources may include one or more resource elements (REs), resource blocks (RBs), and/or symbols.

An NR WTRU may be configured to determine the LTE subframe format based on transmission from a network and/or node of an LTE RAT. The NR WTRU may be configured to dynamically obtain the LTE subframe format from the LTE eNB and/or from configuration originating from the LTE eNB. The NR WTRU may determine LTE subframe format by monitoring LTE signals. For example, the NR WTRU may be configured to monitor and/or decode the PCFICH to determine the number of PDCCH symbols. The NR WTRU may be configured to acquire the synchronization signal(s) and/or cell synchronization to determine the resources associated with the synchronization signals. The NR WTRU may decode the MIB and/or one or more SIBs to obtain the information about the subframe format (e.g., MBSFN subframes or SIB2). The NR WTRU may determine the number of antenna ports (e.g., 1, 2 or 4) for the common reference symbols (CRS) in a cell. The cell may be example of a set of resources, a set of PRBs, a spectrum etc. The NR WTRU may decode the MIB using a blind approach with a cyclic redundancy check (CRC) mask verification.

The NR WTRU may be configured to obtain the LTE subframe format from the LTE eNB and/or from configuration originating from the eNB statically or semi-statically. The NR WTRU may be configured to monitor and/or receive RRC configuration messages from the LTE eNB. For example, the NR WTRU may receive a configuration of LTE subframe format for CSI-RS. The NR WTRU may receive configuration information for a schedule of downlink CSI-RS signals. The NR WTRU may use the configuration information to determine the time/frequency position (e.g., the location of CSI-RS signals on a time-frequency grid). The NR WTRU may ignore the resources allocated to the CSI-RS signals (e.g., on the time-frequency grid) when decoding NR signals based on the configuration information. The NR WTRU may ignore a portion or an entirety of an OFDM symbol related to the CSI-RS signals based on the configuration information.

The NR WTRU may be configured to dynamically obtain the LTE subframe format from the NR node and/or from configuration originating from the NR network and/or the NR node. For example, the LTE subframe format may be dynamically indicated by the NR network and/or the NR node. The NR WTRU may monitor a dynamic control channel of the NR network and/or the NR node indicating the LTE subframe format. The dynamic control channel may allocate data for the NR WTRU in a bandwidth that is used by LTE transmissions. Based on the LTE subframe format, the NR WTRU may determine a set of resources to use for reception of NR transmissions and/or a set of resources to ignore, mask, and/or mute. For example, the NR WTRU may ignore the resources occupied by LTE reference signals when the WTRU receives and/or demodulates NR signals including data/control information.

Figure 18:
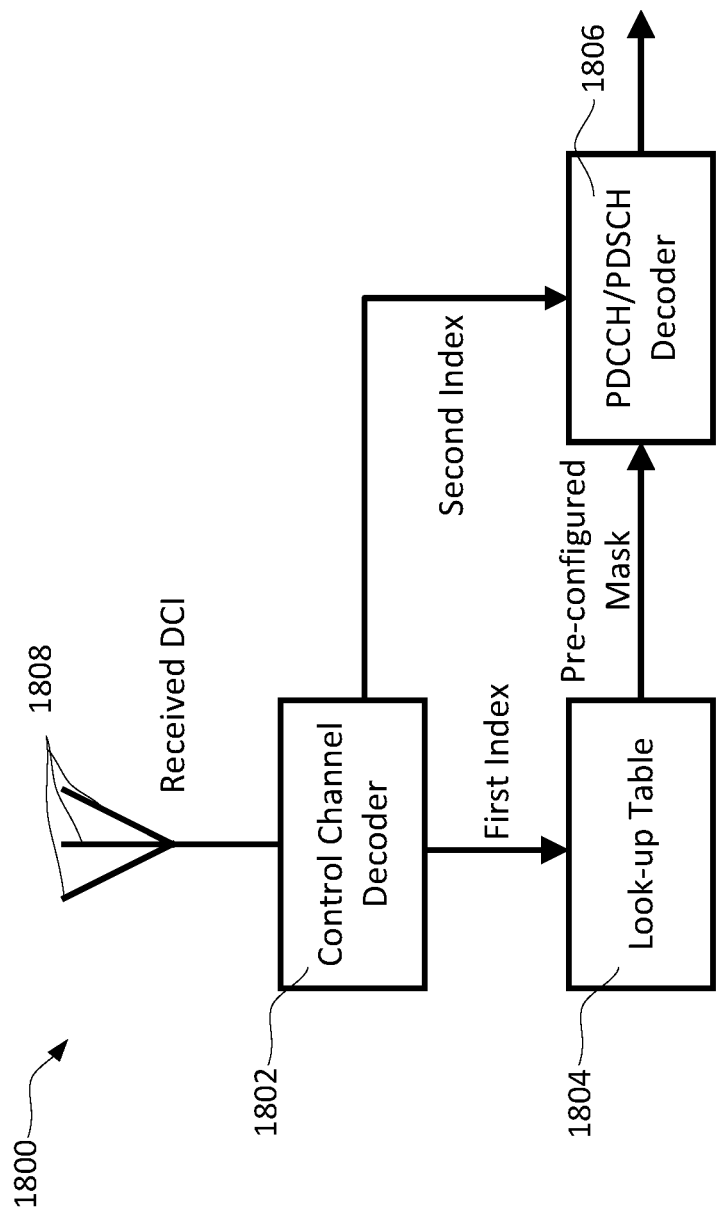
FIG. 18 is an example of a process flow for configuring a LTE subframe format using a set of parameters or a mask.

The NR WTRU may determine the set of resources to ignore based on a dataset and/or a configuration dynamically received from the NR network and/or the NR node. The dataset and/or the configuration may indicate an LTE subframe format. The NR WTRU may have a dataset (e.g., a preconfigured dataset) stored in the NR WTRU. The dataset may include a lookup table comprising one or more sets of indices for an index-to-index lookup. A dataset may map the LTE subframe format (e.g., a set of parameters or a mask) to an index stored in the NR WTRU. FIG. 18 illustrates an example process 1800 for an NR WTRU determining an LTE subframe format using a dataset. The NR WTRU may include a control channel decoder 1802, a look-up table 1804, and a PDCCH/PDSCH decoder 1806. The NR WTRU may receive a dynamic indication (e.g., a DCI) through antenna ports 1808. The control channel decoder 1802 may decode the received DCI and provide a first index to a look-up table and a second index to the PDCCH/PDSCH decoder 1806. The first index and the second index may be related (e.g., the same). The look up table may include a set of indices with corresponding pre-configured masks. The NR WTRU may determine a pre-configured mask based on the first index and provide the pre-configured mask to the PDCCH/PDSCH decoder 1806. The PDCCH/PDSCH decoder 1806 may use the pre-configured mask based on the second index that the PDCCH/PDSCH decoder 1806 received to determined the set of resources to ignore, mask and/or mute.

The NR WTRU may be configured to dynamically obtain a set of parameter(s) and/or corresponding values for the set of parameters (e.g., the set of parameters described herein for determining an LTE subframe format) from the NR node and/or from configuration originating from the NR node. The NR WTRU may determine the set of resource elements to ignore, mask, and/or mute based on the set of parameters and/or the corresponding values. The set of parameters and/or the corresponding values may be signaled to the NR WTRU via dynamic control channels. The NR WTRU may be configured to decode the set of parameters and/or the corresponding values transmitted on the dynamic control channels. The NR WTRU may be configured to determine the set of resource elements to ignore, mask and/or mute during the decoding of PDCCH/PDSCH based on set of parameters and/or the corresponding values. Table 1 illustrates an example of the set of parameters and the number of bits that may be used to signal the set of parameters.

TABLE 1

| Parameter | Number of bits |
| --- | --- |
| Number of PDCCH symbols | 2 bits |
| Presence of CSI-RS | 1 bit |
| Subframe type | 1 bit |
| Presence of PSS/SSS | 1 bit |
| Other Parameters | M bits |

The NR WTRU may determine the set of resources to ignore, mask and/or mute based on the dataset and the configuration dynamically received from the NR node that indicates the set of parameters and/or corresponding values. The NR WTRU may be configured to monitor one or more indices transmitted on the control channel. An index may be associated with a combination of parameter values that are collected in a dataset. The NR WTRU may have the dataset (e.g., a preconfigured dataset) stored in the NR WTRU. The NR WTRU may determine the set of resources to ignore, mask and/or mute based on the dataset and the indices received from the NR node. For example, the dataset may include a look-up table containing the indices with corresponding parameter values. The look-up table may be pre-stored in the WTRU and/or may be configured for the WTRU using broadcast or dedicated signaling. Table 2 is an example of a look-up table. The WTRU may be configured to decode the index transmitted on the control channel and/or to determine the LTE subframe format by consulting the pre-configured look-up table.

TABLE 2

| Format Index | PDCCH region 1/2/3 symbols | Carrying CSI-RS Y/N | Carrying PSS/SSS Y/N | Subframe type Normal/MBSFN |
| --- | --- | --- | --- | --- |
| 0 | 2 | Y | N | Normal |
| 1 | 2 | N | N | Normal |
| 2 | 3 | Y | N | Normal |
| ... | | | | |

The configuration that indicates the set of parameters and/or corresponding values may be received from the NR node via control channels. The NR WTRU may be configured to monitor the LTE PDCCH for the set of parameters and/or corresponding values. The WTRU may be configured to monitor the control channels including the group PDCCH in NR or WTRU-specific NR PDCCH. The LTE subframe format may be indicated in a DCI.

In one or more examples, a subset of parameters such as number of antenna ports (e.g., the CRS pattern) may be pre-configured, statically-configured, and/or semi-statically configured by the NR network (e.g., via RRC signaling to the WTRU). The WTRU may be configured and/or scheduled with an LTE subframe format via RRC signaling. The WTRU may be scheduled by RRC signaling for a number of upcoming subframes. The configuration may be periodic or aperiodic.

Systems, methods, and instrumentalities (e.g., aspects of entities, interfaces and procedures, such as protocol stack procedures and functions in a wireless transmit/receive unit (WTRU) and/or network layers L1, L2) have been disclosed for Long Term Evolution (LTE)-assisted processing and control architecture in NR flexible radio access technology (RAT) systems. Examples are provided for architectures and associated control/user plane aspects. Examples are provided for NR physical layer (PHY) with an LTE medium access control (MAC), e.g., via an adaptation layer translating LTE-MAC related functions, such as hybrid automatic repeat request (HARQ) control. Examples are provided for NR PHY sharing LTE spectrum. NR PHY resources may be defined around LTE resources in multicast-broadcast single-frequency network (MBSFN) subframes.

The processes and instrumentalities described herein may apply in any combination, may apply to other wireless technologies, and for other services.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU) comprising:
   a processor configured to:
   determine that a first set of resources associated with a new radio (NR) radio access technology (RAT) at least partially overlaps with a second set of resources associated with a long term evolution (LTE) RAT;
   determine that a transmission associated with the NR RAT is to be received within at least an overlapping portion of the first set of resources and the second set of resources and within a portion of the first set of resources that does not overlap the second set of resources;
   receive an indication of locations of cell specific reference signals (CRSs) associated with the LTE RAT, wherein at least a subset of the CRSs are located within the overlapping portion of the first set of resources and the second set of resources;
   determine a set of resource elements (REs) that correspond to locations of the CRSs within the overlapping portion of the first set of resources and the second set of resources;
   receive a signal over at least the overlapping portion of the first set of resources and the second set of resources, wherein the signal comprises the transmission associated with the NR RAT; and
   decode the transmission associated with the NR RAT from the signal,
   wherein the processor configured to decode the transmission associated with the NR RAT is configured to limit decoding of the transmission to the portion of the first set of resources associated with the NR RAT that does not overlap the second set of resources associated with the LTE RAT, the transmission comprised in the signal received over at least the overlapping portion of the first set of resources and the second set of resources and the portion of the first set of resources that does not overlap the second set of resources, the overlapping portion of the first set of resources and the second set of resources comprising the set of REs that correspond to locations of the CRSs.

2. The WTRU of claim 1, wherein the NR RAT and the LTE RAT share a common carrier.

3. The WTRU of claim 1, wherein the processor is further configured to receive a radio resource control, RRC, message that indicates the set of REs that correspond to the locations of the CRSs within the overlapping portion of the first set of resources and the second set of resources.

4. The WTRU of claim 1, wherein the processor is further configured to receive an indication of one or more physical resource blocks (PRBs) that comprise the set of REs corresponding to the locations of the CRSs within the overlapping portion of the first set of resources and the second set of resources.

5. The WTRU of claim 4, wherein the processor is further configured to:
receive NR downlink control channel transmission, wherein the NR control channel transmission indicates that the transmission associated with the NR RAT is not to be received via one or more symbols used for a LTE physical downlink control channel.

6. The WTRU of claim 1, wherein the transmission associated with the NR RAT is received in a multicast broadcast single frequency network (MBSFN) subframe associated with the LTE RAT.

7. The WTRU of claim 1, wherein the processor is further configured to:
receive a physical downlink control channel (PDCCH) associated with the LTE RAT, wherein the PDCCH associated with the LTE RAT indicates the set of REs that correspond to the locations of the CRSs within the overlapping portion of the first set of resources and the second set of resources; and
wherein the determination of the set of REs that correspond to the locations of the CRSs within the overlapping portion of the first set of resources and the second set of resources is based on the PDCCH associated with the LTE RAT.

8. The WTRU of claim 1, wherein the processor is further configured to:
receive a physical downlink control channel (PDCCH) associated with the LTE RAT, wherein the PDCCH associated with the LTE RAT indicates a subset of resources within a portion of the first set of resources for receiving a second transmission using the NR RAT;
determine the subset of resources within the portion of the first set of resources for receiving the second transmission using the NR RAT; and
receive the second transmission using the subset of resources within the portion of the first set of resources for receiving the second transmission using the NR RAT.

9. The WTRU of claim 1, wherein the processor is further configured to:
receive a physical downlink control channel (PDCCH) associated with the LTE RAT, wherein the PDCCH associated with the LTE RAT indicates a control channel associated with the NR RAT, the control channel associated with the NR RAT indicating a subset of resources within a portion of the first set of resources for receiving a second transmission using the NR RAT;
determine the control channel associated with the NR RAT based on the PDCCH associated with the LTE RAT;
determine the subset of resources within the portion of the first set of resources based on the control channel associated with the NR RAT; and
receive the second transmission using the subset of resources within the portion of the first set of resources.

10. The WTRU of claim 1, wherein the processor is further configured to:
receive a control channel associated with the NR RAT, wherein the control channel associated with the NR RAT comprises an indication of a format of a subframe associated with the LTE RAT;
determine a value of a parameter based on an index and a dataset;
determine the format of subframe associated with the LTE RAT based on the value of the parameter; and
wherein the determination of the set of REs that correspond to the locations of the CRSs within the overlapping portion of the first set of resources and the second set of resources is based on the format of the subframe.

11. A method performed by a wireless transmit/receive unit (WTRU) comprising:
determining that a first set of resources associated with a new radio (NR) radio access technology (RAT) at least partially overlaps with a second set of resources associated with a long term evolution (LTE) RAT;
determining that a transmission associated with the NR RAT is to be received within at least an overlapping portion of the first set of resources and the second set of resources and within a portion of the first set of resources that does not overlap the second set of resources;
receiving an indication of locations of cell specific reference signals (CRSs) associated with the LTE RAT, wherein at least a subset of the CRSs are located within the overlapping portion of the first set of resources and the second set of resources;
determining a set of resource elements (REs) that correspond to locations of the CRSs within the overlapping portion of the first set of resources and the second set of resources;
receiving a signal for use over at least the overlapping portion of the first set of resources and the second set of resources, wherein the signal comprises the transmission associated with the NR RAT; and
decoding the transmission associated with the NR RAT from the signal, wherein the decoding the transmission comprises limiting decoding to the portion of the first set of resources associated with the NR RAT that does not overlap the second set of resources associated with the LTE, the transmission comprised in the signal received over at least the overlapping portion of the first set of resources and the second set of resources and the portion of the first set of resources that does not overlap the second set of resources, the overlapping portion of the first set of resources and the second set of resources comprising the set of REs that correspond to locations of the CRSs.

12. The method of claim 11, further comprising:
receiving a physical downlink control channel (PDCCH) associated with the LTE RAT, wherein the PDCCH associated with the LTE RAT indicates a subset of resources within a portion of the first set of resources for receiving a second transmission using the NR RAT;

determining the subset of resources within the portion of the first set of resources for receiving the second transmission; and receiving the second transmission using the subset of resources within the portion of the first set of resources for receiving the second transmission.

13. The method of claim 11, further comprising:

receiving a physical downlink control channel (PDCCH) associated with the LTE RAT, wherein the PDCCH associated with the LTE RAT indicates a control channel associated with the NR RAT, the control channel associated with the NR RAT indicating a subset of resources within a portion of the first set of resources for receiving a second transmission using the NR RAT;

determining the control channel associated with the NR RAT based on the PDCCH associated with the LTE RAT;

determining the subset of resources within the portion of the first set of resources for receiving the second transmission based on the control channel associated with the NR RAT; and receiving the second transmission using the subset of resources within the portion of the first set of resources for receiving the second transmission.

14. The method of claim 11, further comprising:

receiving a control channel associated with the NR RAT, wherein the control channel associated with the NR RAT comprises an indication of a format of a subframe associated with the LTE RAT;

determining a value of a parameter based on an index and a dataset;

determining the format of subframe associated with the LTE RAT based on the value of the parameter; and wherein the determination of the set of REs that correspond to the locations of the CRSs within the overlapping portion of the first set of resources and the second set of resources is based on the format of the subframe.

15. The method of claim 14, wherein the format of the subframe is associated with a plurality of parameters including one or more of a CRS format, a number of orthogonal frequency-division multiplexing (OFDM) symbols used for a physical downlink control channel (PDCCH), a subframe type, a number of PDCCHs, or a configuration of one or more LTE signals.

16. The method of claim 15, wherein the WTRU comprises a dataset comprising an index corresponding to a value of a parameter of the plurality of parameters, and the indication of the format of the subframe associated with the LTE RAT comprises the index.

17. The method of claim 11, wherein the indication of the locations of the CRSs associated with the LTE RAT is received via radio resource control (RRC) signaling.

18. The method of claim 11, wherein the indication of the locations of the CRSs associated with the LTE RAT is received via broadcasting.

19. The method of claim 11, further comprising:

receiving an indication of locations of synchronization signals associated with the LTE RAT, wherein at least a subset of the synchronization signals are located within the overlapping portion of the first set of resources and the second set of resources, wherein a set of resources that correspond to locations of the subset of the synchronization signals within the overlapping portion of the first set of resources and the second set of resources are ignored while performing the decoding of the transmission associated with the NR RAT from the signal.

20. The method of claim 11, further comprising:

receiving an indication of locations of control channel signals associated with the LTE RAT, wherein at least a subset of the control channel signals are located within the overlapping portion of the first set of resources and the second set of resources, wherein a set of resources that correspond to locations of the subset of the control channel signals within the overlapping portion of the first set of resources and the second set of resources are ignored while performing the decoding of the transmission associated with the NR RAT from the signal.

* * * * *